United States Patent
Stark, Jr.

(10) Patent No.: US 12,201,963 B1
(45) Date of Patent: Jan. 21, 2025

(54) SYSTEM AND METHOD FOR CARBON DIOXIDE REMOVAL BY DIRECT AIR CAPTURE

(71) Applicant: AIR TO EARTH HOLDINGS LLC, New York, NY (US)

(72) Inventor: Joseph J. Stark, Jr., Katonah, NY (US)

(73) Assignee: Air to Earth Holdings LLC, Rye Brook, NY (US)

( * ) Notice: Subject to any disclaimer, the term of this patent is extended or adjusted under 35 U.S.C. 154(b) by 0 days.

(21) Appl. No.: 18/500,902

(22) Filed: Nov. 2, 2023

(51) Int. Cl.
  *B01D 53/02* (2006.01)
  *B01J 20/26* (2006.01)
  *B01J 20/30* (2006.01)

(52) U.S. Cl.
  CPC ......... *B01J 20/3078* (2013.01); *B01J 20/262* (2013.01); *B01J 2220/4812* (2013.01)

(58) Field of Classification Search
  CPC .................. B01J 20/262; B01J 20/3078; B01J 2220/4812
  See application file for complete search history.

(56) References Cited

U.S. PATENT DOCUMENTS

| | | | |
|---|---|---|---|
| 4,164,256 A | 8/1979 | Kelp | |
| 4,168,706 A | 9/1979 | Fletcher | |
| 4,541,851 A | 9/1985 | Bosquain | |
| 5,338,450 A | 8/1994 | Maurer | |
| 6,099,609 A | 8/2000 | Lira | |
| 6,334,889 B1 | 1/2002 | Smolarek | |
| 6,352,578 B1 | 3/2002 | Sakata | |
| 8,500,855 B2 | 8/2013 | Eisenberger | |
| 8,574,354 B2 | 11/2013 | Keith | |
| 9,341,408 B2 | 5/2016 | Fleming, Jr. | |
| 9,901,872 B2 | 2/2018 | Nagayasu | |

(Continued)

FOREIGN PATENT DOCUMENTS

| | | |
|---|---|---|
| DE | 202017005560 U1 | 2/2018 |
| WO | 2010091831 A1 | 8/2010 |

(Continued)

OTHER PUBLICATIONS

Eero Inkeri et al., Modeling of CO2 Capture with Water Bubble Column Reactor, Energies, MDPI, published Nov. 5, 2020, 13 pages.

(Continued)

*Primary Examiner* — Christopher P Jones
(74) *Attorney, Agent, or Firm* — Haynes and Boone, LLP

(57) ABSTRACT

Systems and methods for an atmospheric carbon dioxide removal system are disclosed herein. The system may include a carbon capture vessel including a container, one or more sorbent subcontainer, a sorbent material, and a heating element. The container may include a first outer sidewall and a first hollow interior. Each sorbent subcontainer may be disposed within the first hollow interior and may include a second outer sidewall defining a second hollow interior. The sorbent material may be disposed within the second hollow interior of each sorbent subcontainer. The heating element may be disposed within the container and around one or more sidewalls of a sorbent subcontainer. The heating element may be arranged to heat the sorbent material within the second hollow interior.

24 Claims, 29 Drawing Sheets

(56) References Cited

U.S. PATENT DOCUMENTS

| | | | |
|---|---|---|---|
| 10,413,866 | B2 | 9/2019 | Eisenberger |
| 10,512,880 | B2 | 12/2019 | Eisenberger |
| 11,266,943 | B1 | 3/2022 | Stark, Jr. |
| 11,266,951 | B1 | 3/2022 | Stark, Jr. |
| 11,389,761 | B1 | 7/2022 | Stark, Jr. |
| 2002/0092421 | A1 | 7/2002 | Hayes |
| 2005/0160913 | A1 | 7/2005 | Hrycak |
| 2009/0292132 | A1 | 11/2009 | Evans |
| 2010/0064890 | A1 | 3/2010 | Keith |
| 2010/0101418 | A1* | 4/2010 | Augustine ............ A61G 13/108 55/383 |
| 2011/0041688 | A1 | 2/2011 | Eisenberger |
| 2011/0146488 | A1 | 6/2011 | Jacob |
| 2011/0189075 | A1 | 8/2011 | Wright |
| 2011/0197422 | A1 | 8/2011 | Monereau |
| 2011/0203174 | A1 | 8/2011 | Lackner |
| 2011/0203311 | A1 | 8/2011 | Wright |
| 2011/0206581 | A1 | 8/2011 | Ackley |
| 2011/0296872 | A1 | 12/2011 | Eisenberger |
| 2012/0058032 | A1 | 3/2012 | Lackner |
| 2012/0076771 | A1 | 3/2012 | Vepari |
| 2013/0312606 | A1 | 11/2013 | Eisenberger |
| 2015/0007725 | A1 | 1/2015 | Elliott |
| 2015/0273385 | A1 | 10/2015 | Eisenberger |
| 2017/0106330 | A1 | 4/2017 | Gebald |
| 2017/0113184 | A1 | 4/2017 | Eisenberger |
| 2017/0326494 | A1 | 11/2017 | Gebald |
| 2017/0354925 | A1 | 12/2017 | Heidel |
| 2018/0169568 | A1 | 6/2018 | Eisenberger |
| 2019/0291077 | A1 | 9/2019 | Pang |
| 2020/0009504 | A1 | 1/2020 | Eisenberger |
| 2020/0047109 | A1 | 2/2020 | Maxwell |
| 2020/0230548 | A1 | 7/2020 | Libert |
| 2023/0211276 | A1 | 7/2023 | Alexander |

FOREIGN PATENT DOCUMENTS

| | | |
|---|---|---|
| WO | 2014170184 A1 | 10/2014 |
| WO | 2019161420 A1 | 8/2019 |
| WO | 2020212146 A1 | 10/2020 |

OTHER PUBLICATIONS

Xiaoyang Shi et al., Sorbents for the Direct Capture of CO2 from Ambient Air., Angew. Chem. Int. Ed. 2020, 59, 2-25, 25 pages.

Jimmie L. Williams, Monolith structures, materials, properties and uses, Elsevier Science B.V., Catalysis Today 69 (2001) 3-9, 34 pages.

Wei Zhong et al., Measurement and Determination of Friction Characteristic of Air Flow through Porous Media, Metals 2015, 5, 336-349; doi: 10.3390/met5010336, published Mar. 9, 2015.

Anshuman Sinha et al., Systems Design and Economic Analysis of Direct Air Capture of CO2 through Temperature Vacuum Swing Adsorption Using MIL-101(Cr)-PEI-800 and mmen-Mg2 (dobpdc) MOF Adsorbents, DOI: 10.1021/acs.iecr.6b03887, Ind. Eng. Chem. Res. 2017, 56, 750-764.

Larryn W. Diamond et al., Solubility of CO2 in Water from 1.6 to 100° C. and from 0.1 to 100 MPa: evaluation of literature data and thermodynamic modelling, Elsevier, Fluid Phase Equilibria 208 (2003) 265-290.

J.F. Richardson, J.H. Harker, and J.R. Backhurst, Coulson and Richardson's Chemical Engineering (5th ed. vol. 2), Chapter 4—Flow of Fluids through Granular Beds and Packed Columns, Butterworth-Heinemann, DOI: https://doi.org/10.1016/B978-0-08-049064-9.50015-1, pp. 191-210.

Alexander Rieder et al., Understanding solvent degradation: A study from three different pilot plants within the OCTAVIUS project, Energy Procedia 114 (2017) 1195-1209.

Kyungmin Min et al., Oxidation-stable amine-containing asorbents for carbon dioxide capture, Nature Communications (2018)9:726. | DOI: 10.1038/s41467-018-03123-0 | www.nature.com/naturecommunications, pp. 1-7.

Adam Powell, 3.21 Lectures on Fluid Flow and Kinetics, Apr. 23-30, 2003, pp. 1-26.

Steam Tables, https://energy.mo.gov/sites/energy/files/steam-tables_power-plant-service.pdf, pp. 2-7.

Calvin H. Bartholomew et al., Chapter 2, Catalyst Materials, Properties, and Preparation, Fundamentals of Industrial Catalytic Processes, Second Edition, 2006, pp. 60-117.

Lichun Li, et al., The Henry Coefficient of CO2 in the MEA-CO2-H2O System, Energy Procedia 114 (2017) 1841-1847.

Solrun Johanne Vevelstad, et al, Oxygen and temperature effect on formation of degradation compounds from MEA, Energy Procedia 63 (2014) 957-975.

The New York Blower Company, Fan Laws and System Curves, Engineering Letter 2, 2 pages, Willowbrook, Illinois.

Chaitanya Dhoke, et al, Review on Reactor Configurations for Adsorption-Based CO2 Capture, Ind. Eng. Chem. Res. 2021, 3779-3798.

Mohammed K. Al Mesfer et al., Continuous Fixed Bed CO2 Adsorption: Breakthrough, Column Efficiency, Mass Transfer Zone, MDPI, Processes 2020, 8, 1233, pp. 1-16.

T.W. Engler, Chapter 6—Flow through porous media (Petroleium Engineering 524), New Mexico Tech., pp. 6.1-6.33.

Wojciech Sobieski et al, Darcy's and Forchheimer's Laws in Practice. Part 1. The Experiment, Technical Sciences 17(4), 2014, 321-335.

Qian Yu et al, A Radial Flow Contactor for Ambient Air CO2 Capture, Appl. Sci. 2020, 10, 1080; doi:10.3390/app10031080, p. 1-20.

U.S. Environmental Protection Agency Combined Heat and Power Partnership, Catalog of CHP Technologies, Sep. 2017, 150 pages.

Chao Chen, et al., CO2 capture by Amine-functionalized nanoporous materials: A review, Korean J. Chem. Eng., vol. 31, No. 11, 1919-1934 (Nov. 2014).

Christopher F. Cogswell, et al., Effect of Pore Structure on CO2 Adsorption Characteristics of Aminopolymer Impregnated MCM-36, Langmuir ACS Publications, DOI: 10.1021/la505037f, 2015, pp. A-H.

Katarzyna Maresz et al., Effect of support structure and polyamine type on CO2 capture in hierarchically structured monolithic sorbents, Chemical Engineering Journal 383 (2020) 123175, pp. 1-10.

Eugene J. Kim et al., Cooperative carbon capture and steam regeneration with tetraamine-appended metal-organic frameworks, Science 369, 392-396 (2020) Jul. 24, 2020, pp. 1-5.

John L. Sorrels et al., Chapter 1, Carbon Adsorbers, https://www.epa.gov/sites/production/files/2018-10/documents/final_carbonadsorberschapter_7thedition.pdf, Oct. 2018, 51 pages.

Wim Buijs et al., Direct Air Capture of CO2 with an Amine Resin: A Molecular Modeling Study of the CO2 Capturing Process, Ind. Eng. Chem. Res. 2017, 56, 12297-12304.

David W. Keith et al., A Process for Capturing CO2 from the Atmosphere, Joule 2, 1-22, Aug. 15, 2018.

Toshiyuki Yokota et al., A new technique for preparing ceramics for catalyst support exhibiting high porosity and high heat resistance, Catalysis Today 69 (2001) 11-15.

Robert E. Trubac et al, Micro-engineered catalyst systems: ABB's advancement in structured catalytic packings, Catalysis TOday 69 (2001) 17-24.

William P. Addiego et al., Iron oxide-based honeycomb catalysts for the dehydrogenation of ethylbenzene to styrene, Catalysis Today (2001) 25-31.

Donald R. Cahela et al., Permeability of Sintered microfibrous composites for heterogeneous catalysis and other chemical processing opportunities, Catalysis Today 69 (2001) 33-39.

International Searching Authority, International Search Report and the Written Opinion of the International Searching Authority, International Application No. PCT/US22/32342, Dec. 8, 2022, 13 pages.

Christoph Gebald, Development of Amine-Functionalized Adsorbent for Carbon Dioxide Capture from Atmospheric Air, ETH Zurich Research Collection, https://doi.org/10.3929/ethz-a-010171623, 2014, 133 pages.

Geoffrey Holmes et al., Outdoor prototype results for direct atmospheric capture of carbon dioxide, Energy Procedia 37 (2013) 6079-6095.

(56) References Cited

OTHER PUBLICATIONS

Jason C. Husk and Graham B. Wenz, Inside-Out: Driving Down Direct Air Capture Costs with High-Efficiency Adsorbents, Frontiers in Climate, vol. 3, Article 787500, Feb. 4, 2022, doi: 10.3389/fclim.2021.787500, pp. 1-6.
The Dow Chemical Company, Ethyleneamines, 2009, 46 pages.
Haiyan Mao et al., A scalable solid-state nanoporous network with atomic-level interaction design for carbon dioxide capture, Sci.Adv. 8, eabo6849, Aug. 3, 2022, 11 pages.
Bos, M.J. et at., Production of high purity CO2 from air using solid amine sorbents, Chemical Engineering Science: X 2 (2019) 100020, 11 pages.
Gholami, et al., Temperature vacuum swing, a combined adsorption cycle for carbon capture, Current Opinion in Chemical Engineering 2023, 39:100891, available at: https://doi.org/10.1016/j.coche.2022.100891, 7 pages.
Salvi, Anuj P. et al., Kinetics of Carbon Dioxide Removal by Ethylenediamine and Diethylenetriamine in Aqueous Solutions, The Canadian Journal of Chemical Engineering, vol. 92, Dec. 2014, pp. 2021-2028.
Villarroel, Josselyne A. et al., Kinetic and Thermodynamic Analysis of High-Pressure CO2 Capture Using Ethylenediamine: Experimental Study and Modeling, Energies 2021, 14, 6822. https://doi.org/10.3390/en14206822, 15 pages.

\* cited by examiner

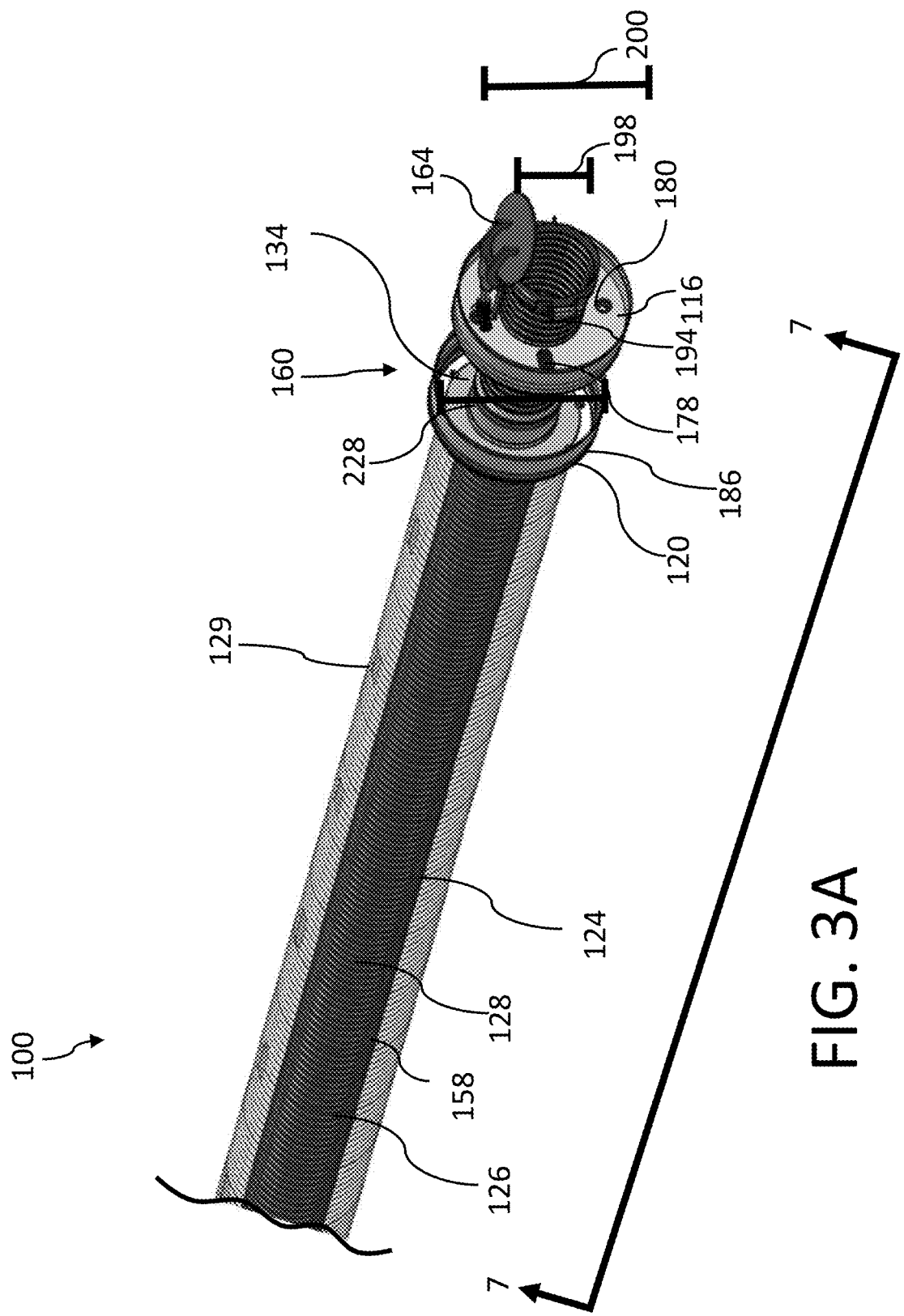

SYSTEM AND METHOD FOR CARBON DIOXIDE REMOVAL BY DIRECT AIR CAPTURE

CROSS-REFERENCE TO APPLICATIONS

This application relates to corresponding U.S. application Ser. No. 18/500,923, filed Nov. 2, 2023, titled System and Method for Carbon Dioxide Removal by Direct Air Capture and U.S. application Ser. No. 18/500,847, filed Nov. 2, 2023, titled System and Method for Carbon Dioxide Removal by Direct Air Capture, both of which are incorporated by reference herein in their entireties.

TECHNICAL FIELD

The present disclosure relates generally to systems and methods for removing carbon dioxide from the atmosphere, and in particular to systems and methods for optimizing the advection of carbon dioxide from the atmosphere, systems and methods for optimizing the contact and capture of carbon dioxide by a sorbent, and systems and methods for optimizing sorbent regeneration and removal of carbon dioxide therefrom for utilization or sequestration.

BACKGROUND

Recent developments have focused attention on achieving a goal of net zero emissions where at least the amount of carbon emitted into the atmosphere is removed. There is currently no feasible way to avoid using the carbon emitting fuels that are required to sustain present living standards.

Therefore, systems and methods are being implemented around the world to remove the carbon dioxide from the atmosphere in an effort to achieve the goal of net zero emissions. Current systems and methods are costly both in terms of money and resources required, such as land and energy. Additionally, current systems do not remove carbon dioxide from the atmosphere in large enough quantities to make a significant impact when compared to legacy emissions and the overall amount of carbon dioxide being emitted each year.

To reduce the amount of carbon dioxide in the atmosphere and achieve the goal of net zero emissions, technological innovation is needed to drive down the cost of atmospheric carbon dioxide removal.

Direct air capture (DAC) is the process by which carbon dioxide is removed from the air to reduce the levels of carbon dioxide in the atmosphere. DAC units or systems may be stand-alone facilities that connect directly to permanent carbon storage infrastructure to safely store the removed carbon dioxide so that it is not released back into the atmosphere (for example, carbon dioxide injection wells completed in saline aquifers) or may be attached to facilities that purify removed carbon dioxide to create net zero carbon products (for example, atmospheric carbon dioxide that is purified to beverage, food and medical grades or used as industrial feedstocks to synthesize fuels and produce net-zero oil by enhanced methods).

SUMMARY

One or more embodiments of the present disclosure may include a carbon capture vessel. The carbon capture vessel may include a container, one or more sorbent subcontainers, a sorbent material, and a heating element. The container may include a first outer sidewall and a first hollow interior. Each sorbent subcontainer may be disposed within the first hollow interior and may include a second outer sidewall comprising a second hollow interior and an inner sidewall disposed within the second hollow interior. The sorbent material may be disposed within the second hollow interior of each sorbent subcontainer. The heating element may be disposed within the container and around at least one inner sidewall or outer sidewall of the sorbent subcontainers. The heating element may be arranged to heat the sorbent material within the second hollow interior.

In some embodiments, the heating element may be an electric heat cable. In some embodiments, a gap may be formed between the inner sidewall and the second outer sidewall. In some embodiments, the sorbent material may be disposed in the gap. In some embodiments, each inner sidewall and each second outer sidewall of each sorbent subcontainer may each include a plurality of apertures arranged to permit flow of fluid containing carbon dioxide through the sorbent subcontainer. In some embodiments, each aperture of the plurality of apertures may include an aperture width and the sorbent material may include a sorbent material width. The aperture width may be smaller than the sorbent material width. In some embodiments, each sorbent subcontainer may be configured to receive a fluid in a longitudinal direction through a first end of the inner sidewall, to redirect fluid through the gap, and to redirect the fluid along an exterior surface of the second outer sidewall within the first outer sidewall. In some embodiments, a second end of the container may be open and a second end of the sorbent subcontainer is closed.

One or more embodiments of the present disclosure may include a carbon capture vessel. The carbon capture vessel may include a container, one or more a sorbent subcontainers, a sorbent material, and a heating element. The container may include a first outer sidewall. Each sorbent subcontainer(s) may be disposed within the container and may include a second outer sidewall and an inner sidewall disposed within the second outer sidewall. The second outer sidewall may be spaced from the first outer sidewall to form a gap therebetween. The sorbent material may be disposed within the gap of each sorbent subcontainer. The heating element may be disposed within the container and around at least one inner sidewall or second outer sidewall of the sorbent subcontainers. The heating element may be arranged to heat the sorbent material within the gap.

In some embodiments, the heating element may be an electric heat cable. In some embodiments, the heating element may contact at least one of the inner sidewall or the outer sidewall of the sorbent subcontainers. In some embodiments, a gap may be formed between the inner sidewall and the second outer sidewall of the sorbent subcontainers. In some embodiments, the sorbent material may be disposed in the second gap. In some embodiments, each inner sidewall and each second outer sidewall of each sorbent subcontainer may each include a plurality of apertures permitting a flow of fluid containing carbon dioxide through the sorbent subcontainer. In some embodiments, each aperture of the plurality of apertures may include an aperture width and the sorbent material may include a sorbent material width. The aperture width may be smaller than the sorbent material width. In some embodiments, the sorbent subcontainer may be configured to receive a fluid in a longitudinal direction through a first end of the inner sidewall, to redirect fluid through the gap, and to redirect the fluid along an exterior surface of the second outer sidewall of a sorbent subcontainer within the first outer sidewall of the container. In some embodiments, a second end of the container may be open and a second end of the sorbent subcontainer may be closed.

One or more embodiments of the present disclosure may include a carbon capture vessel for treating a fluid containing carbon dioxide with a sorbent material. The carbon capture vessel may include a container, one or more cylindrical sorbent subcontainers disposed within the container, and a heating element. The container may include a first outer sidewall. Each sorbent subcontainer may include a cylindrical inner sidewall and a cylindrical second outer sidewall, the inner sidewall being spaced from the second outer sidewall to form an annulus therebetween. The heating element may be disposed within the container and around at least one inner sidewall or second outer sidewall of the sorbent subcontainers. The heating element may be arranged to heat the sorbent material within the annulus.

In some embodiments, the heating element is an electric heat cable. In some embodiments, the heating element may contact at least one of the inner sidewall or the second outer sidewall of the sorbent subcontainers. In some embodiments, the sorbent material may be disposed in the annulus. In some embodiments, each inner sidewall and each outer sidewall of each sorbent subcontainer may include a plurality of apertures arranged to permit flow of fluid containing carbon dioxide through the sorbent subcontainer. In some embodiments, each aperture of the plurality of apertures may include an aperture width and the sorbent material may include a sorbent material width. The aperture width may be smaller than the sorbent material width. In some embodiments, the sorbent subcontainer may be configured to receive a fluid in a longitudinal direction through a first end of the inner sidewall, to redirect fluid laterally through the annulus, and to redirect the fluid along an exterior surface of the second outer sidewall within the container. In some embodiments, a second end of the container may be open and a second end of the sorbent subcontainer may be closed.

One or more embodiments of the present disclosure may include a method of removing carbon dioxide from a sorbent material. The method may include: sealing a carbon capture vessel to contain the sorbent material comprising carbon dioxide; increasing the temperature of the sorbent material to release carbon dioxide from the sorbent material; removing a carbon dioxide enriched fluid; and unsealing the carbon capture vessel. Removing a carbon dioxide enriched fluid may include at least one of: opening a valve to flow the carbon dioxide enriched fluid from the carbon capture vessel into a collection pipe, using a pressure differential between the collection pipe and the carbon capture vessel after increasing the temperature of the sorbent material to release carbon dioxide from the sorbent materials or opening a valve and using a mechanical device to pump the carbon dioxide enriched fluid from the carbon capture vessel into the collection pipe.

In some embodiments, sealing the carbon capture vessel may include: closing a first opening and a second opening of the of the carbon capture vessel to isolate the sorbent material from atmospheric air. In some embodiments, the carbon capture vessel may include a first flap gate valve on the first opening and a second flap gate valve on the second opening and sealing the carbon capture vessel may include closing the first flap gate valve and the second flap gate valve. In some embodiments, the carbon capture vessel may include a first door on the first opening and a second door on the second opening, and sealing the carbon capture vessel may include closing the first door and the second door. In other embodiments, the carbon capture vessel may include a first lid on the first opening and a second lid on the second opening and sealing the carbon capture vessel may include closing the first lid and the second lid. In some embodiments, increasing the temperature of the sorbent material may include increasing the temperature of the sorbent material in the carbon capture vessel to a temperature in a range of about 25° C. to 120° C. In some embodiments, the carbon capture vessel may include an electric heat cable and increasing the temperature may include activating the electric heat cable. In some embodiments, the carbon dioxide enriched fluid may include at least 2% carbon dioxide. In some embodiments, the method may further include flowing, before sealing the carbon capture vessel, air through the carbon capture vessel. In some embodiments, the method may further include flowing, after unsealing the carbon capture vessel, air through the carbon capture vessel.

One or more embodiments of the present disclosure may include a method of removing carbon dioxide from a sorbent material. The method may include: sealing a carbon capture vessel to contain the sorbent material comprising carbon dioxide; heating the sorbent material to release carbon dioxide from the sorbent material; removing a carbon dioxide enriched fluid from the carbon capture vessel; and unsealing the carbon capture vessel. No fluid may be added to the carbon capture vessel when it is sealed.

In some embodiments, sealing the carbon capture vessel may include: closing a first opening and a second opening of the of the carbon capture vessel to isolate the sorbent material from atmospheric air. In some embodiments, the carbon capture vessel may include a first flap gate valve on the first opening and a second flap gate valve on the second opening and sealing the carbon capture vessel may include closing the first flap gate valve and the second flap gate valve. In some embodiments, the carbon capture vessel may include a first door on the first opening and a second door on the second opening, and sealing the carbon capture vessel may include closing the first door and the second door. In other embodiments, the carbon capture vessel may include a first lid on the first opening and a second lid on the second opening and sealing the carbon capture vessel may include closing the first lid and the second lid. In some embodiments, heating the carbon capture vessel may include increasing the temperature of the sorbent material in the carbon capture vessel to a temperature in a range of about 25° C. to 120° C. In some embodiments, the carbon capture vessel may include an electric heat cable and increasing the temperature may include activating the electric heat cable. In some embodiments, the carbon dioxide enriched fluid may include at least 2% carbon dioxide. In some embodiments, removing the carbon dioxide enriched fluid from the carbon capture may include opening a valve on a collection pipe to flow the carbon dioxide enriched fluid from the carbon capture vessel into the collection pipe, using a pressure differential between the collection pipe and the carbon capture vessel after heating the sorbent materials to release carbon dioxide from the sorbent material. In some embodiments, removing the carbon dioxide enriched fluid from the carbon capture may include opening a valve on a collection pipe and using mechanical device to pump the carbon dioxide enriched fluid from the carbon capture vessel into the collection pipe. In some embodiments, the method may further include flowing, before sealing the carbon capture vessel, air through the carbon capture vessel. In some embodiments, the method may further include flowing, after unsealing the carbon capture vessel, air through the carbon capture vessel.

One or more embodiments of the present disclosure may include a method of preparing sorbent material. The method may include: introducing a porous solid material into a vacuum vessel; decreasing a pressure in the vacuum vessel; increasing the pressure in the vacuum vessel; heating an amine; introducing the amine into the vacuum vessel with the porous solid material; decreasing the pressure in the vacuum vessel a second time; increasing the pressure in the vacuum vessel a second time; removing porous solid material comprising the amine.

In some embodiments, decreasing the pressure may include pulling a vacuum. In some embodiments, decreasing the pressure may include decreasing the pressure to approximately 200 mbar. In some embodiments, increasing the pressure may include increasing the pressure to approximately 1 bar. In some embodiments, decreasing the pressure a second time may include pulling a vacuum. In some embodiments, decreasing the pressure a second time may include decreasing the pressure to approximately 200 mbar. In some embodiments, increasing the pressure a second time may include increasing the pressure to approximately 1 bar. In some embodiments, the amine may include polyethyleneimine (PEI). In some embodiments, heating the amine may include heating the amine to a temperature of approximately 70° C. In some embodiments, heating the amine may be performed simultaneously with at least one of: introducing the porous solid material into the vacuum vessel, decreasing the pressure, or increasing the pressure. In some embodiments, the method may also include holding, after decreasing the pressure, the pressure constant for approximately 1 hr. In some embodiments, the method may also include holding, after decreasing the pressure a second time, the pressure constant a second time for approximately 1 hr.

One or more embodiments of the present disclosure may include a system for direct air capture. The system may include a plurality of carbon capture vessels, a plurality of fans, an air diverter and a velocity stack. The plurality of carbon capture vessels may each have an inwardly facing end and an outwardly facing end. The plurality of carbon capture vessels may be arranged such that the inwardly facing side of each carbon capture vessel faces an inner space. The plurality of fans may be disposed adjacent the outwardly facing ends of the plurality of carbon capture vessels. The plurality of fans may be arranged to move air through the plurality of carbon capture vessels in a first direction from the outwardly facing side into the inner space. The air diverter may be disposed within the inner space and may be configured to receive the air flowing in the first direction and redirect the air to flow in a second direction angled upwardly from the first direction. The velocity stack may be disposed on a top of the enclosed space and may be configured to accelerate the flow of the air in the second direction. At least one of the air diverter or velocity stack may include an impermeable fabric.

In some embodiments, the system may also include a permeable mesh disposed at a center of the velocity stack. The permeable mesh may be configured to collect amines. In some embodiments, the system may also include a permeable screen disposed at a center of the velocity stack. The permeable screen may be configured to collect amines. In some embodiments, the air diverter may include an impermeable fabric and the velocity stack may include an impermeable fabric. In some embodiments, the air diverter and the velocity stack may be configured to collect amines.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any embodiment or aspect may be combinable with one or more features of other embodiment or aspect.

BRIEF DESCRIPTION OF THE DRAWINGS

The accompanying drawings illustrate implementations of the systems, devices, and methods disclosed herein and together with the description, explain the principles of the present disclosure.

FIG. 3A illustrates perspective view of the carbon capture vessel with outer sidewalls removed from the container and reducer and a transparent outer sidewall subcontainer, according to one or more embodiments of the present disclosure.

DETAILED DESCRIPTION

Figure 1A:
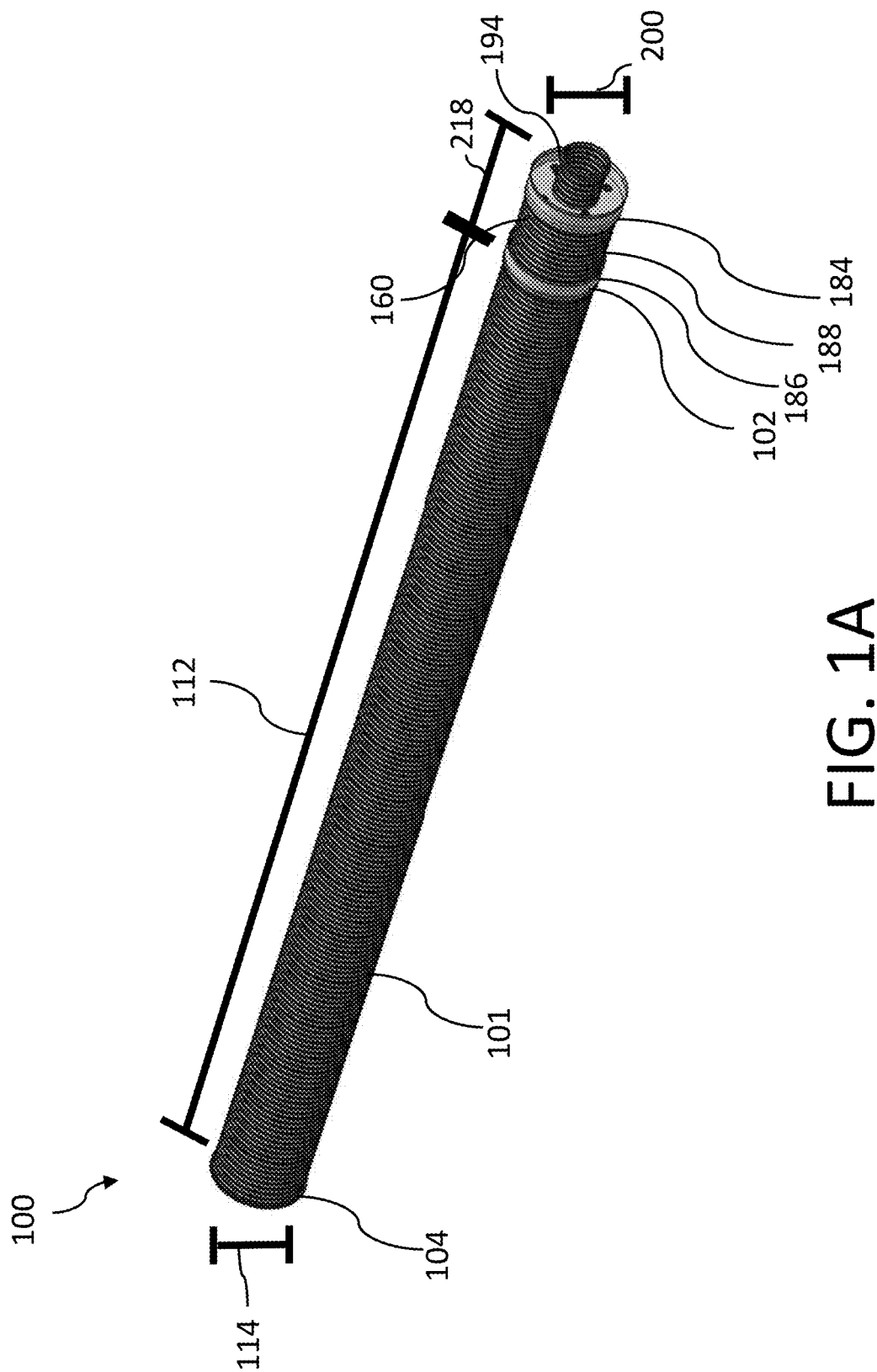
FIG. 1A illustrates a perspective view of a carbon capture vessel, according to one or more embodiments of the present disclosure.

For promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

The present disclosure is directed to improved systems and methods for performing direct air capture (DAC). A system for performing DAC may include one or more carbon capture vessels. Each carbon capture vessel may include a container and one or more sorbent subcontainer disposed within the container. Each sorbent subcontainer may include an outer sidewall and an inner sidewall such that there is a gap between the inner sidewall and the outer sidewall. A sorbent material capable of removing carbon dioxide from the air is disposed in the sorbent subcontainer within the gap between the inner sidewall and the outer sidewall. The sidewalls may have a plurality of apertures that allow air to pass through, but prevent the sorbent material from passing through. A first end of the inner sidewall may be open to allow air to flow into the sorbent subcontainer. A second end of both the inner sidewall and the outer sidewall of the sorbent subcontainer may be closed. The closed second end may allow the air to enter through the first end of the sorbent subcontainer and be redirected axially through the sorbent material in the gap between the sidewalls. This may advantageously allow for improved contact between the air and the sorbent material at lower air speeds, resulting in more carbon dioxide being removed by the sorbent material relative to the quantity of carbon dioxide advected through it by bulk air flow. The air may then be redirected such that it flows along an exterior surface of the outer sidewall of a subcontainer within the container and exits out of the second end of the container. The carbon capture vessel may include valves, doors or lids that may selectively seal the carbon capture vessel so that a regeneration process can be performed. A heating element may be disposed around the sorbent subcontainer so that the sorbent material can be heated.

The regeneration process may include sealing the carbon capture container using the valves, doors or lids. The heating element may heat the sorbent material within the sorbent subcontainer. By heating the sorbent in the carbon capture vessel, the carbon dioxide captured by the sorbent may be released. The carbon dioxide released from the carbon capture container may then be removed. The carbon dioxide extracted through the regeneration process may be stored according to any suitable method known in the art (for example, using a carbon injection facility). The carbon dioxide extracted may be used in another application (for example, for use in carbonated drinks or to create dry ice for use in the medical and food industries).

The Carbon Capture Vessel

FIG. 1A-1D illustrate various views of a carbon capture vessel 100, according to one or more embodiments of the present disclosure. FIG. 1A. illustrates a perspective view of the carbon capture vessel 100, which may include a container 101 and reducer 160 (the container 101 and reducer 160 are sometimes referred to as the container and may define an exterior of the carbon capture vessel 100). The container 101 may be referred to as a sorbent material holding apparatus or a subcontainer holding apparatus. The container 101 has a first end 102, a second end 104, and a sidewall extending between the first end 102 and second end 104.

The container 101 may be an elongated vessel. In some embodiments, such as the illustrated embodiment, the container 101 may be a cylinder. However, in other embodiments, the container 101 may be rectangular, hexagonal, ovular, or any other suitable shape.

The container 101 may have any suitable dimensions. For example, the container 101 may have a length 112 in a range of 1 feet (ft) to 160 ft. In some embodiments, the container 101 may have a length 112 of 1 ft, 5 ft, 10 ft, 20 ft, 30 ft, 40 ft, 50 ft, 60 ft, 70 ft, 80 ft, 90 ft, 100 ft, 110 ft, 120 ft, 130 ft, 140 ft, 150 ft, or 160 ft. In some embodiments, the container 101 may have a length 112 of 40 ft. The cross-sectional area of container 101 may be a circle, square, rectangle or any shape of any size. In some embodiments, the cross-sectional area of container 101 is a circle having a diameter 114 in a range of 0.1 ft to 10 ft. In some embodiments, the container 101 may have a diameter of 0.1 ft, 0.5 ft, 1 ft, 1.5 ft, 2 ft, 2.5 ft, 3 ft, 3.5 ft, 4 ft, 4.5 ft, 5 ft, 5.5 ft, 6 ft, 6.5 ft, 7 ft, 7.5 ft, 8 ft, 8.5 ft, 9 ft, 9.5 ft or 10 ft. In some embodiments, the container 101 may have a diameter of 3 ft.

The container 101 may include any suitable material. For example, in some embodiments, such as the illustrated embodiment, the container 101 may include sections of corrugated metal pipe constructed of galvanized steel, polyethylene, or steel reinforced polyethylene. In other embodiments, the container 101 may include individual or multiple intermodal containers, commonly referred to as shipping containers, built for intermodal freight transport that can be used across different modes of transport, from ship to rail to truck or from rail to truck.

The reducer 160 may include an outer sidewall 188 and an inner sidewall 194. A reducer 160 may be coupled to the first end 102 of the container 101 and to the first end 134 of the inner sidewall 128 of the sorbent subcontainer 124, as described in more detail below. The outer sidewall 188 may have a first end 184 and a second end 186. The outer sidewall 188 may be similar to or match the shape and circumference of the container 101. The inner sidewall 194 may have a first end 191 and a second end 193. The inner sidewall 194 may be similar to or match the shape and circumference of the inner sidewall 134 of the sorbent subcontainer 124. The second end 186 of the outer sidewall 188 of the reducer 160 may be coupled to the first end 102 of the container 101. The second end 193 of the inner sidewall 194 of the reducer 160 may be coupled to the first end 134 of the inner sidewall 128 of the sorbent subcontainer 124. The reducer 160 may be configured to direct fluid flow into the inner sidewall 194 of the reducer 160, as described in more detail below. The first end 184 of the outer sidewall 188 of the reducer 160 may be coupled to the second end 196 of the outer sidewall 192 of the housing 190, as described in more detail below.

Figure 1B:
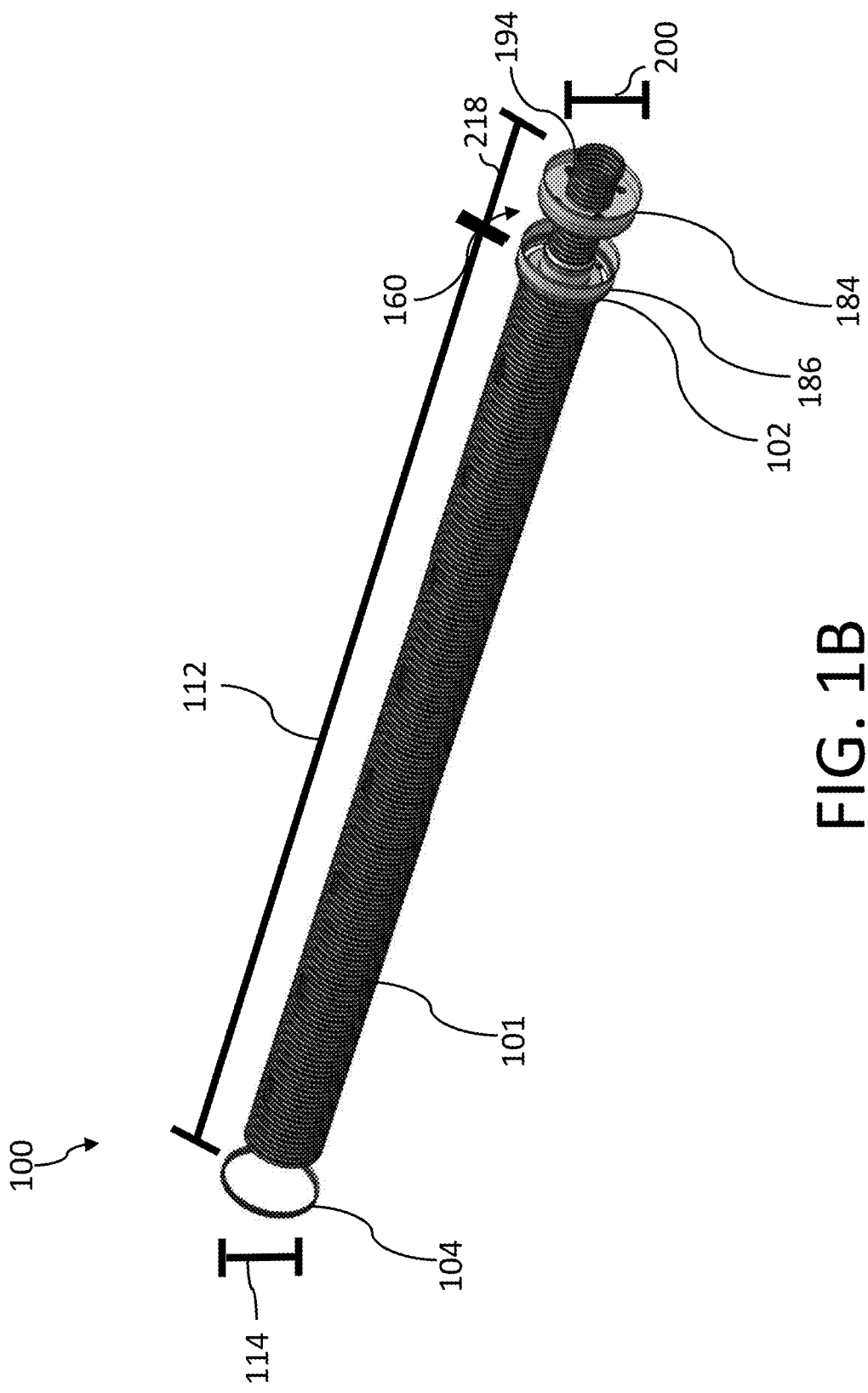
FIG. 1B illustrates a cut away perspective view of the container with outer side walls removed from the container and reducer, according to one or more embodiments of the present disclosure.

FIG. 1B illustrates a cut away perspective view of the container with the sidewall removed from container 101 and outer sidewall 188 removed the reducer.

Figure 1C:
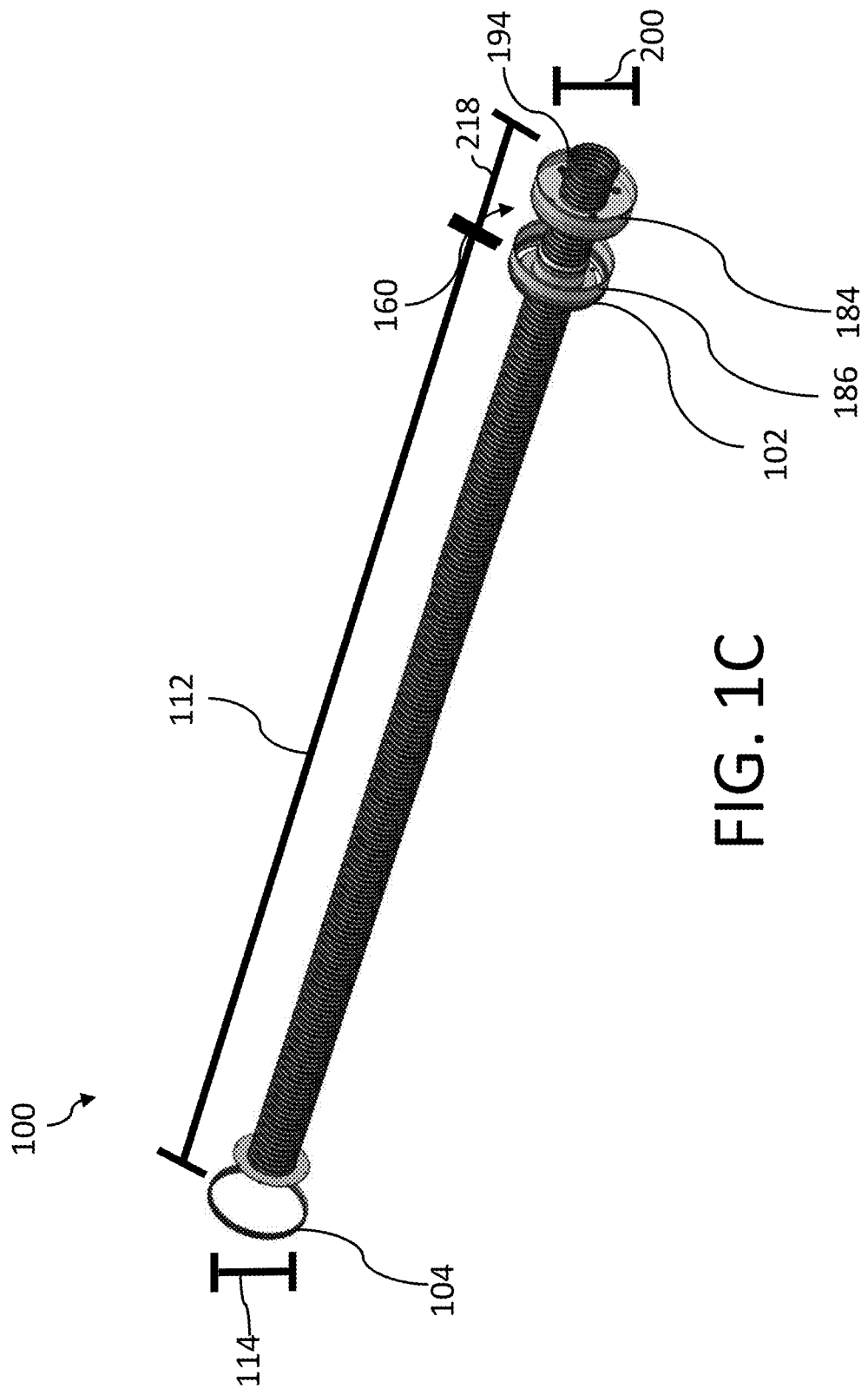
FIG. 1C further illustrates a cut away perspective view of the container with outer sidewalls removed from the container, reducer and subcontainer, according to one or more embodiments of the present disclosure.

FIG. 1C further illustrates a cut away perspective view of the container with the sidewall removed from container 101, and outer sidewall 188 removed the reducer 160 and the outer sidewall 126 removed from the sorbent subcontainer 124.

Figure 1D:
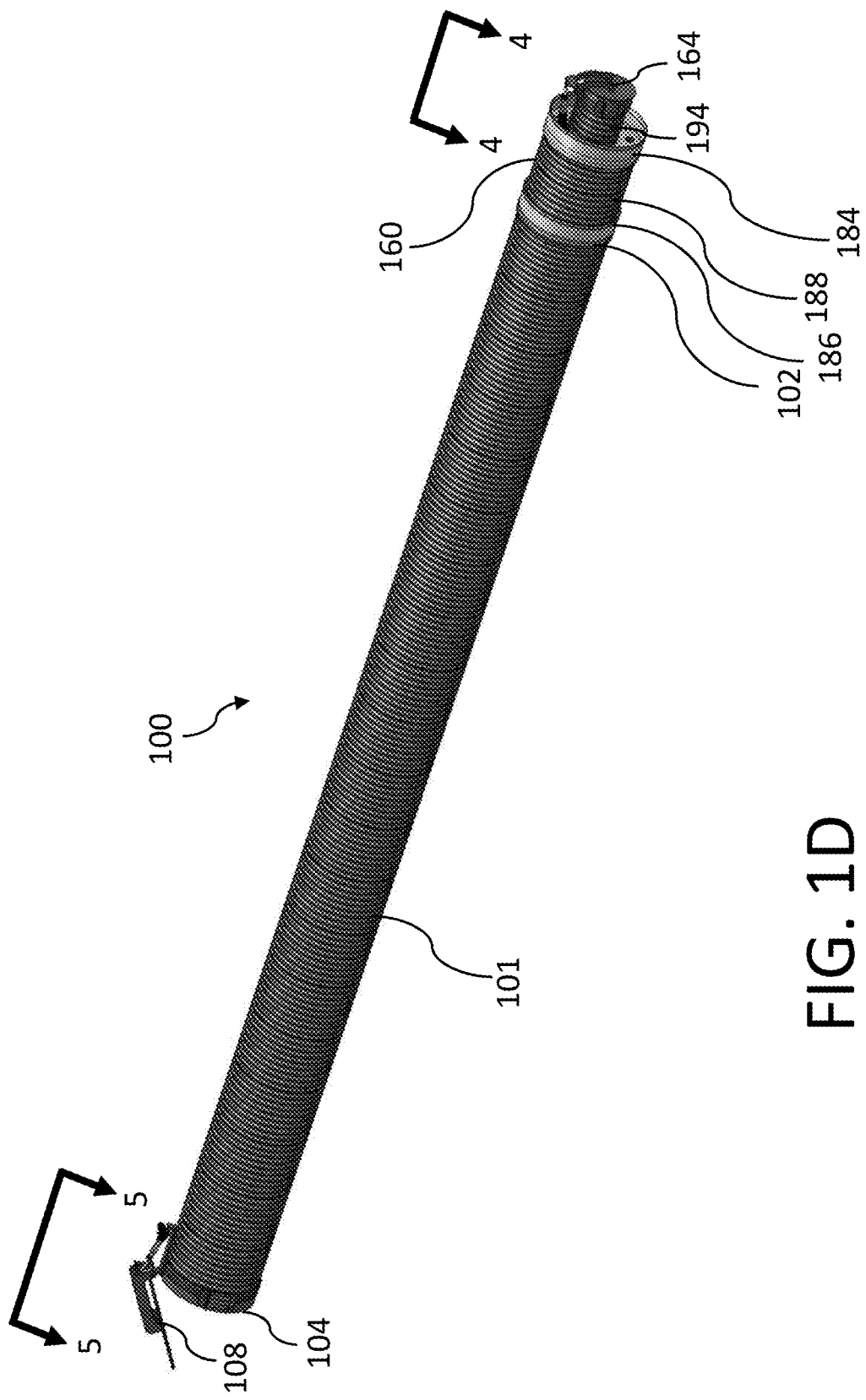
FIG. 1D further illustrates another perspective view of the container, according to one or more embodiments of the present disclosure.

FIG. 1D further illustrates another perspective view of the container with a container valve 108 (illustrated in the open position), which may be coupled to the second end 104 of the container 101. A reducer valve (illustrated in the closed position) may be coupled to the inner sidewall 194 of the reducer 160. Other embodiments may be used to seal the container that include doors or lids.

Figure 2:
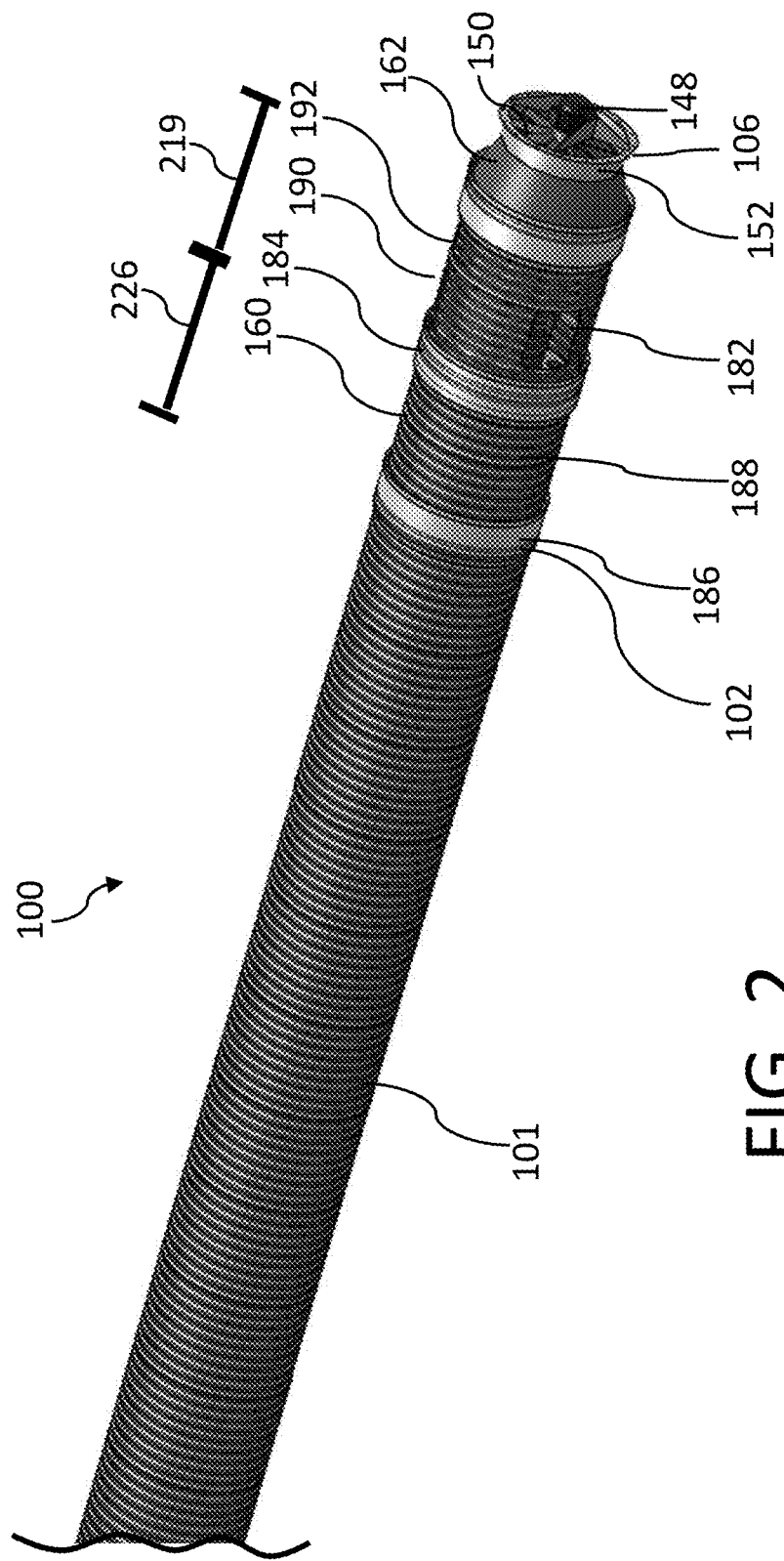
FIG. 2 illustrates a perspective view of the carbon capture vessel with a fan, according to one or more embodiments of the present disclosure.

FIG. 2 illustrates a zoomed-in perspective view of the carbon capture vessel 100, which may include a container 101, reducer 160, housing 190, fan reducer 162, and a fan 106, according to one or more embodiments of the present disclosure.

The housing 190 may include an outer sidewall 192. The housing 190 may have a first end 198 and a second end 196 and may also have an access opening 182 extending through the outer sidewall 192 (illustrated in the open position). The access opening 182 may allow for electrical cables, automation and instrumentation wiring and pipes for carbon dioxide removal to be attached to the reducer 160 and may be sealed to prevent air flow losses to the reducer 160, as described in more detail below.

In some embodiments, a fan 106 may be disposed adjacent to a fan reducer 162, which may be disposed adjacent to the first end 198 of the housing 190.

The fan 106 may provide a mechanism for effectively and efficiently forcing air containing carbon dioxide through the sorbent material to extract the carbon dioxide from the air. A goal of the fan 106 is to generally drive air flow at a rate and static pressure that matches the resistance pressure downstream of the fan 106 at a targeted air speed through the sorbent material. Accordingly, depending on a number of factors related to the dimensions and design of the carbon capture vessel 100 in general and the selected sorbent material in particular, the fan 106 and fan motor 148 can be sized to deliver air flow at a target rate and static pressure to naturally pressure balance with the resistance of the carbon capture vessel 100. The rotations per minute (rpm) of fan motor 148 may be adjusted to tune the actual air flow rate given the actual resistance of the carbon capture vessel 100 to the targeted air flow rate by means of a variable frequency drive or by any other means available to those skilled in the art.

The fan 106 may be configured to direct fluid flow into the fan reducer 162, into the housing 190, into the reducer 160, into the hollow interior 158, into the sorbent subcontainer 124 and, thus into the container 101 and out the second end 104 of the container 101, as described in more detail below. For example, the fan 106 may be coupled to the housing 190 via a fan reducer 162. The fan reducer 162 may extend from the outer circumference of the fan 106 to the outer circumference of the housing 190. The fan reducer 162, along with the housing 190 when the access panel is sealed, may direct the air moved by the fan 106 into the reducer 160, into the hollow interior 158, into the sorbent subcontainer 124 and, thus into the container 101 and out the second end 104 of the container 101. In some embodiments, the fan reducer 162 provides a sealed connection between the fan 106 and the housing 190. In some embodiments, the fan 106 may be coupled to the first end 192 of the housing 190. In other embodiments, the fan 106 may be coupled to the first end 184 of the inner sidewall 194 of the reducer 160. In other embodiments the fan 106 may be directly connected to the first end 191 of the inner sidewall 128 of the sorbent subcontainer 124. In some embodiments, the fan 106 may not be coupled and instead may be placed inside the container 101, upstream of one or more sorbent subcontainers 124 at some distance. In such embodiments, the gap between the interior circumference of the container and the exterior circumference of the fan 106 and the gap between the interior circumference of the carbon capture vessel 101 and the exterior circumference of the first end 134 of the inner sidewall 128 of the sorbent subcontainer 124 may be sealed by any reasonable method to direct the air moved by the fan into the hollow interior 158 of one or more sorbent subcontainers 124 and, thus into the container 101 and out the second end 104 of the container 101. The fan 106 may be moveable or may be stationary.

In some embodiments, each fan may be configured to move air through the fan at a rate of about 1,000 cubic feet per minute (CFM) to about 250,000 CFM, though larger and smaller values are contemplated. In some embodiments, each fan may move air at a rate of about 5,500 CFM at 1 inch water static pressure.

In some embodiments, the fan 106 may include a fan motor 148, fan blades 150, and a fan frame 152. The fan frame 152 may be a cylindrical structure attached to allow for movement of air through the fan frame 152. In some embodiments, the fan 106 may be a tubeaxial fan, vaneaxial fan, or propeller fan. Fan frame 152 may have a circumference similar to the circumference of the housing 188, though larger and smaller sizes are contemplated. Fan motor 148 may be configured to drive fan blades 150. Fan motor 148 may be an electric motor with associated control equipment, with or without a variable frequency drives, connected directly or via belts to drive the fan blades 150.

Figure 3B:
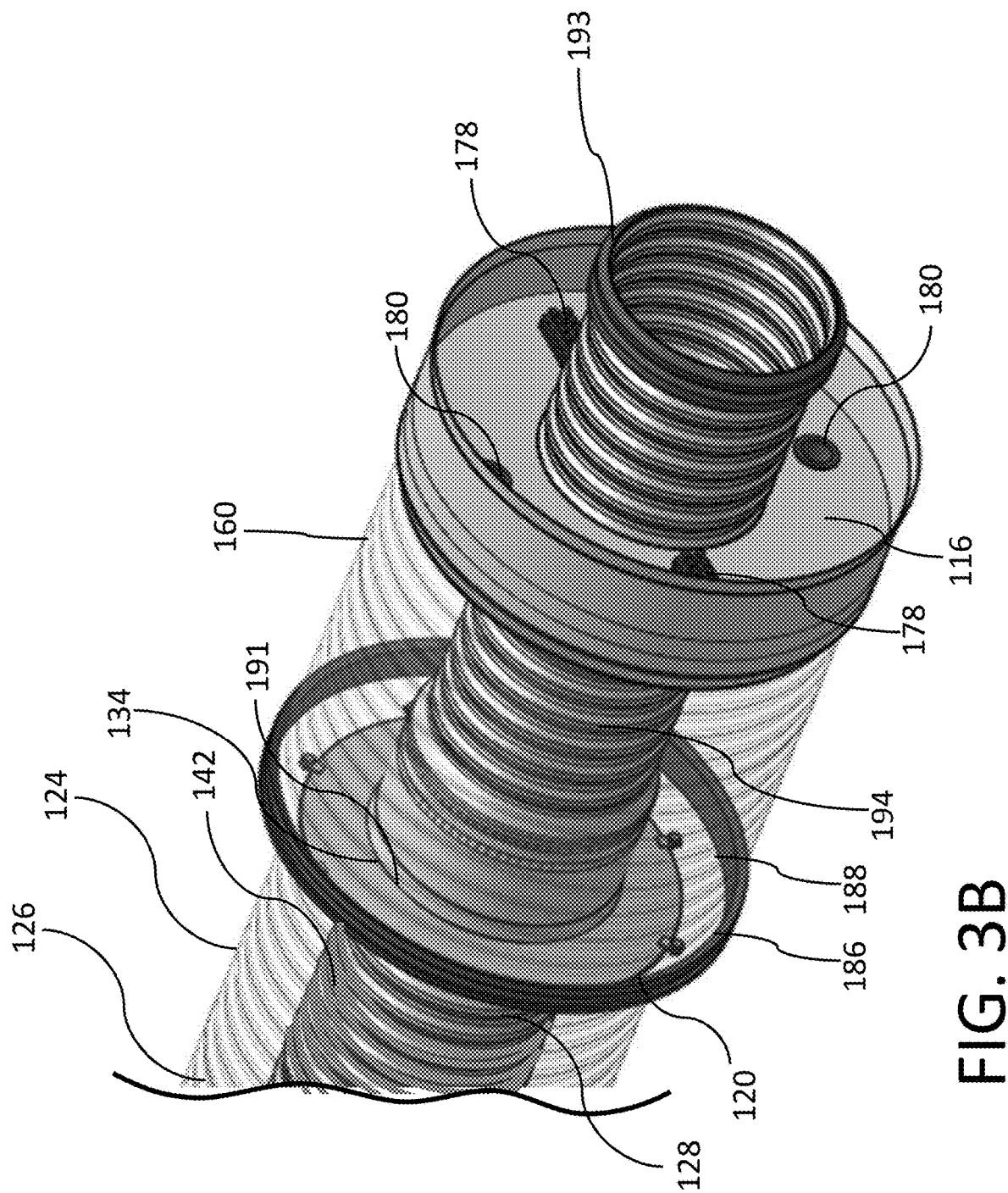
FIG. 3B illustrates a zoomed in view of the carbon capture vessel in FIG. 3A with the reducer valve removed, according to one or more embodiments of the present disclosure.

FIG. 3A illustrates a zoomed-in cut away perspective view of the container with the sidewall removed from container 101, the outer sidewall 188 removed the reducer 160 and the outer sidewall 126 of the subcontainer 124 made transparent, according to one or more embodiments of the present disclosure. FIG. 3B illustrates a zoomed-in view of the carbon capture vessel 100 in FIG. 3A with the reducer valve 164 removed. The first end 102 of the container 101 may include a lip for attachment to the reducer 160. The reducer 160 may also include a lip for attachment to the housing 190.

A subcontainer 124 may be disposed within the container 101. The subcontainer 124 may also be referred to as a sorbent material subcontainer or a sorbent subcontainer. As described in more detail below, the subcontainer 124 may include an outer sidewall 126 and an inner sidewall 128 disposed within the hollow interior of the outer sidewall 126. The inner sidewall 128 may have a hollow interior 158 that receives fluid flow, as described in more detail below. The outer sidewall 126 may have a first end 120 that is disposed within the container 101. In some embodiments, the first end 120 of the outer sidewall 126 may be spaced inward or outward from the first end 102 of the container 101. In other embodiments, the first end 120 of the outer sidewall 126 may be even with the first end 102 of the container 101. The inner sidewall 128 may have a first end 134 that is even with the first end 102 of the container 101. In other embodiments, the first end 134 of the inner sidewall 128 may be spaced inward or outward from the first end 102 of the container 101. In some embodiments, outer sidewall 126 may have apertures 129 along its top, to load sorbent material into the annulus between the outer sidewall 126 and inner sidewall 128.

The inner sidewall 194 of the reducer 160 may have a circumference that matches or is similar to the circumference of the inner sidewall 128 of the subcontainer 124. The outer sidewall 188 of the reducer 160 may have a circumference that matches or is similar to the circumference of the container 101. Thus, the second end 186 of the reducer 160 may be coupled to the container 101 and subcontainer 124 such that the outer sidewall 188 is coupled to the first end 102 of the container 101 and the inner sidewall 194 is coupled to the first end 134 of the inner sidewall 128 of the subcontainer 124. A gasket (e.g. a rubber gasket) may be disposed between the lip of the container 101 and the outer sidewall 188 of the reducer 160 for a sealed connection between the container 101 and the reducer 160. Similarly, a gasket (e.g. a rubber gasket) may be disposed between the inner sidewall 128 of the subcontainer 124 and the inner sidewall 194 of the reducer 160 for a sealed connection between the inner sidewalls 128, 194.

There may be a seal 116 between the inner sidewall 194 and outer sidewall 188 of the reducer 160. The seal 116 may extend from the inner sidewall 194 to the inner surface of the outer sidewall 188.

The seal 116 may include a thermoplastic. For example, the seal 116 may comprise epoxy. The seal 116 may hermetically seal the annulus between the inner sidewall 194 and the outer sidewall 188. In other embodiments, instead of sealing the annulus with a seal 116, a plate may extend between the inner sidewall 194 and the outer sidewall 188. The plate may seal the annulus between the sidewalls 188, 194.

There may be one or more electrical connections 178 extending through the seal 116. The electrical connections 178 may be related to automation and instrumentation wiring and/or electrically coupled to a heating element 142 that is disposed around one or more sidewalls of the subcontainer 124, as described in more detail below. There may also be one or more holes 180 extending through the seal 116. In some embodiments, these holes 180 may allow carbon dioxide enriched fluid to move out of the container 101 during the regeneration process into a collection pipe (not shown in FIG. 3A), as described in more detail below. The electrical connections 178 and the holes 180 of the seal 116 may be accessed via the access opening 182 in the housing 190.

In some embodiments, there may be one or more electrical connections 178 related to automation and instrumentation wiring and/or electrically coupled to a heating element 142 running through the seal 116. There may also be one or more holes 180 extending through the seal 116 to allow carbon dioxide enriched fluid to move out of the container 101 via a pipe or hose (not shown in FIGS. 3A-3B) connected to holes 180.

Figure 4A:
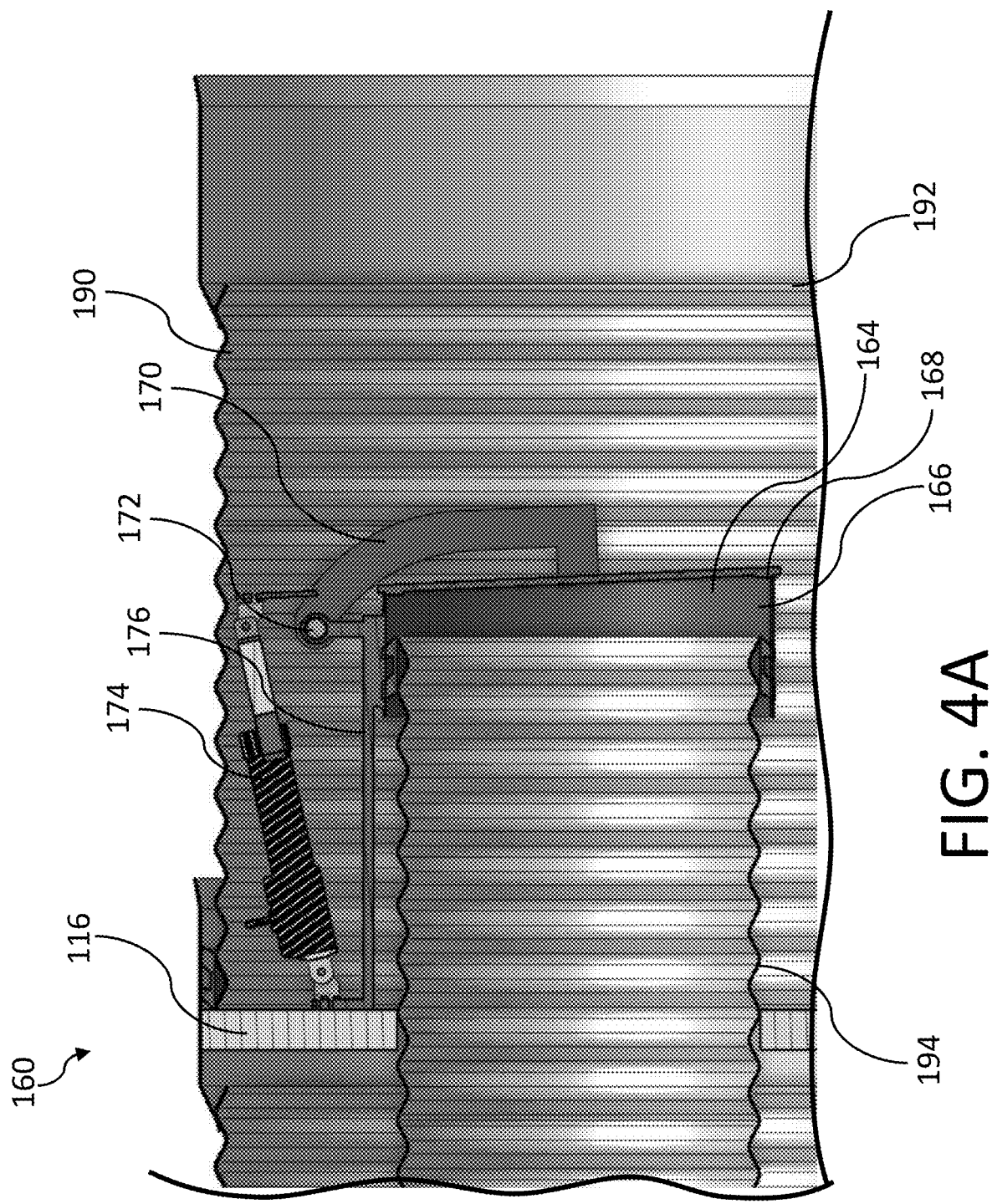
FIGS. 4A-4B illustrate cross-sectional views of a reducer through the 4-4 line in FIG. 1, according to one or more embodiments of the present disclosure.
Figure 4B:
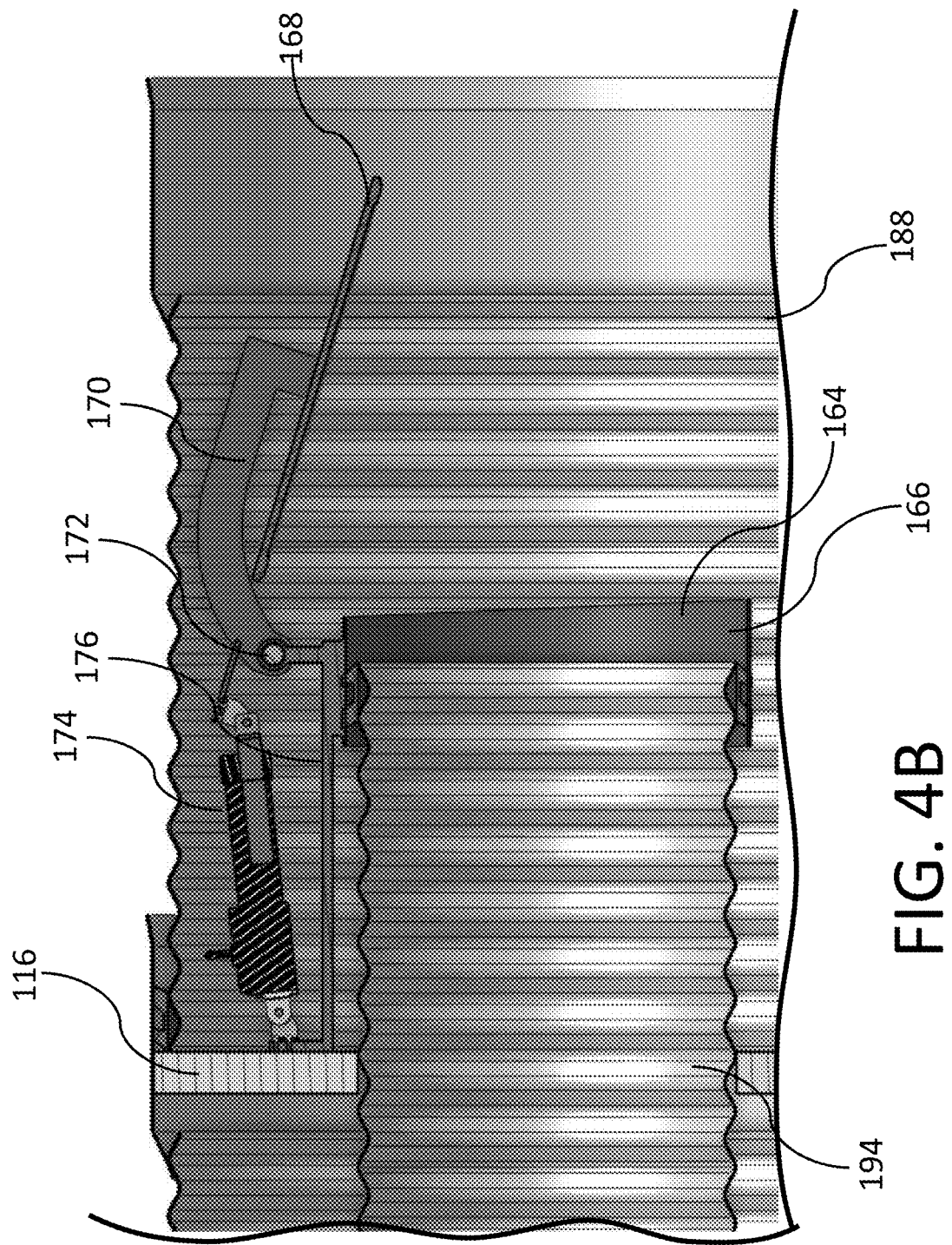
Figure 4C:
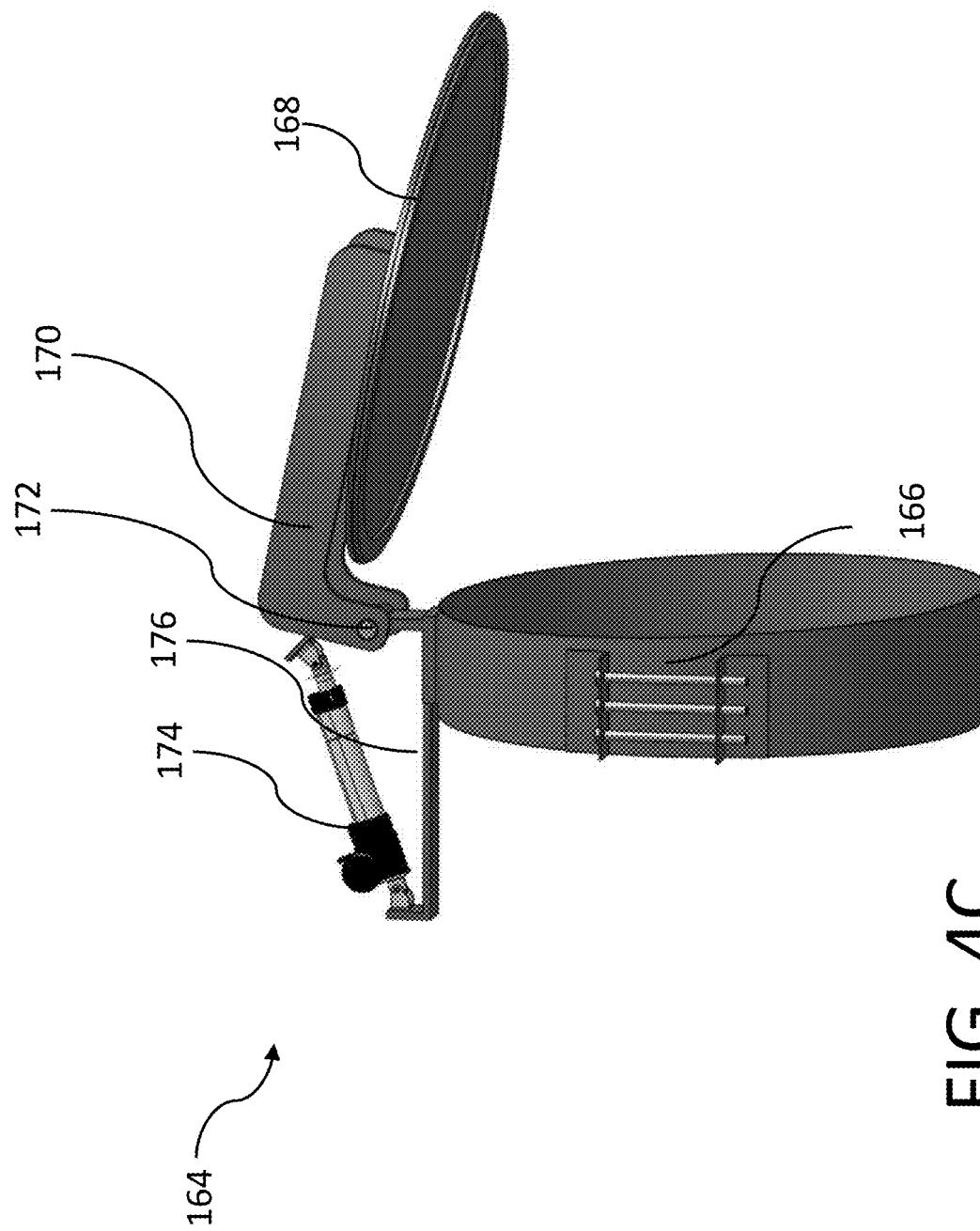
FIG. 4C illustrates a perspective view of the reducer valve, according to one or more embodiments of the present disclosure.

A reducer valve 164 may be coupled to the inner sidewall 194 of the reducer 160. FIGS. 4A-4C illustrate the reducer valve 164, according to one or more embodiments of the present disclosure and the housing 190. FIGS. 4A-4B illustrate zoomed in cross-sectional views of the inner sidewall 194 through the 4-4 line shown in FIG. 1D. FIG. 4A illustrates the inner sidewall 194 with the reducer valve 164 in a closed position and FIG. 4B illustrates the inner sidewall 194 with the reducer valve 164 in an open position. FIG. 4C illustrates a perspective view of the reducer valve 164.

The reducer valve 164 may be any suitable valve or door. For example, as in the illustrated embodiment, the reducer valve 164 may be a flap gate valve. The flap gate valve 164 may include a gasket 166 around the outer surface of the inner sidewall 194 and a door 168 hingedly coupled to the gasket 166. The door 168 may be coupled to a hinge bracket 170 which is hingedly or pivotably coupled to a hinge 172. The door 168 may be moved by any suitable means. For example, in the illustrated embodiment, the door 168 may be moved by an electric actuator 174. One end of the electric actuator 174 may be coupled to the hinge bracket 170 and the other end may be coupled to a support bracket 176, which is coupled to the gasket 166 or the inner sidewall 194. The support bracket 176 may also be coupled to the seal 116 of the reducer 160 for additional support. Although one particular reducer valve 164 is illustrated and described, any suitable arrangement of parts may be used.

The door 168 may move between an open position and a closed position. In the open position, the door 168 may allow fluid flow into the inner sidewall 194 of the reducer 160 and, thus, into the hollow interior 158 of the subcontainer 124. In the closed position, the door 168 may not allow fluid flow into the inner sidewall 194 of the reducer 160 and, thus into the hollow interior of the subcontainer 124 as well. In some embodiments, in the closed position, the door 168 may seal the container 101.

The reducer 160 may have any suitable dimensions. For example, the inner sidewall 194 of the reducer 160 may have a length 220 in a range of 1 foot (ft) to 10 ft. In some embodiments, the inner sidewall 194 may have a length 220 of approximately 1 ft, 2 ft, 3 ft, 4 ft, 5 ft or, 10 ft. In some embodiments, the inner sidewall 194 may have a length 220 of approximately 4 ft. The inner sidewall 194 of the reducer 160 may have a diameter 198 similar to or the same as the diameter 140 of the inner sidewall 128 of the subcontainer 124. For example, the inner sidewall 194 may have a diameter 198 in a range of 0.1 ft to 5 ft. In some embodiments, the inner sidewall 194 may have a diameter 198 of 0.1 ft, 0.5 ft, 1 ft, 1.5 ft, 2 ft, 2.5 ft, 3 ft, 3.5 ft, 4 ft, 4.5 ft, of 5 ft. In some embodiments, the inner sidewall 194 may have a diameter 198 of 1.5 ft.

Additionally, the outer sidewall 188 of the reducer 160 may have a length 226 in a range of 1 ft to 10 ft. In some embodiments, the outer sidewall 188 may have a length 226 of approximately 1 ft, 2 ft, 3 ft, 4 ft, 5 ft or, 10 ft. In some embodiments, the outer sidewall 188 may have a length 226 of approximately 3 ft. The outer sidewall 188 of the reducer 160 may have a diameter 228 similar to or the same as the diameter 114 of the container 101. For example, the outer sidewall 188 may have a diameter 228 in a range of 0.1 ft to 5 ft. In some embodiments, the outer sidewall 188 may have a diameter 228 of 0.1 ft, 0.5 ft, 1 ft, 1.5 ft, 2 ft, 2.5 ft, 3 ft, 3.5 ft, 4 ft, 4.5 ft, of 5 ft. In some embodiments, the outer sidewall 188 may have a diameter 208 of 3 ft.

The housing 190 may be sized and shaped to fit the reducer valve 164 in either the open or closed position. For example, the housing 190 may be long enough such that the reducer valve 164 is disposed entirely within the housing 190 in the open position.

Thus, the housing 190 may have a length 219 in a range of 1 ft to 10 ft. In some embodiments, the housing 190 may have a length 219 of approximately 1 ft, 2 ft, 3 ft, 4 ft, 5 ft or, 10 ft. In some embodiments, the housing 190 may have a length 219 of approximately 3 ft. The housing 190 may have a diameter 200 similar to or the same as the diameter 114 of the container 101 and/or the diameter 208 of the outer sidewall 188 of the reducer 160. For example, the housing 188 may have a diameter 200 in a range of 0.1 ft to 5 ft. In some embodiments, the housing 188 may have a diameter 200 of 0.1 ft, 0.5 ft, 1 ft, 1.5 ft, 2 ft, 2.5 ft, 3 ft, 3.5 ft, 4 ft, 4.5 ft, of 5 ft. In some embodiments, the housing 188 may have a diameter 200 of 3 ft.

Figure 5A:
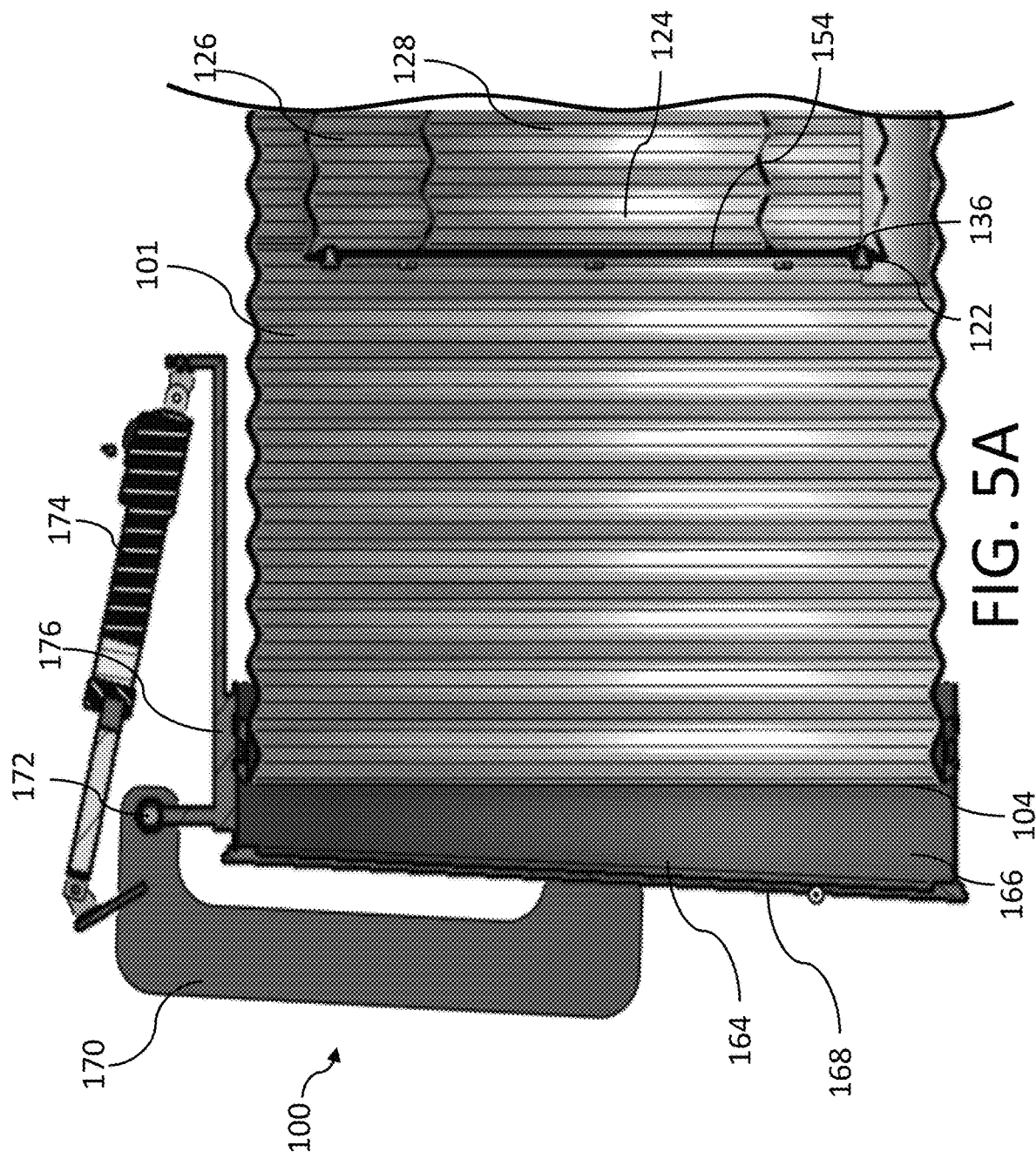
FIGS. 5A-5B illustrate cross-sectional views of a portion of the carbon capture vessel through the 5-5 line in FIG. 1, according to one or more embodiments of the present disclosure.
Figure 5B:
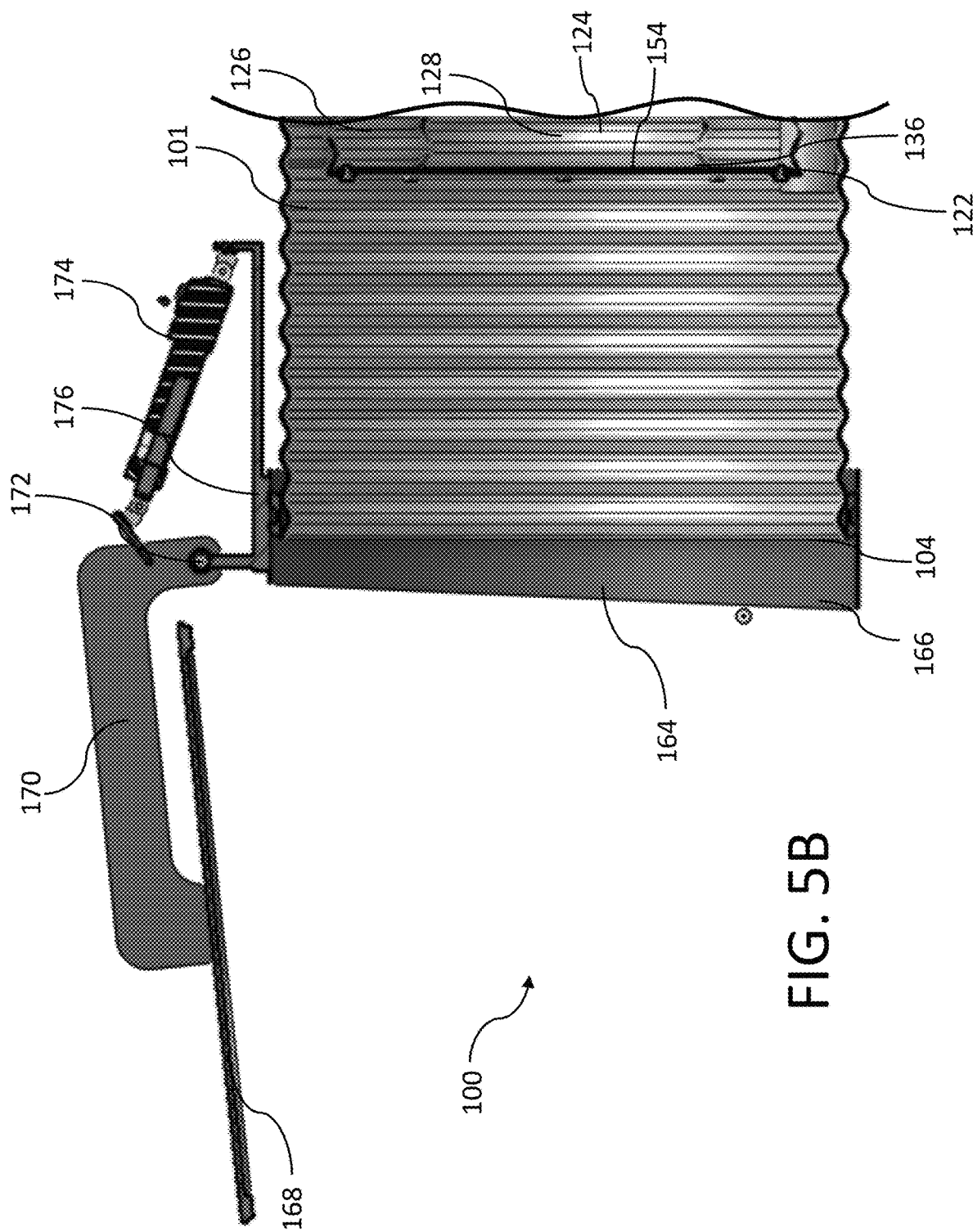

FIGS. 5A-5B illustrate cross-sectional views of the second end 104 of the container 101 through the 5-5 line in FIG. 1, according to one or more embodiments of the present disclosure. FIG. 5A illustrates the second end 104 of the container 101 with the container valve 108 in a closed position and FIG. 5B illustrates the second end 104 of the container 101 with the container valve 108 in an open position.

The container valve 108 may be any suitable valve or door. The container valve 108 may be the same as or similar to the reducer valve 164. For example, as in the illustrated embodiment, the container valve 108 may be a flap gate valve. The flap gate valve of the container valve 108 may be the same as or similar to the flap gate reducer valve 164. The flap gate valve 108 may include a gasket 166 around the outer surface of the container 101 and a door 168 hingedly coupled to the gasket 166. The door 168 may be coupled to a hinge bracket 170 which is hingedly or pivotably coupled to a hinge 172. The door 168 may be moved by any suitable means. For example, in the illustrated embodiment, the door 168 may be moved by an electric actuator 174. One end of the electric actuator 174 may be coupled to the hinge bracket 170 and the other end may be coupled to a support bracket 176, which is coupled to the gasket 166 or the container 101. Although one particular container valve 108 is illustrated and described, any suitable arrangement of parts may be used.

The door 168 may move between an open position and a closed position. In the open position, the door 168 may allow fluid flow out of the second end 104 of the container 101. In the closed position, the door 168 may not allow fluid flow out of the second end 104 of the container 101. In some embodiments, in the closed position, the door 168 may seal the container 101.

In some embodiments, the second end 122 of the outer sidewall 126 may be spaced inward from the second end 104 of the container 101. Similarly, the second end 136 of the inner sidewall 128 may also be spaced inward from the second end 104 of the container 101. The second end 122 of the outer sidewall 126 may be aligned with the second end 136 of the inner sidewall 128. However, in other embodiments, the second end 122 of the outer sidewall 126 may be spaced outward relative to the second end 136 of the inner sidewall 128. In some embodiments, the second end 122 of the outer sidewall 126 and/or the second end 136 of the inner sidewall 128 may be aligned with the second end 104 of the container 101.

Figure 6A:
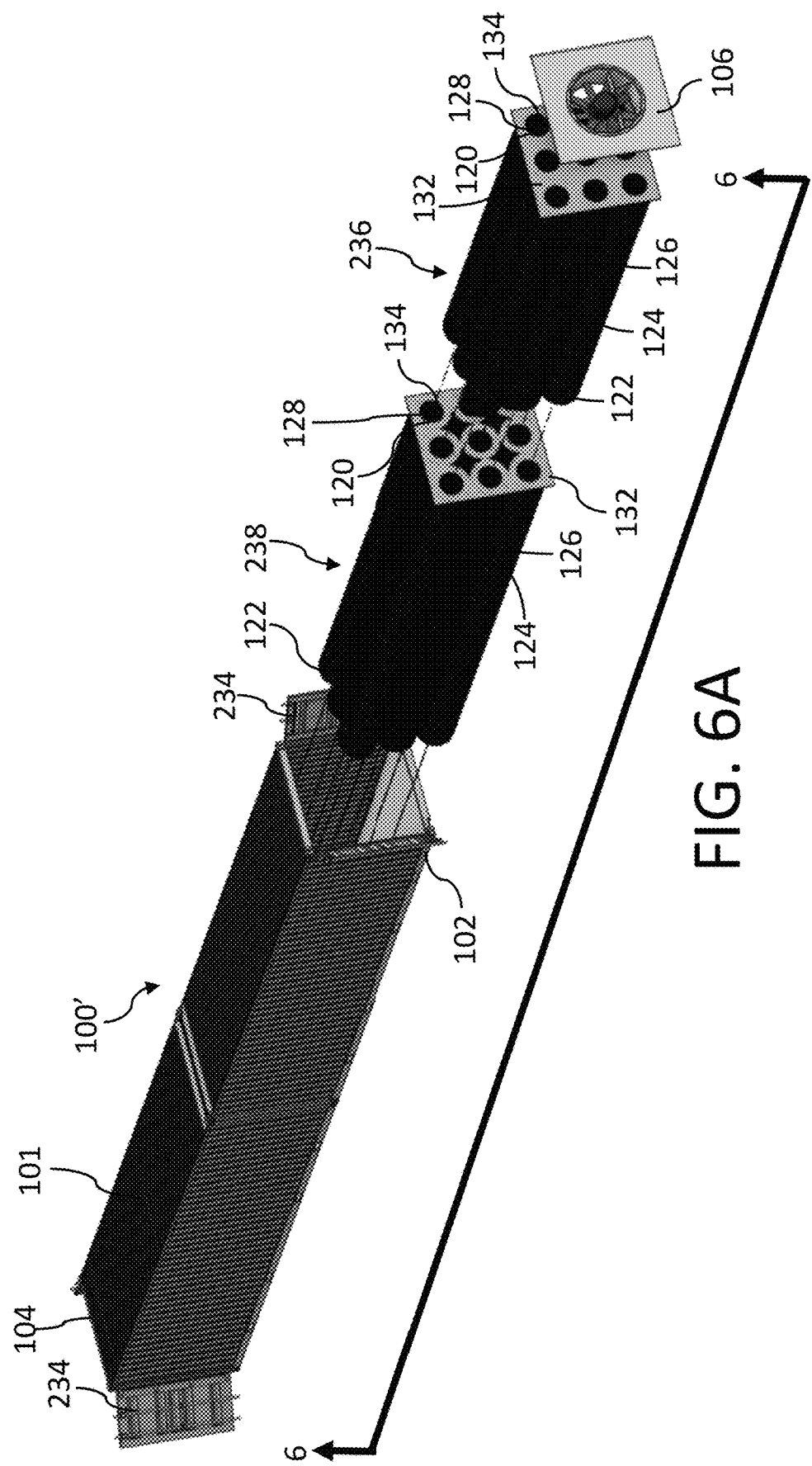
FIG. 6A illustrates an expanded view of the carbon capture vessel, according to one or more embodiments of the present disclosure.
Figure 6B:
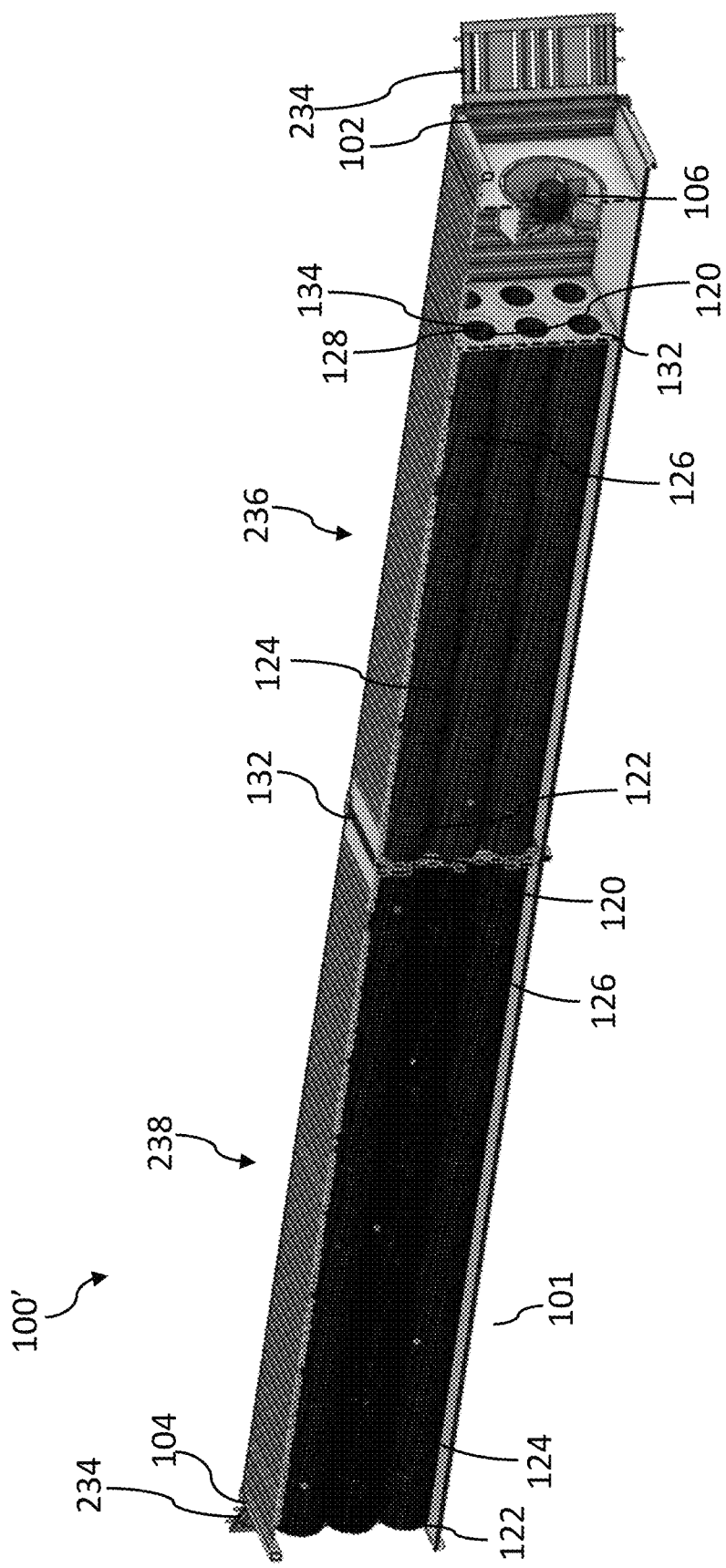
FIG. 6B illustrates a cross-sectional view of a carbon capture vessel along the 6-6 line in FIG. 6A with the container doors 234 open, according to one or more embodiments of the present disclosure.
Figure 6C:
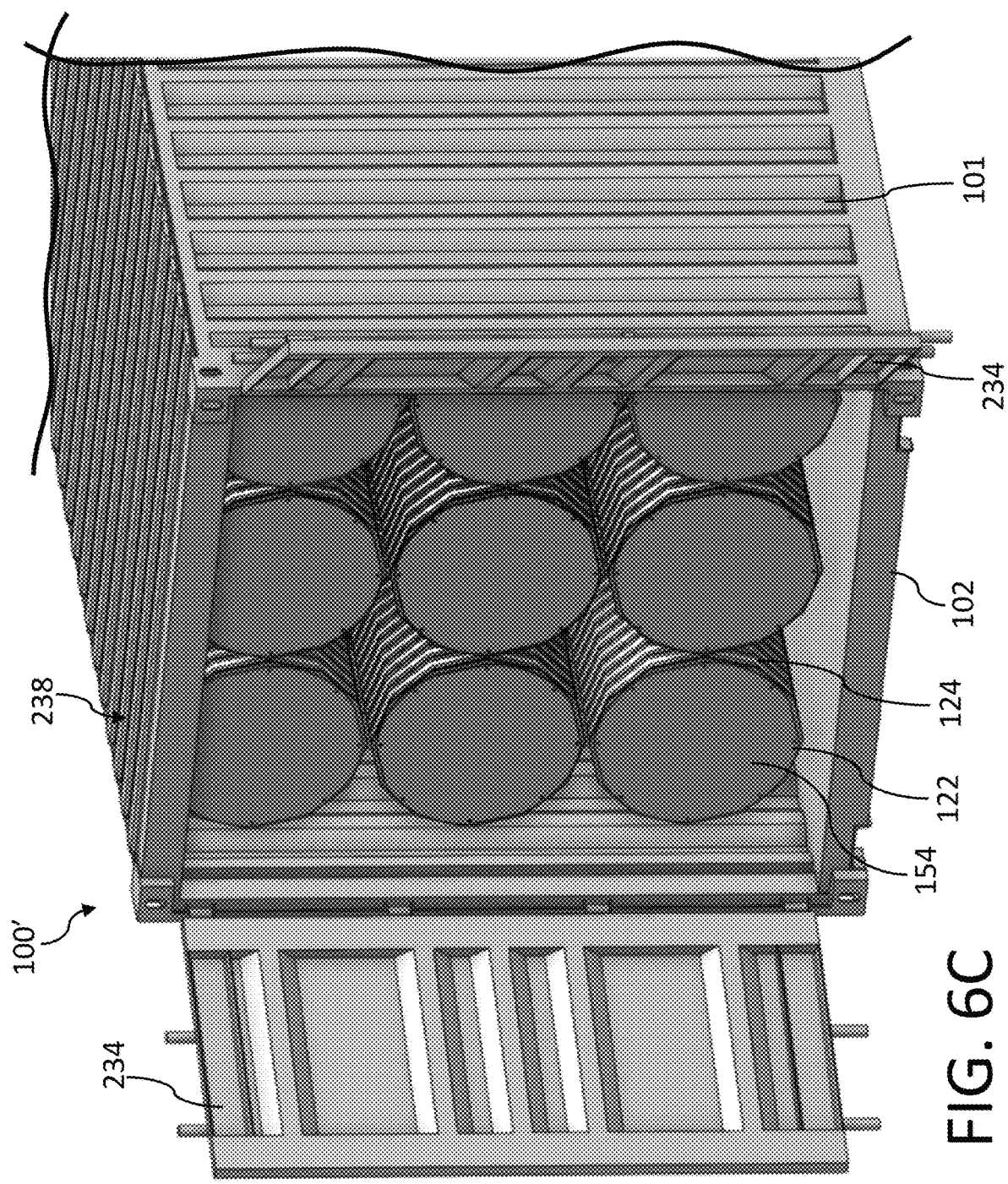
FIG. 6C illustrates a second end of a carbon capture vessel with the container doors 234 open, according to one or more embodiments of the present disclosure.

FIGS. 6A-6C illustrate another embodiment of a carbon capture vessel 100', according to one or more embodiments of the present disclosure. The embodiment of the carbon capture vessel 100' shown in FIGS. 6A-6C is similar to the embodiments described in reference to FIGS. 1A-5B. However, in the embodiment shown in FIGS. 6A-6C, the container 101 includes one or more shipping containers such that the container 101 is disposed around one or more subcontainers 124. The shipping containers may be referred to as intermodal containers and may be built for intermodal freight transport that can be used across different modes of transport, from ship to rail to truck or rail to truck. When the shipping containers are used as the container 101 in the carbon capture vessel 101', the shipping containers may be stackable, allowing multiple containers 101 with one or more subcontainers 124 disposed therein to be stacked on top of each other, as described in more detail below.

The container 101 may have doors 234 on either end 102, 104 that may be opened to allow fluid flow through the container 101 or closed to prevent fluid flow through the container 101. In some embodiments, the fan 106 may not be coupled and instead may be placed inside the container 101, upstream of one or more sorbent subcontainers 124 at some distance. The fan 106 may be moveable or may be stationary. In some embodiments, a reducer 160, a housing 190, and/or fan reducer may not be used. In such embodiments, the gap between the interior circumference of the container 101 and the exterior circumference of the fan 106 and the gap between the interior circumference of the container 101. The first end 120 of the outer sidewall 126 of each sorbent subcontainer 124 may be sealed by any reasonable method to direct the air moved by the fan 106 into hollow interior 158 of one or more sorbent subcontainers 124. For example, a first plate 132 may extend over the second annulus 130 between the inner sidewall 128 and outer sidewall 126 of each subcontainer 124. The first plates 132 of each subcontainer 124 may be connected such that each plate 132 comprises a single sheet. In some embodiments, there may be a first set 236 of subcontainers 124 coupled to a second set 238 of subcontainers 124. The first ends 120 of the outer sidewalls 126 of the second set 238 may be coupled to the second ends 122 of the outer sidewalls 126 of the first set 236. In some embodiments, the first ends 134 of the inner sidewalls 128 of the second set 238 may be coupled to the second ends 136 of the inner sidewalls 128 of the first set 236. The second ends 122, 136 of the second set 238 of subcontainers 124 may include second plates 154 that cover both the second end 122 of the outer sidewall 126 and the second end 136 of the inner sidewall 128 of each subcontainer 124. As with the embodiments described in reference to FIGS. 1A-5B, the fan 106 and first plates 132 may direct the air into the hollow interior 158 of the inner sidewall 128 of each subcontainer 124. The plates 132, 154 may then direct the air such that it moves laterally through the second annulus 130 (and the sorbent material therein) and through the outer sidewall 126. The sidewall of the container 101 then redirects the air longitudinally out of the second end 104 of the container 101.

The Sorbent Material Sub Container

Figure 7A:
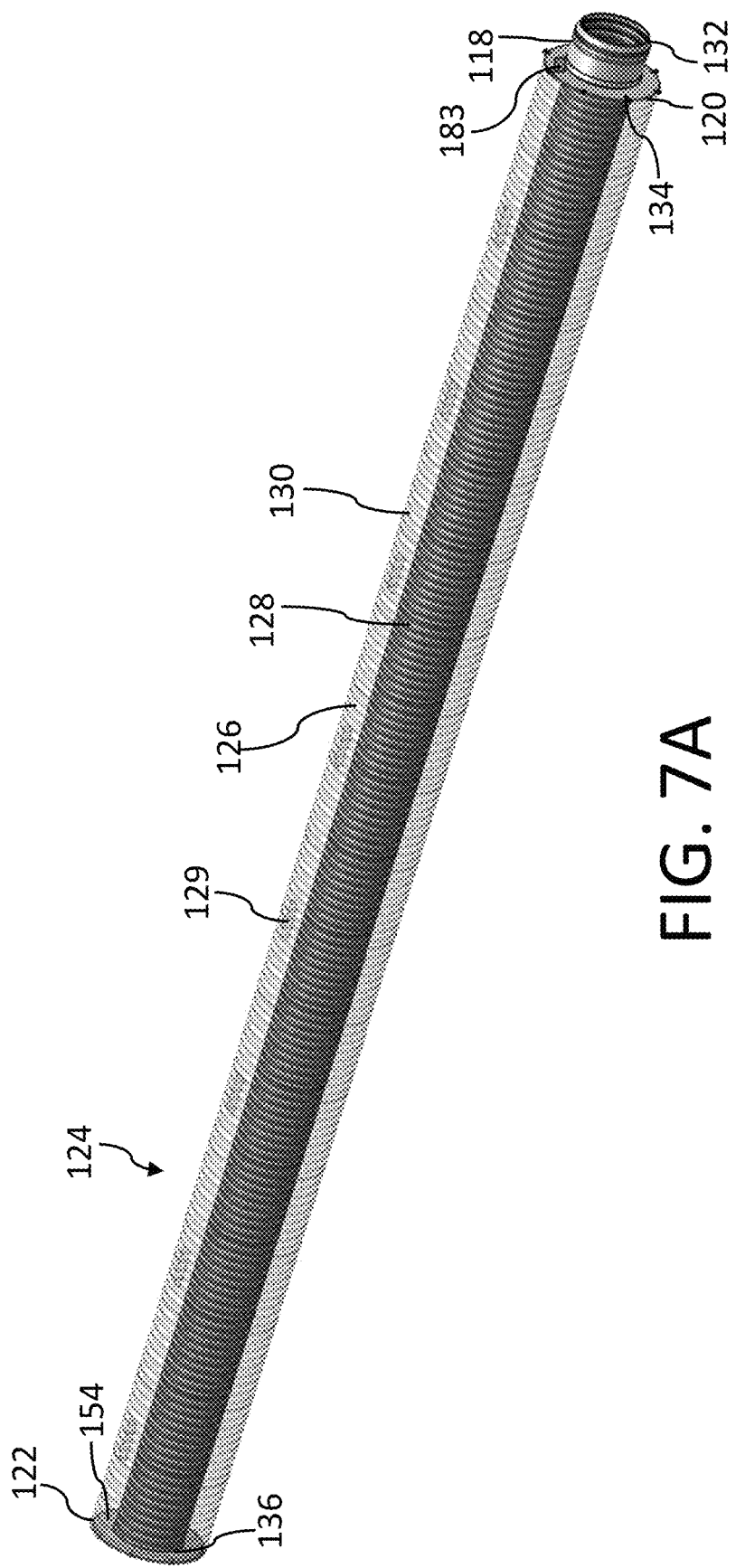
FIG. 7A illustrates a perspective view of the subcontainer with transparent outer sidewall of the subcontainer, according to one or more embodiments of the present disclosure.
Figure 7B:
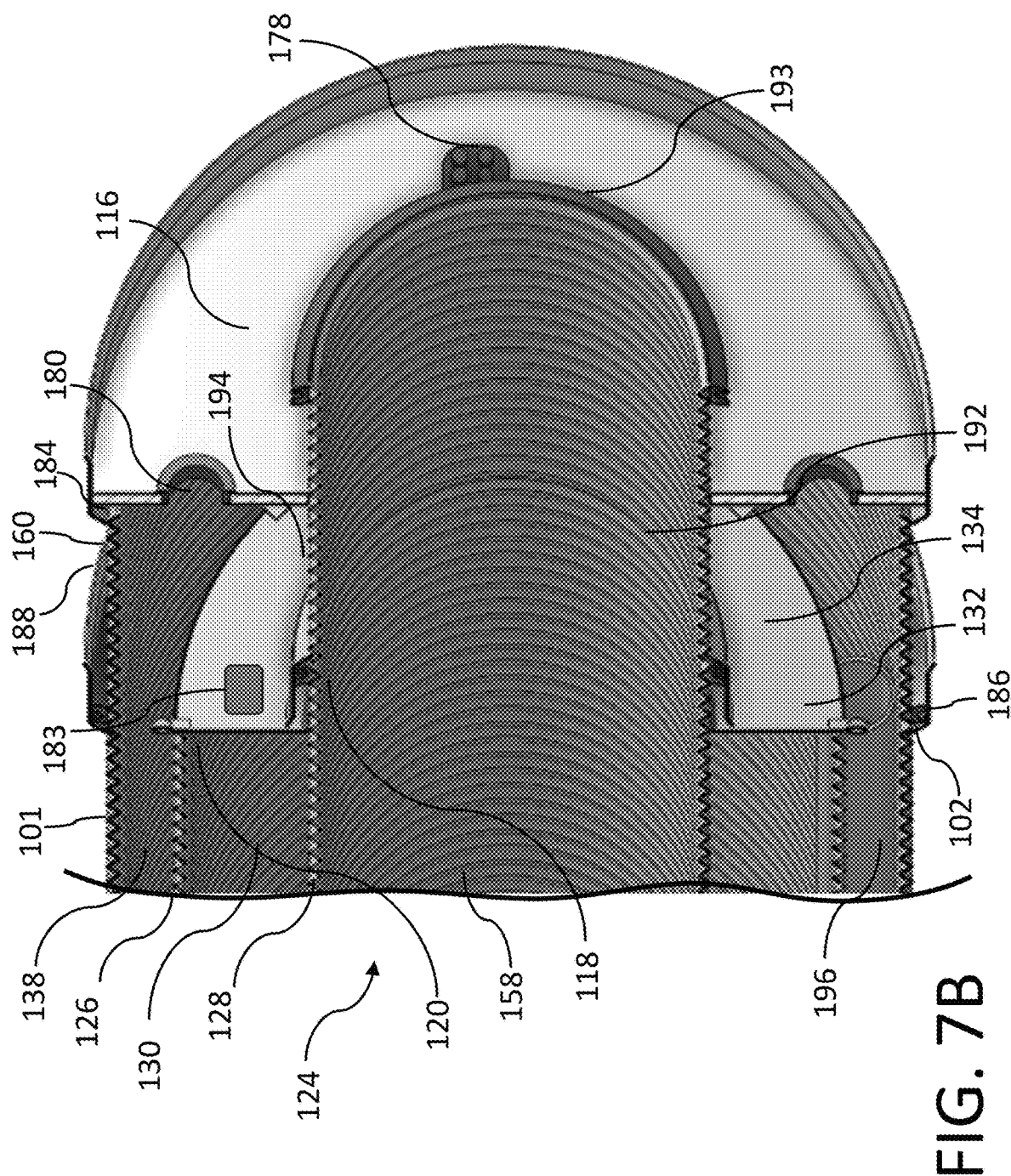
FIG. 7B illustrates a perspective cut-away view of the carbon capture vessel without valves along the 7-7 line shown in FIG. 3A, according to one or more embodiments of the present disclosure.
Figure 7C:
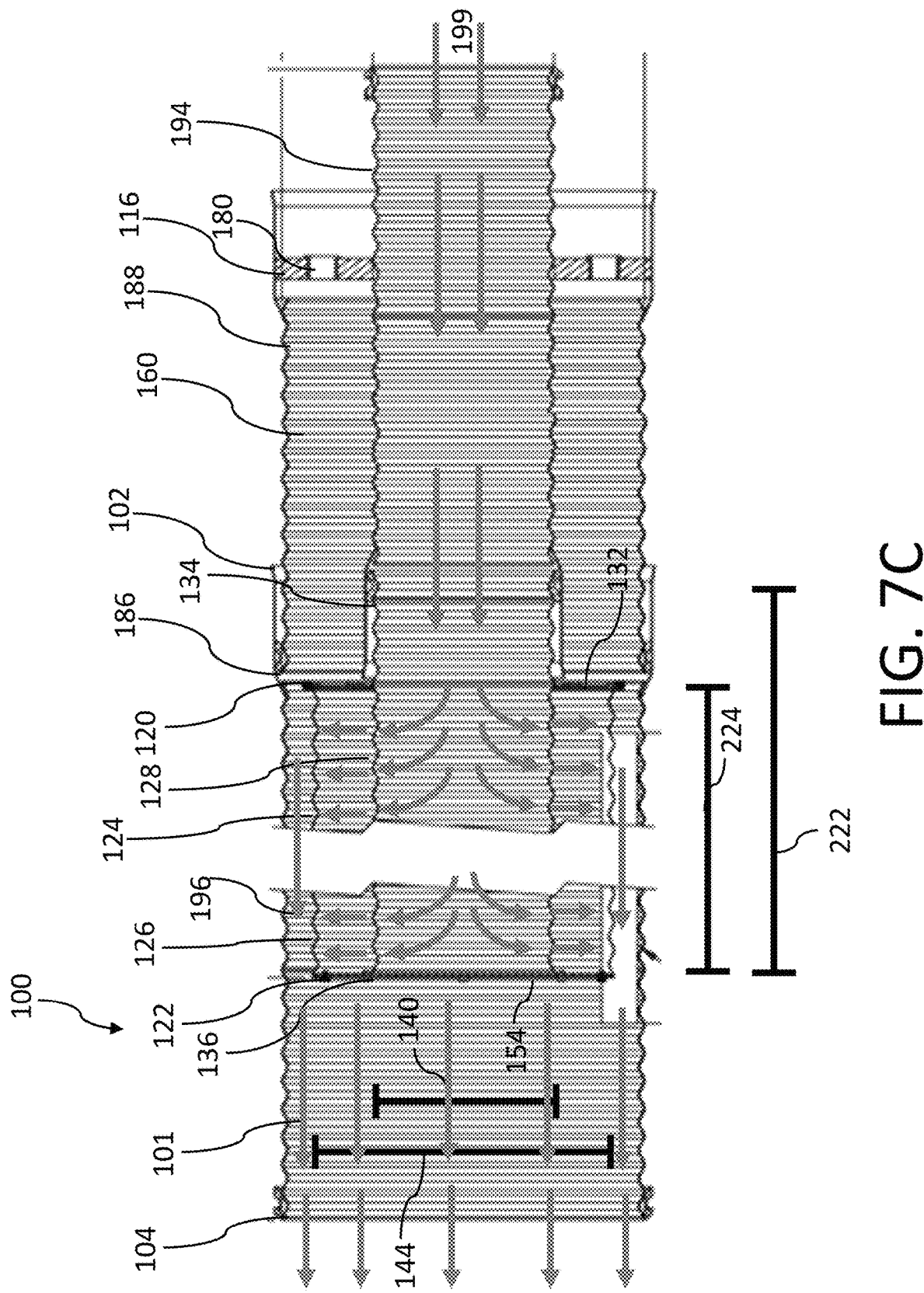
FIG. 7C illustrates a cross sectional view of the cross-section taken along the 7-7 line shown in FIG. 3A, according to one or more embodiments of the present disclosure.

FIGS. 7A-6C illustrate various views of the subcontainer 124, according to one or more embodiments of the present disclosure. FIG. 7A illustrates a perspective view of the subcontainer 124 with a transparent outer sidewall 126. FIG. 7B illustrates a perspective cut away view of the subcontainer 124 disposed within the hollow interior of the container 101 and coupled to the inner sidewall 194 and outer sidewall 188 of the reducer 160. FIG. 7C illustrates a cross-sectional view of the carbon capture vessel 100 without the valves 108, 164 along the 7-7 line shown in FIG. 3A.

As described above, the sorbent material subcontainer 124 is disposed within the hollow interior of the container 101. There may be a first gap or annulus 138 disposed between the outer sidewall 126 and the container 101. There may be a second gap or annulus 130 disposed between the inner sidewall 128 and the outer sidewall 126. A sorbent material may be disposed within the second subcontainer annulus 130 through apertures 129 in the outer sidewall 126, as described in more detail below.

The outer sidewall 126 and the inner sidewall 128 may both have apertures, openings, or perforations (not shown). The perforations may have dimensions smaller than the dimensions of the sorbent material. This may allow fluid flow through the perforations while preventing the sorbent material from moving out of the second annulus 130. For example, the perforations may have a first width and the sorbent material may have a second width larger than the first width. In some embodiments, the protruding portion 118 of the inner sidewall 128 may not include perforations.

In some embodiments, a first plate 132 is disposed on the first end 120 of the outer sidewall 126. The first plate 132 may extend from the inner sidewall 128 to the first end 120 of the outer sidewall 126 across the second annulus 130. In some embodiments, the first plate 132 may allow fluid flow from the second annulus 130. In some embodiments, the first plate 132 may prevent fluid flow into the second annulus 130. In some embodiments, a small opening 183 may be disposed on the first plate 132 to run electrical cables and instrumentation wiring (not shown in FIG. 7A-7C) through the first plate 132. The electrical cables/wiring may be related to instrumentation and may be electrically coupled to a heating element 142 disposed around the inner sidewall 128 (not shown in FIG. 7A-7C). In some embodiments, the first plate 132 may close, seal, or plug the second annulus 130.

In some embodiments, a second plate 154 is disposed on the second end 122 of the outer sidewall 126. The second plate 154 may also cover the outer sidewall 126 and hollow interior 158 if the second end 136 of the inner sidewall 128 is aligned with the second end 122 of the outer sidewall 126. Thus, the second plate 154 may extend across both the second annulus 122 and the hollow interior 158. Thus, the entire second end 122, 136 of the subcontainer 124 may be covered by the second plate 154. In some embodiments, the second plate 154 may prevent fluid flow out of the second end 122, 136 of the sorbent material subcontainer 124. In some embodiments, the second plate 158 may prevent fluid flow out of the hollow interior 158 of the sorbent material subcontainer 124 and allow fluid flow out of the second annulus 130. In some embodiments, the second plate 154 may close, seal, or plug the second end 122, 136.

This arrangement of the first plate 132 and second plate 154 may direct fluid flow through the carbon capture vessel 100. For example, fluid flow 199 through the carbon capture vessel 100 may be illustrated by the arrows in FIG. 7C.

The fan 106 may direct fluid flow into the reducer 160 and then into the open first end 134 of the hollow interior 158 of the subcontainer 124. In some embodiments, the seal 116 prevents (or minimizes) fluid flow from entering the container 101 and, thus, the first annulus 138 between the outer sidewall 126 and the container 101.

Thus, the fan 106 may direct fluid flow through the first end 134 of the hollow interior 158 such that the fluid flows generally longitudinally along the length of the subcontainer 124. Because the second end 136 of the hollow interior 158 is plugged or closed by the second plate 154, the fluid flow is directed outward axially through the perforations in the inner sidewall 128. Similarly, because the first end 120 and the second end 122 of the second annulus 130 may be plugged or closed by the first plate 132 and the second plate 154, respectively, the fluid flow is also directed outward axially through the perforations in the outer sidewall 126. The sidewall of the container 101 may then redirect the fluid flow such that it flows longitudinally along the length of the container 101 towards the second end 104 of the container 101 along the outer surface of the outer sidewall 126 of one or more subcontainers 124. When the container valve 108 is in an open position, the fluid may flow out of the second end 104 of the container 101. One embodiment of the air flow through the carbon capture vessel 100 is illustrated by the arrows in FIG. 7C.

During the regeneration process, the container valve 108 and reducer valve 164 may be closed and the carbon dioxide in the sorbent material may be released, as described in more detail below. During this process, the carbon dioxide released may move from the second annulus 130 outward through the openings or perforations in the outer sidewall 126. The released carbon dioxide may then move longitudinally through the container 101 towards the first end 102 along the outer surface of the outer sidewall 126 of one or more subcontainers 124. The released carbon dioxide may flow through the holes 180 in the seal 116 of the reducer 160 and out of the carbon capture vessel 100. In some embodiments, there may be a pipe or hose that connects to a hole 180 in the seal 116. Thus, the released carbon dioxide may move through the hole 180 in the seal 116 through the pipe or hose. In some cases, the pipe or hose may extend through the access opening 182 in the housing 188 such that the carbon dioxide can be delivered to another location and collected.

In this way, the fluid is directed axially through the sorbent material disposed in the second subcontainer annulus 132. Due to surface area amplification of the perforated inner sidewall 128 relative to the cross-sectional area of hollow interior 158, the air speed through the sorbent material is reduced by a factor equal to the reciprocal of the area amplification. This may allow for increased contact between the fluid and the sorbent material, which may increase the amount of carbon dioxide removed from the fluid relative to the amount of carbon dioxide advected through the sorbent material, as described in more detail below.

The subcontainer 124 may be an elongated vessel. In some embodiments, such as the illustrated embodiment, the subcontainer 124 may be a cylinder. However, in other embodiments, the subcontainer 124 may be rectangular, hexagonal, ovular, or any other suitable shape. In some embodiments, the subcontainer 124 may be the same shape as the container 101. In some embodiments, the subcontainer 124 and the container 101 may be different shapes. In some embodiments, the outer sidewall 126 and the inner sidewall 128 may be the same shape and, in other embodiments, they may be different shapes.

The subcontainer 124 may have any suitable dimensions. For example, the inner sidewall 128 of the subcontainer 124 may have a length 224 in a range of 1 ft to 160 ft. In some embodiments, the inner sidewall 128 may have a length 224 of approximately 1 ft, 5 ft, 10 ft, 20 ft, 30 ft, 40 ft, 50 ft, 60 ft, 70 ft, 80 ft, 90 ft, 100 ft, 110 ft, 120 ft, 130 ft, 140 ft, 150 ft or, 160 ft. In some embodiments, the inner sidewall 128 may have a length 224 of 40 ft. The inner sidewall 128 may have a diameter 140 in a range of 0.1 ft to 5 ft. In some embodiments, the inner sidewall 128 may have a diameter 140 of 0.1 ft, 0.5 ft, 1 ft, 1.5 ft, 2 ft, 2.5 ft, 3 ft, 3.5 ft, 4 ft, 4.5 ft, of 5 ft. In some embodiments, the inner sidewall 128 may have a diameter 140 of 1.5 ft.

Additionally, the outer sidewall 126 of the subcontainer 124 may have a length 222 in a range of 1 ft to 160 ft. In some embodiments, the outer sidewall 126 may have a length 222 of approximately 1 ft, 5 ft, 10 ft, 20 ft, 30 ft, 40 ft, 50 ft, 60 ft, 70 ft, 80 ft, 90 ft, 100 ft, 110 ft, 120 ft, 130 ft, 140 ft, 150 ft or, 160 ft. In some embodiments, the outer sidewall 126 may have a length 222 of 39 ft. The outer sidewall 126 may have a diameter 144 in a range of 0.1 ft to 6 ft. In some embodiments, the outer sidewall 126 may have a diameter 144 of 0.1 ft, 0.5 ft, 1 ft, 1.5 ft, 2 ft, 2.5 ft, 3 ft, 3.5 ft, 4 ft, 4.5 ft, 5 ft, 5.5 ft or 6 ft. In some embodiments, the outer sidewall 126 may have a diameter 144 of 2.5 ft.

The subcontainer 124 may include any suitable material. For example, the subcontainer 124 may include a perforated galvanized steel corrugated metal pipe or a perforated galvanized sheet metal.

The carbon capture vessel 100 may further include a heating element 142. The heating element 142 may be configured to heat the sorbent material disposed in the second annulus 158 and the subcontainer 124.

The heating element 142 may be arranged to provide heat to the sorbent material in the subcontainer 124. In some implementations, the heating element 142 may be disposed in the first annulus 138 between the outer sidewall 126 of the subcontainer 124 and the container 101. In some embodiments, the heating element 142 contacts an outer surface of the outer sidewall 126. In yet other implementations, the heating element is disposed within the second annulus 130. In some embodiments, the heating element 142 contacts an outer surface of the inner sidewall 126 and the sorbent material. In some embodiments, the heating element 142 contacts an outer surface of the inner sidewall 126, outer sidewall 128 and the sorbent material.

In some implementations, the heating element 142 may be coiled or wrapped around one or more sidewalls of the sorbent material subcontainer 124. The heating element may generate heat by applying an electric current to the heating element, flowing heated liquids through the heating element, or using other heating methods. In some embodiments, the heating element 142 may be coiled or wrapped around the circumference of one or more sidewalls 126, 128 of the subcontainer 124. Because the subcontainer 124 may be a significant length, some implementations employ multiple independent heating zones that may be disposed side by side along the length of the subcontainer 124. These may operate in parallel to provide heat to the sorbent material in a particular the zone of subcontainer 124. In some embodiments, the heating element 142 may be an electric heating coil. In some embodiments, the heating element 142 may be a pipe or tubing loop of a certain diameter to flow heated liquids at rate sufficient to regenerate the sorbent. In some embodiments, the heating element 142 may be an electric heat cable. In some embodiments, a self-regulated electric heat cable is coiled or wrapped around one or more sidewalls 126, 128 of the subcontainer 124 in a manner to maximize the heat flux to the sorbent material and to allow fluid flow between each circumferential wrap into and out of the second annulus 130. In some embodiments, constant wattage electric heat cable is coiled or wrapped around one or more sidewalls of the subcontainer 124 in a manner to maximize the heat flux to the sorbent material and to allow fluid flow between each circumferential wrap into and out of second annulus 130. In some embodiments, mineral insulated electric heat cable is coiled or wrapped around one or more sidewalls 126, 128 of the subcontainer 124 in a manner to maximize the heat flux to the sorbent material and to allow fluid flow between each circumferential wrap into an out of second annulus 130. In some embodiments, temperature sensors are disposed in the subcontainer 124. In some embodiments, temperature sensors contact the sorbent material in the second annulus 130 and/or one or more sidewalls 126, 128 of the subcontainer 124. In some embodiments, a controller is used to regulate power flow to each heating zone based on temperature readings of one or more temperature sensors connected to each heating zone.

In some embodiments, the subcontainer 124 may be removeable from the carbon capture vessel 100. Thus, the subcontainer 124 may be removed from the container 101 and a new subcontainer 124 may be inserted. This may allow the sorbent material to be replaced or redressed. In other embodiments, the second plate 154 that covers the hollow interior 158 is removeable. Thus, the sorbent material can be steam cleaned and redressed with fresh amines in situ by removing the second plate 154 that covers the hollow interior 158. In situ amine redressing may include spraying hot amines around the inner circumference of hollow interior 158 and/or around the outer sidewall 128 of subcontainer 124, as described in more detail below.

In some embodiments, there may be apertures 129 extending through the outer sidewall 126. During assembly, sorbent material may be inserted into the second annulus 130 through these apertures 129. Once the sorbent material is loaded, the apertures 129 may be covered or closed.

Figure 7D:
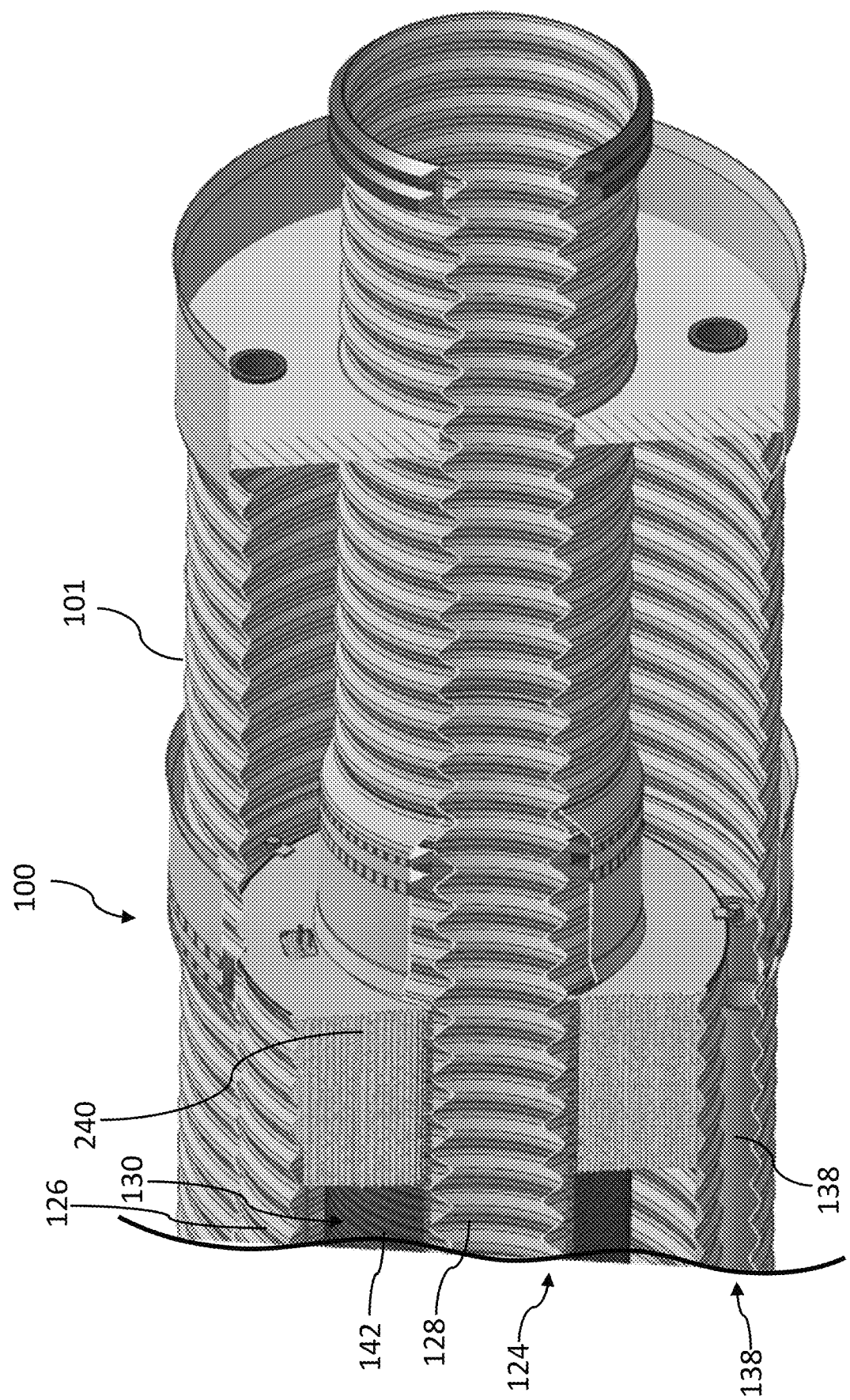
FIG. 7D illustrates a cross-section of the carbon capture vessel 100 along a portion of a line parallel to the 7-7 line shown in FIG. 3A, according to one or more embodiments of the present disclosure.

FIG. 7D illustrates a cross-section of a portion of the carbon capture vessel 100 along a portion of the 7-7 line shown in FIG. 3A, according to one or more embodiments of the present disclosure. The carbon capture vessel 100 includes the container 101 with the subcontainer 124 disposed therein. The subcontainer 124 includes an outer sidewall 126 and an inner sidewall 128 disposed therein. There is a first annulus 138 disposed between the sidewall of the container 101 and the outer sidewall 126 of the subcontainer 124 and a second annulus 130 disposed between the outer sidewall 126 and the inner sidewall 128 of the subcontainer 124. A sorbent material 240 is disposed within the second annulus 130 between the inner sidewall 128 and the outer sidewall 126. The inner sidewall 128 and outer sidewall 126 each have one or more perforations or apertures (not shown). In some examples, a size of the apertures is less than a size of the sorbent material 240 such that the sorbent material does not move out of the second annulus 130 through the apertures. For example, the apertures may have a first width and the sorbent material 204 may have a second width larger than the first width. In some examples, the sorbent material can be introduced through the holes into the second annulus 130. In the example in FIG. 7D, the sorbent material is shown only in a portion of the second annulus 130 for convenience. However, it may also extend axially through the complete subcontainer 127.

In this implementation, a heating element 142 is shown disposed in the second annulus 130 about the inner sidewall 128. The heating element 142 is discussed further below. Although the sorbent material 240 is disposed within the subcontainer 124 radially outward of the heating element, the sorbent material 240 may envelope or surround the heating element 142. Furthermore, the heating element may be within the second annulus 130 and spaced apart from the inner sidewall 128. For example, the sorbent material may be centrally disposed in the second annulus, may be disposed adjacent the outer sidewall 126, or otherwise spaced within the second annulus 130.

This example includes supports (shown as axially extending tubes or frames) that support and axially center the subcontainer. However, the subcontainer could be centered using other methods or devices.

The Sorbent Material

The sorbent material subcontainer 124 is filled with a sorbent material capable of adsorbing carbon dioxide or another chemical. The sorbent material may also be referred to collectively as an adsorbent porous media. The carbon capture vessel 100 is designed to be agnostic to the type of sorbent material selected for use. Certain characteristics are nonetheless preferred for use in the atmospheric carbon dioxide removal to facilitate efficient advection, contact, and capture of carbon dioxide and to facilitate efficient delivery of heat to regenerate the sorbent and release carbon dioxide for utilization or sequestration.

A preferred characteristic of the sorbent material is one with high specific surface area, high specific porosity and high mesoporosity (a pore size distribution weighted to pores with diameters between 2 and 50 nanometers). These characteristics lead to sorbents with proven working capacities of greater than 1 mmol of carbon dioxide per gram of sorbent for DAC.

Another preferred characteristic is the sorbent material's mechanical integrity, uniformity and design specificity. For example, a robust sorbent material capable of withstanding humid bulk air flows and a large temperature swing across tens of thousands of regeneration cycles is preferred. In addition, a sorbent material that includes a hierarchical pore structure (a pore size distribution with diameters greater or less than the diameters in the mesoporosity range) that can be engineered into uniform shapes (to reduce pressure drop in a fixed bed) or molecularly tuned (to optimize surface area, pore volume and pore size distribution) may be desirable.

Another preferred characteristic of a sorbent material is its form factor. A desirable form factor of a sorbent material may be one with high relative permeability to air, to improve the carbon dioxide advection flux across it per unit pressure drop, to minimize bulk airflow energy used and to increase adsorption by fast diffusion into or onto the sorbent material. To achieve this, the sorbent material may be supported by or be a functional embodiment of metal organic frameworks (MOFs), zeolites, monoliths, hollow tubes, activated carbon, fibrous sheets, fibrous matter, packed beds, sand, porous polymer networks, and/or other materials. Another ideal form factor of a sorbent material is one with a high thermal conductivity and low specific heat, the former to reduce the time needed to regenerate the sorbent with a given source of heat, and the latter to reduce the thermal energy penalty of regeneration.

Another preferred characteristic of a sorbent material is one that promotes a high contact efficiency between the bulk flow of air and the surface of the sorbent material. The contacting system inside the sorbent material subcontainer 124 is a conventional fixed bed configuration (comprised of random packed pellets, uniformly sized spherical beads, or structured material elements derived from parallel flow monoliths, hollow fibers, or other geometrically arranged structured packing materials). A contacting system that orients air flow parallel to structured fixed bed walls may result in laminar flow and low pressure drop at the expense of carbon dioxide slippage and low contact efficiency. Conversely, a contacting structure that orients air flow perpendicular to the sorbent material may result in high contact efficiency from tortuous flow through the packed bed, at the expense of pressure drop at higher air speeds. An adsorbent porous media that makes use of a radial flow air contactor such as the carbon capture vessel 100 may result in lower air speeds through the sorbent material and enable laminar flow at low pressure drop and high contact efficiency from tortuous flow. Another preferred characteristic of a contacting system is one that can efficiently contact a large mass of sorbent material for a given bulk air flow rate, to lengthen the adsorption cycle time and maximize the mass of carbon dioxide released per cycle. Such a characteristic minimizes the specific heat energy penalty per unit mass of carbon dioxide that is associated with heating the sorbent material, captured carbon dioxide, co-captured water and the contactor system.

Another preferred characteristic of a sorbent material is one that can be supplied at low cost and can capture carbon in an energy efficient reversible process, as measured by uptake capacity, kinetics, carbon dioxide selectivity over other gases, binding energy, regeneration energy, and extended cyclability. Amines (i.e., ammonia derivatives in which one, or more hydrogen atoms are replaced by an organic radical) are well known for having high selectivity and kinetics to chemically bind carbon dioxide to it in a reversible process. The a mature application of an amine-based process may be the absorption of carbon dioxide from anaerobic oil and gas production flow streams using liquid amine solutions. Another proven application of amine-based absorption involves separating carbon dioxide from post-combustion flue gasses for utilization or sequestration. Post-combustion carbon capture processes do, however, suffer operationally from corrosion, oxidative amine degradation issues and a large regeneration energy penalty related to heating the water in liquid amine solutions.

Another application of an amine-based process is one that physically or chemically adsorbs carbon dioxide from the atmosphere onto the surface of a sorbent material. The benefit of this approach is a lower regeneration energy penalty and potentially lower cost of operations. In some embodiments, amines are physically impregnated into or onto the surface of the underlying porous media support structure to improve carbon dioxide selectivity. In other embodiments, the adsorbent porous media may be of an amino polymer composition or may be prepared by grafting amine materials onto the support structure.

One example of an amine impregnation process in the current art involves several steps: First, porous solid materials are washed with methanol and dried overnight in an oven at 100° C. Then, the porous solid materials are mixed with methanol and kept under stirring for one hour. Next, methanol is mixed with a specific amount and type of amine, for example, low molecular weight polyethyleneimine ("PEI"), and the resulting mixture is stirred for one hour. Next, the PEI-methanol solution is then added to the porous solid material-methanol solution and stirred for another hour. Next, the resulting PEI impregnated porous solid material is dried using a rotating evaporator at 50° C. under vacuum and a pressure of 100 mbar. Next, the resulting PEI impregnated porous solid materials are subsequently dried in a vacuum oven at 60° C. overnight. Finally, the resulting PEI impregnated porous solid materials are weighed and the PEI loading is calculated and recorded.

There are many environmental and safety challenges related to using solvents to make a sorbent material at industrial scale. Water based approaches may be one solution to these challenges, however, due to the high viscosity of PEI at ambient conditions, PEI loading onto a porous solid material may be less than what can be achieved using a solvent based approach.

Figure 8:
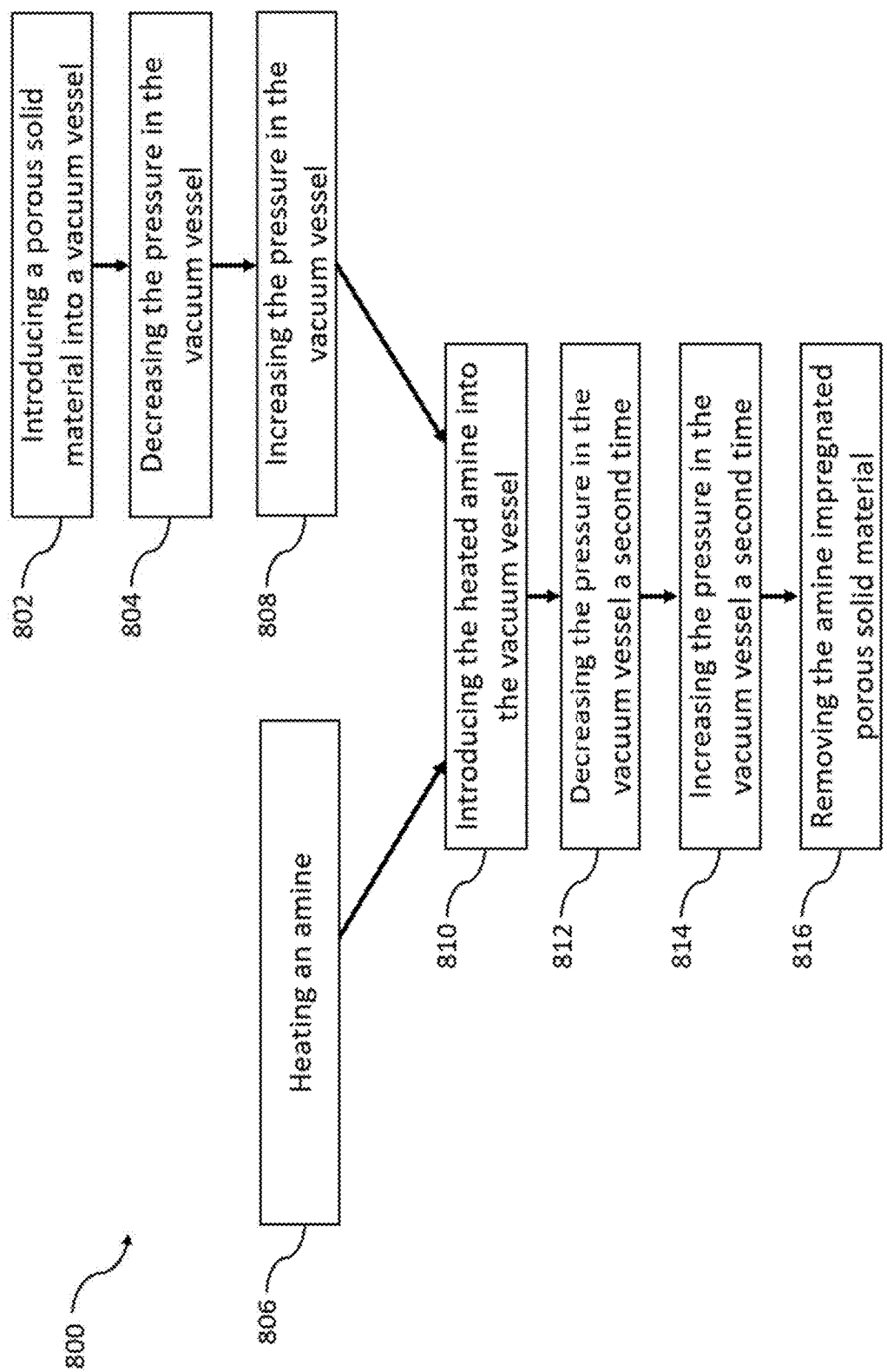
FIG. 8 illustrates a flow chart of a method for removing carbon dioxide from a fluid, according to one or more embodiments of the present disclosure.

FIG. 8 illustrates a hot impregnation method 800, according to one or more implementations of the present disclosure. The hot impregnation method 800 may not use a solvent or water to impregnate amines into or onto a porous solid material. The hot impregnation method 800 may include the step 802 of introducing a porous solid material into a vacuum vessel. The porous solid material may be dried or may not be dried.

Step 804 may include decreasing the pressure in the vacuum vessel. In some embodiments, step 804 may include pulling a vacuum in the vacuum vessel to a pressure below atmospheric pressure (which may be approximately 1 bar). In some embodiments, a vacuum may be pulled in the vacuum vessel until the pressure therein is approximately 200 mbar. In some embodiments, the vacuum may be held for a period of time. In some embodiments, the vacuum may be held for up to approximately one hour.

Step 806 may include heating the amine to be impregnated into or onto the porous sorbent material to a temperature below where oxidative degradation of the amine may occur. Step 806 may be performed to reduce the viscosity of the amine. For example, when PEI is used as the amine, the PEI may heated to 70° C. to reduce its viscosity by a factor of approximately forty relative to ambient temperatures without oxidative degradation.

Step 808 may include increasing the pressure in the vacuum vessel to atmospheric pressure (which may be approximately 1 bar).

Step 810 may include introducing the heated amine in a desired quantity, based on the pore volume of the porous solid material introduced into the vessel into the vessel to saturate the porous solid material. Step 806 may be performed simultaneously with steps 802, 804, and/or 808 such that the heated amine can be introduced into the vacuum vessel immediately after step 806 is completed. In some embodiments, the mixture of heated amine and porous solid material may be allowed to rest for a period of time. In some embodiments, the mixture may be allowed to rest for up to one hour.

Step 812 may include decreasing the pressure in the vacuum vessel. In some embodiments, step 812 may include pulling a vacuum in the vacuum vessel to a pressure below atmospheric (which is approximately 1 bar) for a second time. In some embodiments, the vacuum may be pulled in the vacuum vessel until the pressure therein is approximately 200 mbar. In some embodiments, the vacuum may be held for a period of time. In some embodiments, the vacuum may be held for up to approximately one hour.

Step 814 may include increasing the pressure in the vacuum vessel to atmospheric pressure (which is approximately 1 bar) a second time.

In some embodiments, steps 802-814 may be repeated one or more times.

Step 816 may include removing the amine impregnated porous solid material. In some embodiments, the excess amine is evacuated from the vessel. The amine impregnated porous solid material may then be removed and placed on drying racks to allow any residual amines on the surface or within the pores of the sorbent material to air dry or drip dry. After Step 816, the dried amine impregnated porous sorbent materials may be packaged for shipping. In some embodiments, the amine impregnated porous sorbent material may be used in any one of the carbon capture vessels 100 described herein.

The hot impregnation method as disclosed in this embodiment may reduce the viscosity of the absorbate (for example, the amine) by heating it, increase the adsorbate loading into or onto the adsorbent (for example, the porous solid material) by creating a vacuum pressure differential deep within the adsorbent's interstitial pore structure to aid adsorbate imbibition by capillary pressure, and improve the diffusion of air throughout the adsorbent's pore structure by creating a second vacuum pressure differential, in the vessel relative to the sorbent materials interstitial pore pressure to remove and flow any excess adsorbate that may plug the pores of the adsorbent. The hot impregnation method as disclosed in this embodiment may ultimately aid adsorption of carbon dioxide by fast diffusion onto amine impregnated porous solid materials by DAC without amine leaching, as described below, and without the environmental or safety concerns associated with amine impregnation processes used in the current art.

Although amines may improve the carbon capture characteristics of the sorbent material, the amines may leach out of the sorbent material and exit the carbon capture vessel 100. For example, as the air (or other fluid) flows through the sorbent material, the amines may be advected into the air. Amines may be considered pollutants. Thus, this amine leaching may be undesirable. The subcontainer 124 may decrease the amount of leached amines that are released back into the atmosphere by reducing the air speed through the sorbent material. As described in more detail below, the DAC structure may decrease the amount of leached amines that are released back into the atmosphere by concentrating the fluid that exits the second end 104 of the container 101 into a central air handling evacuation chamber to mitigate amine emissions into the atmosphere through a process that captures, recovers, and reutilizes amines, as described in more detail below.

However, the carbon capture vessel 100 may be designed to be agnostic to the type of sorbent material to be used, provided the sorbent material possesses the preferred characteristics.

In some embodiments, the adsorbent may include activated alumina, gamma alumina oxide, silicon dioxide, or any other suitable material. In some embodiments, the adsorbate may include low amine molecular weight PEI, or any other suitable amine or non-amine material. In some embodiments, the sorbent material may be activated alumina impregnated with low molecular weight PEI.

The sorbent material may have any suitable dimensions. For example, the sorbent material may have a diameter in a range of 2 mm to 2 in. The sorbent material may have a diameter of 2 mm, 1/8 in, 3/16 in, 1/4 in, 1/2 in, 3/4 in, 1 in, 1.25 in, 1.5 in, 1.75 in, or 2 in. In some embodiments, the diameter of the sorbent material may be 1/4 in.

Additionally, the sorbent material may be any suitable shape. In some embodiments, the sorbent material may be spherical. In other embodiments, the sorbent material may be cubic, a cylindrical, pyramidal, conic, or any other suitable shape.

Method for Operating the Carbon Capture Vessel

Figure 9:
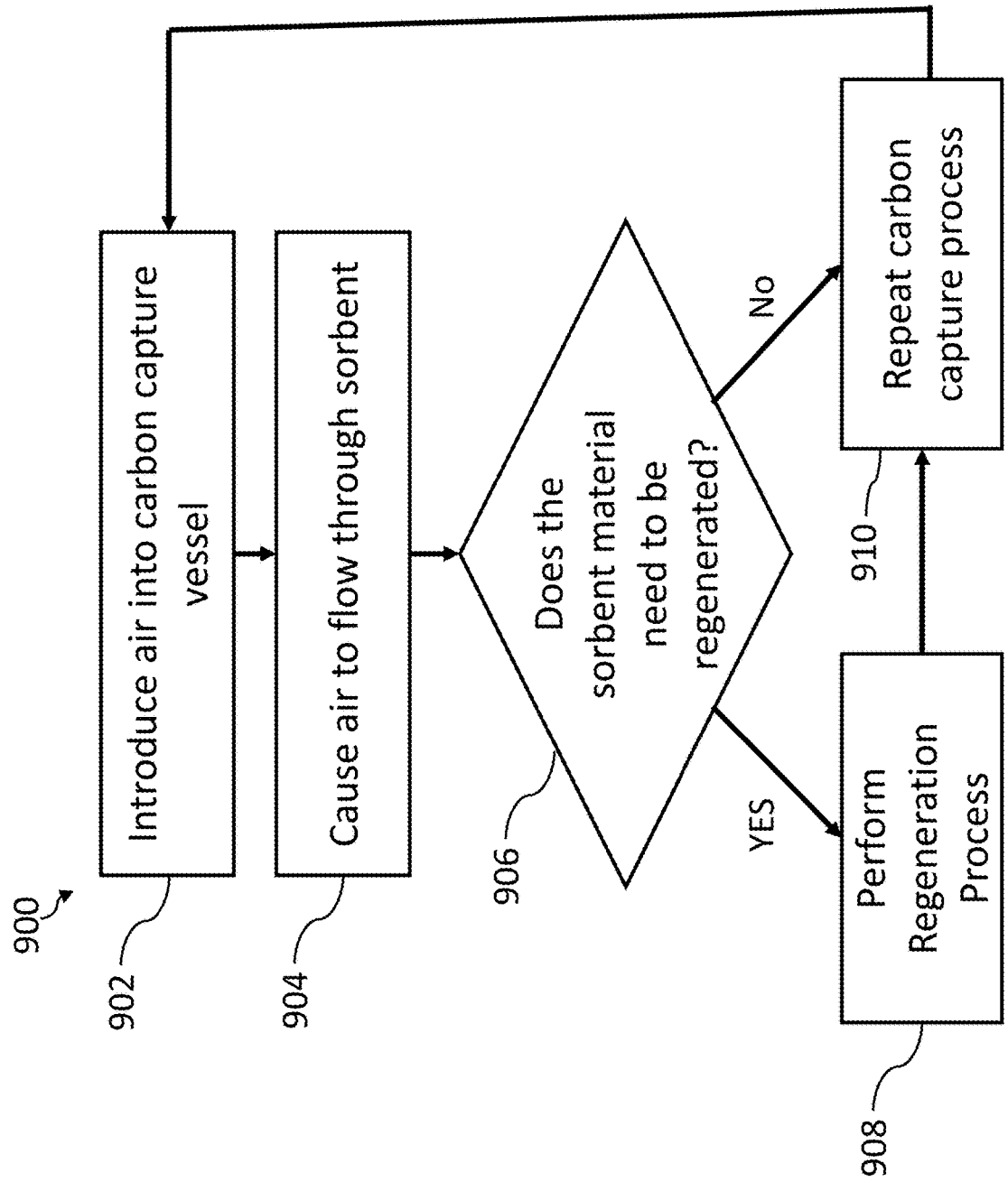
FIG. 9 illustrates a flow chart of a method for regenerating sorbent material, according to one or more embodiments of the present disclosure.

FIG. 9 illustrates a flow chart of a method 900 for removing carbon dioxide from a fluid, according to one or more embodiments of the present disclosure. In some embodiments, the fluid is atmospheric air. However, any suitable fluid can be used.

Step 902 of the method may include introducing air into the carbon capture vessel 100. The carbon capture vessel 100 may be the carbon capture vessel 100 described above in reference to FIGS. 1-7C. The reducer valve 164 on the inner sidewall 194 of the reducer 160 and the container valve 108 on the second end 104 of the container 101 may both be in the open position to allow air to flow through the carbon capture vessel 100. The fan 106 may direct air into a first end 134 of the hollow interior 158 of the subcontainer 124 via the reducer 160. For example, the fan 106 may direct air into interior of the inner sidewall 194 of the reducer 160, which is connected to the first end 134 of the inner sidewall 128 of the subcontainer 124, as described above. The air may move longitudinally along a length of the inner sidewall 128.

Step 904 of the method may include causing the air to flow through the sorbent material. As described above, the sorbent material may be disposed in the subcontainer 124 in the second annulus 130 between the inner sidewall 128 and the outer sidewall 126. Thus, as described above, the first plate 132 and second plate 154 may direct the air outward so that it moves axially through the sorbent material through the perforations in the inner sidewall 128 and the perforations in the outer sidewall 126. In some embodiments, the container 101 may redirect the air to move in the longitudinal direction along the length of the container 101 towards the second end 104. The air may then flow out of the second end 104 of the container 101.

When the air moves through the sorbent material, at least some of the carbon dioxide in the air may be captured, advected, or absorbed by the sorbent material. Thus, the air that exits the carbon capture vessel 100 may have a lower amount of carbon dioxide than the air that enters the carbon capture vessel 100.

Step 906 of the method 900 may include determining whether the sorbent material needs to be regenerated. This determination may be performed in any suitable way. For example, the percentage of carbon dioxide in the air exiting the carbon capture vessel 100 may be constantly or periodically measured. If the percentage exceeds a certain threshold, this may indicate that the sorbent material is in need of regeneration. In another embodiment, samples of the sorbent material may be removed periodically. If the percentage of carbon dioxide in the sorbent material exceeds a certain threshold, this may indicate that the sorbent material is in need of regeneration. In some embodiments, one or more sensors may be disposed within or proximate to the carbon capture vessel 100 to measure the amount of carbon dioxide in the air or sorbent material.

In some embodiments, sensors may be placed at multiple points in and/or adjacent to the carbon capture vessel 100. For example, there may be a first sensor that is configured to measure an amount of carbon dioxide in the air flowing into the carbon capture vessel 100 through the reducer 160. There may be a second sensor that is configured to measure an amount of carbon dioxide in the air flowing out of the second end 104 of the container 101. Thus, the first sensor may measure the amount of carbon dioxide in the atmospheric air entering the carbon capture vessel 100 and the second sensor may measure the amount of carbon dioxide in the "cleaned" air exiting the carbon capture vessel 100. These measurements may be used to determine a difference in the amount of carbon dioxide measured across a carbon capture vessel 100 may be used to infer, or calculate by conservation of mass principles, the amount of carbon dioxide adsorbed by the sorbent material in a carbon capture vessel 100 on a real time basis across from each carbon capture vessel 100.

If it is determined that the sorbent material is in need of regeneration in step 906, step 908 may be performed. Step 908 of the method 900 may include performing a regeneration process, as described in more detail below. After the regeneration process is performed in step 908, the process may move to step 910.

If it is determined that the sorbent material is in not need of regeneration in step 906, step 910 may be performed. Step 910 of the method 900 may include repeating the carbon capture process. Step 902 may then be performed.

Step 902 may be performed in any suitable amount of time depending on many factors. For example, step 902 may be performed in a range of 3 hr to 48 hrs. In some embodiments, step 902 may be performed in 3 hr, 4 hr, 5 hr, or any period of time up to 48 hrs. In some embodiments, step 902 may be performed in approximately 17 hrs.

Multiple ways of performing the regeneration process are contemplated. One embodiment of a regeneration process is illustrated in FIG. 10 and another embodiment is illustrated in FIG. 11.

Figure 10:
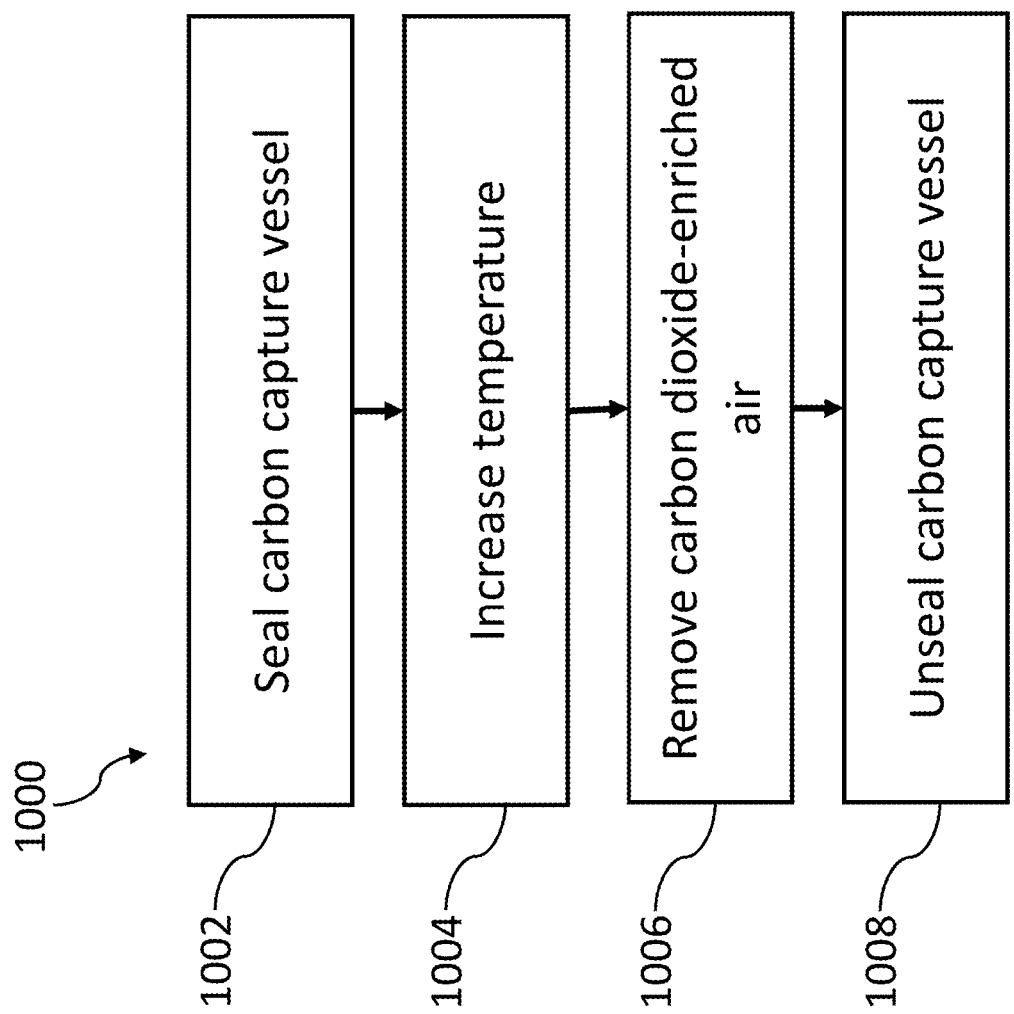
FIG. 10 illustrates a flow chart of a method for regenerating sorbent material, according to one or more embodiments of the present disclosure.
Figure 11:
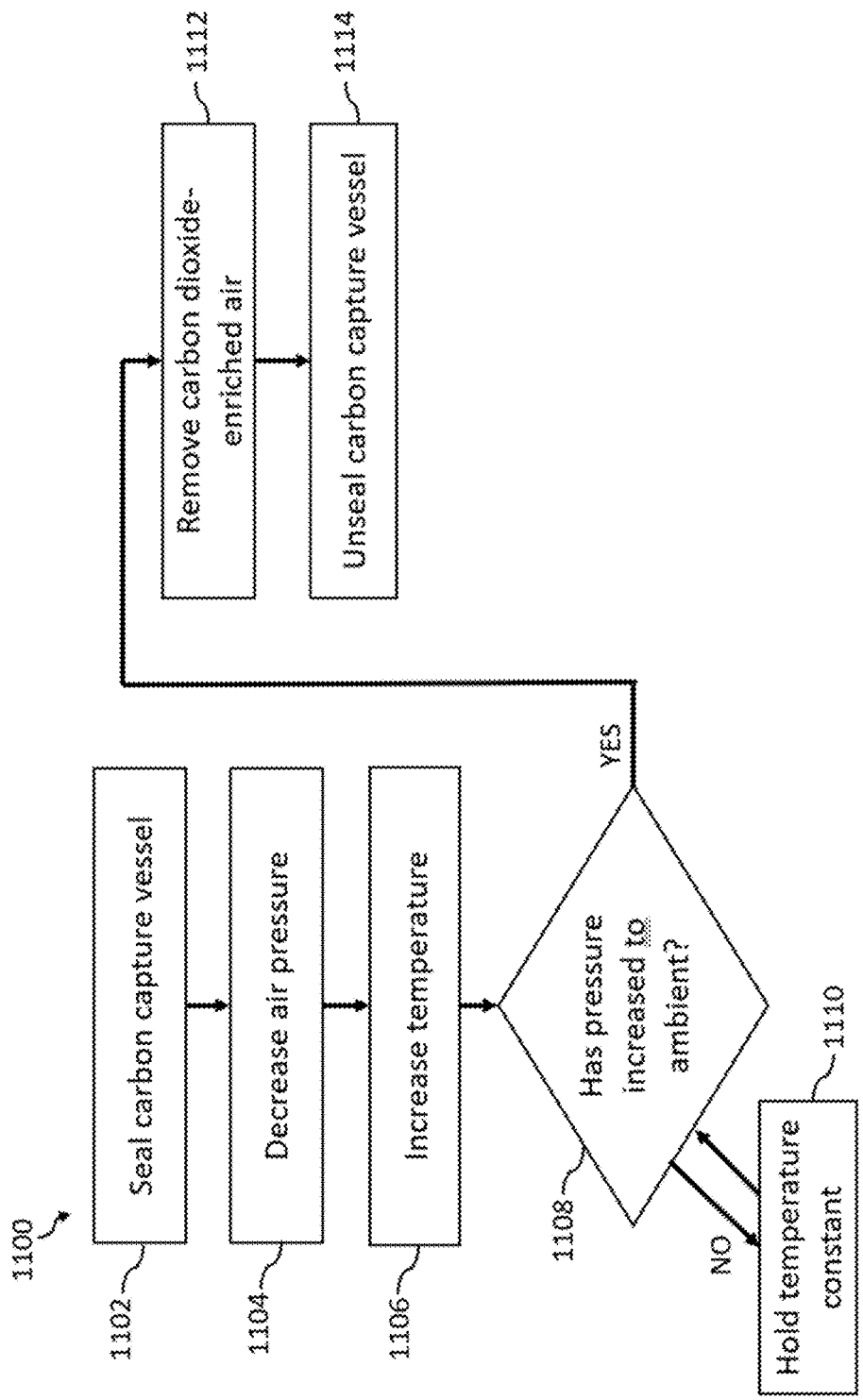
FIG. 11 illustrates a flow chart of another method for regenerating sorbent material according to one or more embodiments of the present disclosure.

FIG. 10 illustrates a flow chart of an embodiment of a method 1000 for regenerating the sorbent material, according to one or more embodiments of the present disclosure. The regeneration process 1000 may be performed at step 908 of the carbon capture process 900 described in reference to FIG. 9 above.

Step 1002 of the method 1000 may include sealing the carbon capture vessel 100. The carbon capture vessel 100 may be the carbon capture vessel 100 described above in reference to FIGS. 1-7C. The reducer valve 164 may be moved from the open position to the closed position so that air cannot flow into the carbon capture vessel 100. The reducer valve 164 may seal the inner sidewall 194 of the reducer 160, thus preventing air from moving into the inner sidewall 128 of the subcontainer 124. Other embodiments involving doors or lids may be used to seal the carbon capture vessel 100 or the first end 102 of the container 101.

Moreover, the container valve 108 may also be moved from an open position to a closed position so that air cannot flow out of the second end 104 of the container 101. The container door 108 may seal the second end 104 of the container 101. Other embodiments involving doors or lids may be used to seal the carbon capture vessel 100 or the second end 104 of the container 101.

Step 1004 of the method 800 may include increasing the temperature in the carbon capture vessel 100. The heating element 142 may be used to increase the temperature. In some embodiments, the heating element 142 may be particularly configured to heat the subcontainer 124 and/or the sorbent material disposed therein, as described in more detail above.

In some embodiments, the temperature may be increased to a value in a range of 25° C. to 120° C. For example, the temperature may be increased to 25° C., 30° C., 40° C., 50° C., 60° C., 70° C., 80° C., 90° C., 100° C., 110° C., or 120° C. or temperatures in between. In some embodiments, the temperature may be increased to a temperature in the range of 70° C. to 95° C.

Step 1004 may be performed in any suitable amount of time depending on the heating capacity of heating element 142 among other factors. For example, step 1004 may be performed in a range of 15 min to 6 hr. In some embodiments, step 1004 may be performed in 15 min, 30 min. 45 min, 1 hr, 1.5 hr, 2 hr, 2.5 hr, 3 hr, 3.5 hr, 4 hr, 4.5 hr, 5 hr, 5.5 hr, or 6 hr. In some embodiments, step 1004 may be performed in approximately 3 hr.

Step 1004 may also include activating the heating element 142 in response to a measured temperature. For example, if the temperature in the carbon capture vessel 100 decreases below a certain threshold, then the heating element 142 may be activated to increase the temperature. In some embodiments, the heating element 142 is constantly activated to precisely regulate the regeneration temperature.

Step 1006 may include removing carbon dioxide-enriched air from the carbon capture vessel 100. In some embodiments, the holes may allow the carbon dioxide to move from an area of high pressure within the heated subcontainer 124 to a lower pressure area outside of the carbon capture vessel 100. Thus, when heated, the released carbon dioxide will naturally move outward from the second annulus 130 through the perforations or openings in the outer sidewall 126 of the subcontainer 124 and into the first annulus 138 between the outer sidewall 126 and container 101. The carbon dioxide may then move longitudinally through the container 101 towards the first end 102 of the container 101 towards the holes 180 in the seal 116 of the reducer 160. As described above, in some embodiments, a pipe or hose 196 may be connected to the holes 180 in the seal 116. In some embodiments, a pump may be used to improve removal of the carbon dioxide.

The carbon dioxide-enriched air (also referred to as carbon dioxide) may have any suitable percentage of carbon dioxide. For example, the carbon dioxide-enriched air may include a percentage of carbon dioxide in a range of 2% to 99%. In some embodiments, the percentage of carbon dioxide may be 2%, 5%, 10%, 15%, 20%, 25%, 30%, 35%, 40%, 45%, 50%, 55%, 60%, 65%, 70%, 75%, 80%, 85%, 90%, 95%, or 99%. In some embodiments, the percentage of carbon dioxide may be 90% or greater. In some embodiments, the percentage of carbon dioxide may be 2% or greater.

Step 1008 may include unsealing the carbon capture vessel 100. The reducer valve 164 may be moved from the closed position to the open position so that air can flow into the inner sidewall 194 of the reducer 160 and, thus, the inner sidewall 128 of the subcontainer 124. Moreover, the container valve 108 may be moved from the closed position to the open position so that air can flow out of the second end 104 of the container 101.

FIG. 11 illustrates a flow chart of another embodiment of a method 1100 for regenerating the sorbent material, according to one or more embodiments of the present disclosure. In this method 1100, in addition to increasing the temperature in the carbon capture vessel 100, the process also includes decreasing the pressure in the carbon capture vessel 100. The regeneration process 1100 may be performed at step 908 of the carbon capture process 900 described in reference to FIG. 9 above.

Step 1102 of the method 1100 may include sealing the carbon capture vessel 100. The carbon capture vessel 100 may be the carbon capture vessel 100 described above in reference to FIGS. 1-7C. The reducer valve 164 may be moved from the open position to the closed position so that air cannot flow into the carbon capture vessel 100. The reducer valve 164 may seal the inner sidewall 194 of the reducer 160, thus preventing air from moving into the inner sidewall 128 of the subcontainer 124. Other embodiments involving doors or lids may be used to seal the carbon capture vessel 100 or the first end 102 of the container 101.

Moreover, the container valve 108 may also be moved from an open position to a closed position so that air cannot flow out of the second end 104 of the container 101. The container door 108 may seal the second end 104 of the container 101. Other embodiments involving doors or lids may be used to seal the carbon capture vessel 100 or the second end 104 of the container 101.

Step 1104 of the method 1100 may include decreasing the air pressure within the carbon capture vessel 100. In some embodiments, the pressure may be decreased to a value in a range of 0 bar to 1 bar. For example, the pressure may be decreased to 0.1 bar, 0.2 bar, 0.3 bar, 0.4 bar, 0.5 bar, 0.6 bar, 0.7 bar, 0.8 bar, 0.9 bar, or 1 bar, absolute. In some embodiments, the pressure may be lowered to a pressure in a range of 0.5 bar to 0.8 bar, absolute.

In some embodiments, a vacuum pump may be coupled to the carbon capture vessel 100 so that a vacuum may be pulled within the carbon capture vessel 100.

Step 1104 may be performed in any suitable amount of time. For example, step 1104 may be performed in a range of 1 minute (min) to 1 hour (hr). In some embodiments, step 1104 may be performed in 1 min, 2 min. 5 min. 10 min, 15 min, 30 min, 45 min, or 1 hr. In some embodiments, step 1104 may be performed in less than or equal to 2 min.

Step 1106 of the method 1000 may include increasing the temperature in the carbon capture vessel 100. The heating element 142 may be used to increase the temperature. In some embodiments, the heating element 142 may be particularly configured to heat the subcontainer 124 and/or the sorbent material disposed therein, as described in more detail above.

In some embodiments, the temperature may be increased to a value in a range of 25° C. to 120° C. For example, the temperature may be increased to 25° C., 30° C., 40° C., 50° C., 60° C., 70° C., 80° C., 90° C., 100° C., 110° C., or 120° C. or temperatures in between. In some embodiments, the temperature may be increased to a temperature in the range of 70° C. to 95° C.

Step 1106 may be performed in any suitable amount of time depending on the heating capacity of heating element 142 among other factors. For example, step 1106 may be performed in a range of 15 min to 6 hr. In some embodiments, step 1106 may be performed in 15 min, 30 min. 45 min, 1 hr, 1.5 hr, 2 hr, 2.5 hr, 3 hr, 3.5 hr, 4 hr, 4.5 hr, 5 hr, 5.5 hr, or 6 hr. In some embodiments, step 1106 may be performed in approximately 3 hr.

In some embodiments, step 1106 may be performed before step 1104. Thus, the temperature in the carbon capture vessel 100 may be increased before the pressure is decreased.

Step 1108 of the method 1100 may include determining whether the pressure within the carbon capture vessel 100 has increased significantly. This determination may be performed in any suitable way. For example, if the pressure in the carbon capture vessel 100 exceeds a certain threshold, this may indicate that the pressure has significantly increased. The pressure may be measured in any suitable way. For example, one or more sensors may be disposed in the carbon capture vessel 100 to measure the pressure therein.

If it is determined that the pressure has not increased to ambient in step 1108, step 1110 may be performed. Step 1110 of the method 1100 effectively repeats step 1108. Step 1110 may include holding the temperature in the carbon capture vessel 100 constant. This may include measuring the temperature within the carbon capture vessel 100. In some embodiments, this may particularly include measuring the temperature within the subcontainer 124 and/or the temperature of the sorbent material disposed therein. In some embodiments, one or more sensors may be disposed within or proximate to the carbon capture vessel 100. For example, a sensor may be disposed within the subcontainer 124 and may be disposed within the second annulus 130 between the inner sidewall 128 and the outer sidewall 126 where the sorbent material is disposed.

Step 1110 may also include activating the heating element 142 in response to the measured temperature. For example, if the temperature in the carbon capture vessel 100 decreases below a certain threshold, then the heating element 142 may be activated to increase the temperature. In some embodiments, the heating element 142 is constantly activated.

Step 1112 may include removing carbon dioxide-enriched air from the carbon capture vessel 100. In some embodiments, the holes may allow the carbon dioxide to move from an area of high pressure within the heated subcontainer 124 to a lower pressure area outside of the carbon capture vessel 100. Thus, when heated, the released carbon dioxide will naturally move outward from the second annulus 130 through the perforations in the outer sidewall 126 of the subcontainer 124 and into the first annulus 138 between the outer sidewall 126 and container 101. The carbon dioxide may then move longitudinally through the container 101 towards the first end 102 of the container 101, towards the holes 180 in the seal 116 of the reducer 160. As described above, in some embodiments, a pipe or hose 196 may be connected to the holes 180 in the seal 116. In some embodiments, a pump may be used to improve removal of the carbon dioxide.

The carbon dioxide-enriched air (also referred to as carbon dioxide) may have any suitable percentage of carbon dioxide. For example, the carbon dioxide-enriched air may include a percentage of carbon dioxide in a range of 50% to 99%. In some embodiments, the percentage of carbon dioxide may be 50%, 55%, 60%, 65%, 70%, 75%, 80%, 85%, 90%, 95%, or 99%. In some embodiments, the percentage of carbon dioxide may be 90% or greater.

Step 1114 may include unsealing the carbon capture vessel 100. The reducer valve 164 may be moved from the closed position to the open position so that air can flow into the inner sidewall 194 of the reducer 160 and, thus, the inner sidewall 128 of the subcontainer 124. Moreover, the container valve 108 may be moved from the closed position to the open position so that air can flow out of the second end 104 of the container 101.

The carbon dioxide-enriched air may be collected so that it is not released into the atmosphere. Instead, the carbon dioxide-enriched air may be collected or captured. The carbon dioxide-enriched air may then be treated and/or stored. For example, the carbon capture vessel 100 may deliver the carbon dioxide to a carbon-injection facility. The carbon injection facility may inject the carbon dioxide-enriched air below ground to prevent it from being released into the atmosphere. The carbon dioxide-enriched air may also be treated and/or utilized.

The regeneration process, such as those described in reference to FIGS. 10-11, may be a dry regeneration process such that no fluids are introduced into the carbon capture vessel 100 during the process 1000, 1100 when the carbon capture vessel 100 is sealed. Instead, the carbon dioxide absorbed in the sorbent material is released into the carbon capture vessel 100 by increasing the temperature, as described in steps 1004-1006, or by increasing the temperature and decreasing the pressure, as described in steps 1104-1112. This may advantageously allow for the improved release of carbon dioxide from the sorbent material without introducing additional fluids or steps.

The Direct Air Capture System

In some embodiments, one or more carbon capture vessels 100 may be included in a direct air capture (DAC) system 214. The DAC system 214 may be configured to direct air from the atmosphere into the one or more carbon capture vessels 100 to remove carbon dioxide therefrom. After passing through the one or more carbon capture vessels 100, the "cleaned" air may be returned to the atmosphere. The carbon dioxide removed from the air may be captured for storage or utilization. For example, the carbon dioxide removed may be delivered to a carbon injection facility or purified to beverage grade.

Figure 12:
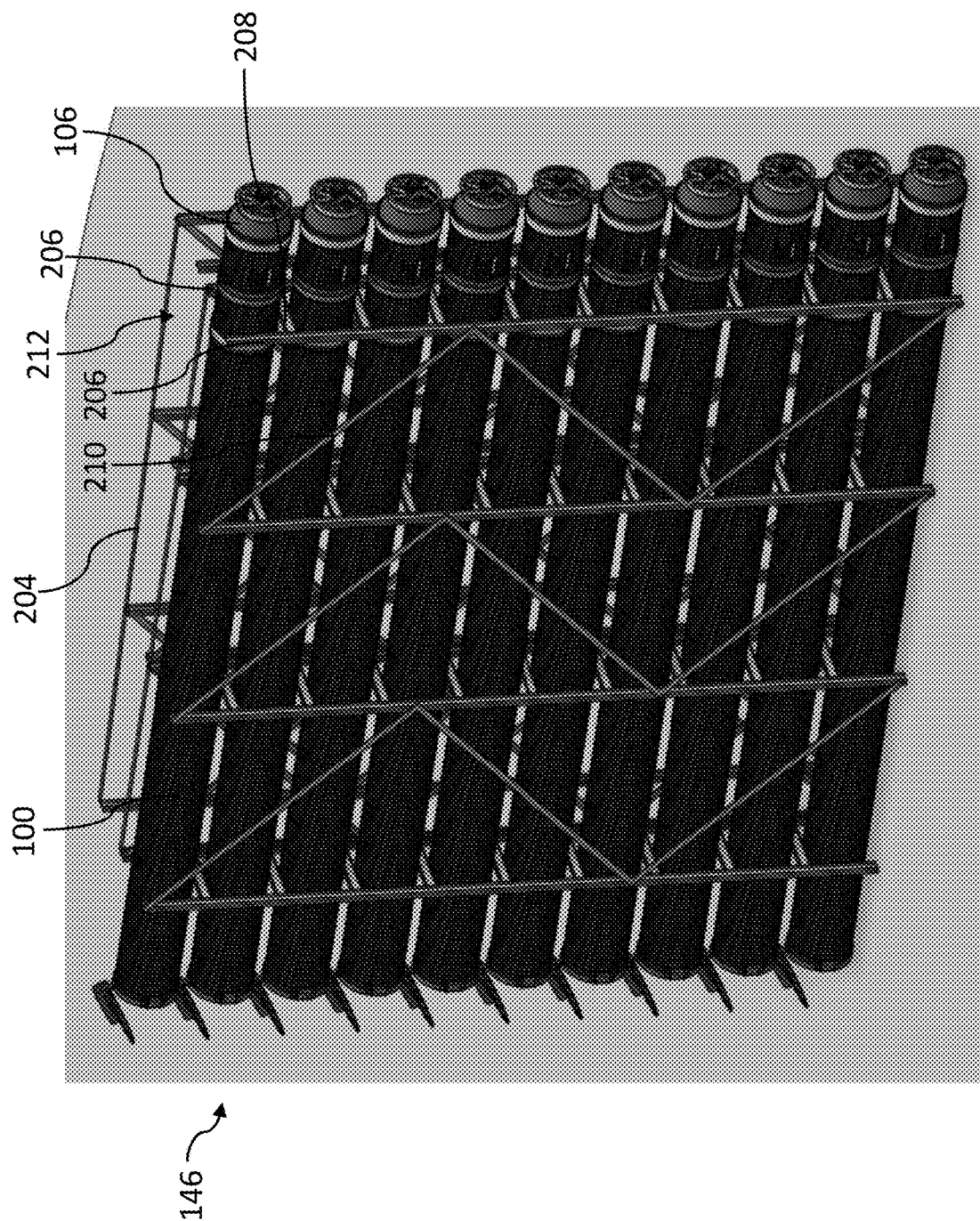
FIG. 12 illustrates an arrangement of carbon capture vessels, according to one or more embodiments of the present disclosure.

Two or more carbon capture vessels 100 may be arranged in any suitable arrangement. FIG. 12 illustrates an exemplary arrangement of carbon capture vessels 100, according to one or more embodiments of the present disclosure. FIG. 12 illustrates a stack 146 of carbon capture vessels 100.

In some embodiments, two or more carbon capture vessels 100 may be vertically stacked. Any suitable number of carbon capture vessels 100 may be stacked. For example, the stack 146 may include 2, 3, 4, 5, 6, 7, 8, 9, 10, 11, 12, 13, 14, or 15 carbon capture vessels 100. In some embodiments, the stack 146 may include 10 carbon capture vessels, as shown in the illustrated embodiment in FIG. 12.

A frame 204 may be disposed around the carbon capture vessels 100 to stabilize and support the weight of stack 146. The frame 204 may include a pair 212 of vertical beams 206 on either side of the carbon capture vessels 100. There may be multiple pairs 212 of vertical beams 206 along the length of the carbon capture vessels 100. Each pair of vertical beams 206 may be connected by one or more horizontal beams 208. In some embodiments, the pair of vertical beams 206 and the horizontal beams 208 may form a ladder-like structure. A horizontal beam 208 may be disposed between each carbon capture vessel 100 in the stack 146. Moreover, one or more connecting beams 210 may be coupled to the vertical beam 206 of one pair 212 on a first end and to a vertical beam 206 of another neighboring pair 212 on a second end. There may be one or more connecting beams 210 connecting neighboring stacks. In some embodiments, the connecting beams 210 may be angled relative to the vertical beams 206. In some embodiments, the connecting beams 210 may form a zig-zag or triangular pattern between the pairs 212 of vertical beams 206.

In some embodiments, individual frames are disposed around each carbon capture vessel 100. The individual frames may be coupled to each other to form the stack 146.

In other embodiments, one or more subcontainers 124 may be disposed in a container 101. In some embodiments, the container 101 may include individual or multiple intermodal containers, commonly referred to as shipping containers, built for intermodal freight transport that can be used across different modes of transport, from ship to rail to truck or rail to tuck. In some embodiments, shipping containers used as container 101 may be stackable, allowing multiple carbon capture vessel 100 to be stacked on top of each with one or more subcontainers 124 disposed therein.

Figure 13B:
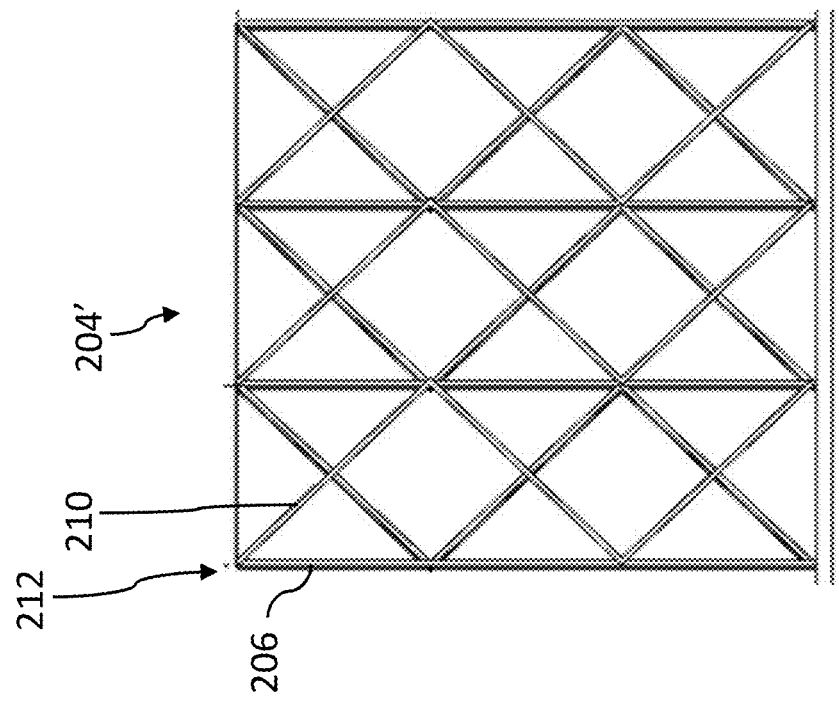
FIG. 13B illustrates a side view of a frame, according to one or more embodiments of the present disclosure.
Figure 13A:
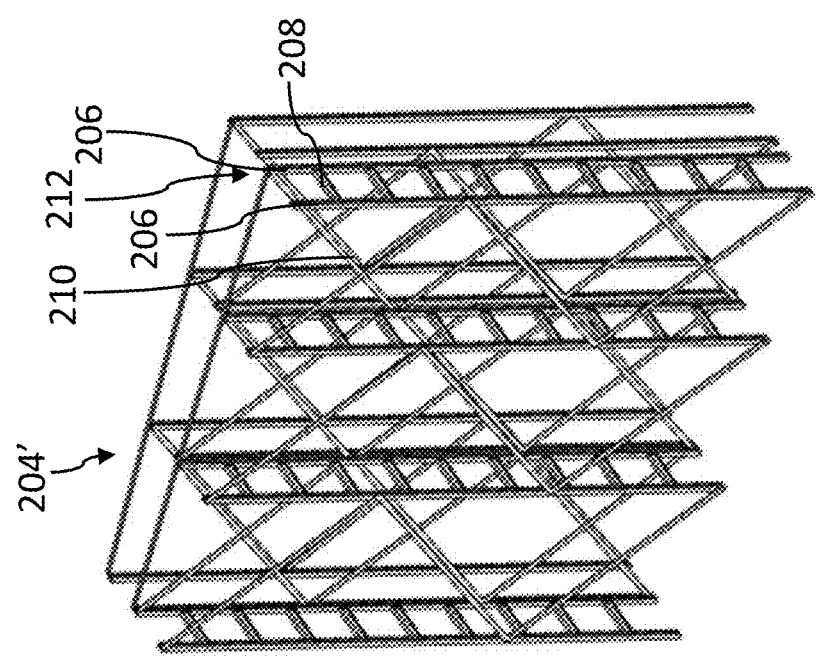
FIG. 13A illustrates a perspective view of a frame, according to one or more embodiments of the present disclosure.

Although one particular frame design is illustrated, any suitable frame 204 may be used to stabilize and support the stacks 146. For example, FIGS. 13A-B illustrate another embodiment of a frame 204' for the DAC structure 214, according to one or more embodiments of the present disclosure. FIG. 13A illustrates a perspective view of the frame 204' and FIG. 13B illustrates a side view of the frame 204'. The frame 204' is similar to the frame 204 in FIG. 12 except, in FIGS. 13A-B, the frame 204' includes connecting beams 210 that form a diamond pattern between vertical beams 206 in neighboring pairs 212. In some embodiments, the connecting beams 210 cross over one another.

Figure 14:
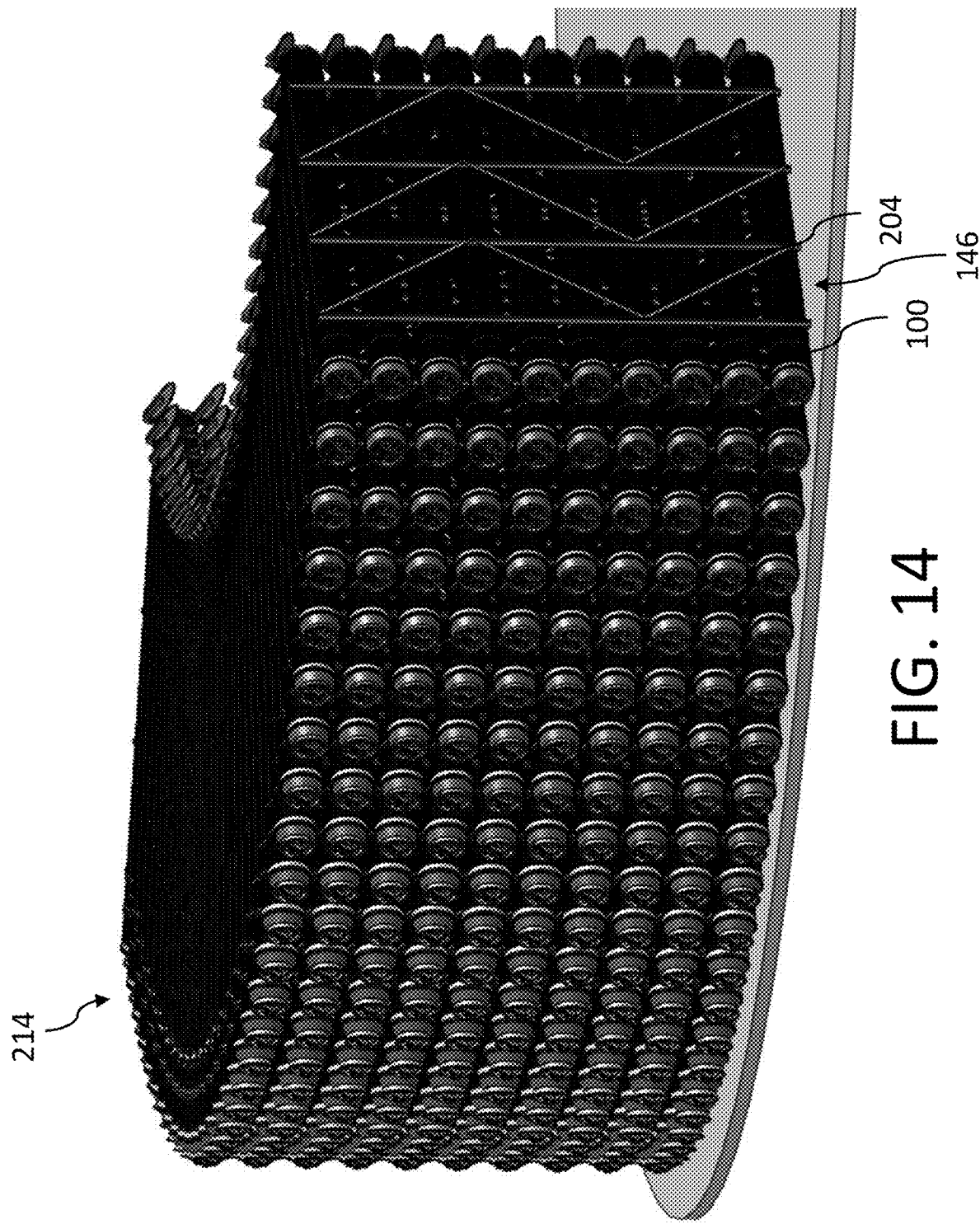
FIG. 14 illustrates an arrangement of carbon capture vessels, according to one or more embodiments of the present disclosure.

Multiple stacks 146 of carbon capture vessels 100 may be disposed adjacent to each other. FIG. 14 illustrates multiple carbon capture stacks 146 of a DAC structure 214, according to one or more embodiments of the present disclosure. The stacks 146 may be coupled to each other. For example, the frame (or frames) that support each stack 146 may be couplable to the frame (or frames) of adjacent stacks 146. In some embodiments, the stacks 146 may be arranged so that they form a circular structure. FIG. 14 illustrates a quarter of a circular structure. In some embodiments, the full circular structure may include 1,280 carbon capture vessels 100, arranged in a circular structure stacked 10 high.

The stacks 146 may be arranged so that the fans 106 of the carbon capture vessels 100 convey air from the exterior of the DAC structure 214, through the carbon capture vessels 100, and into the interior of the DAC structure 214.

Figure 15:
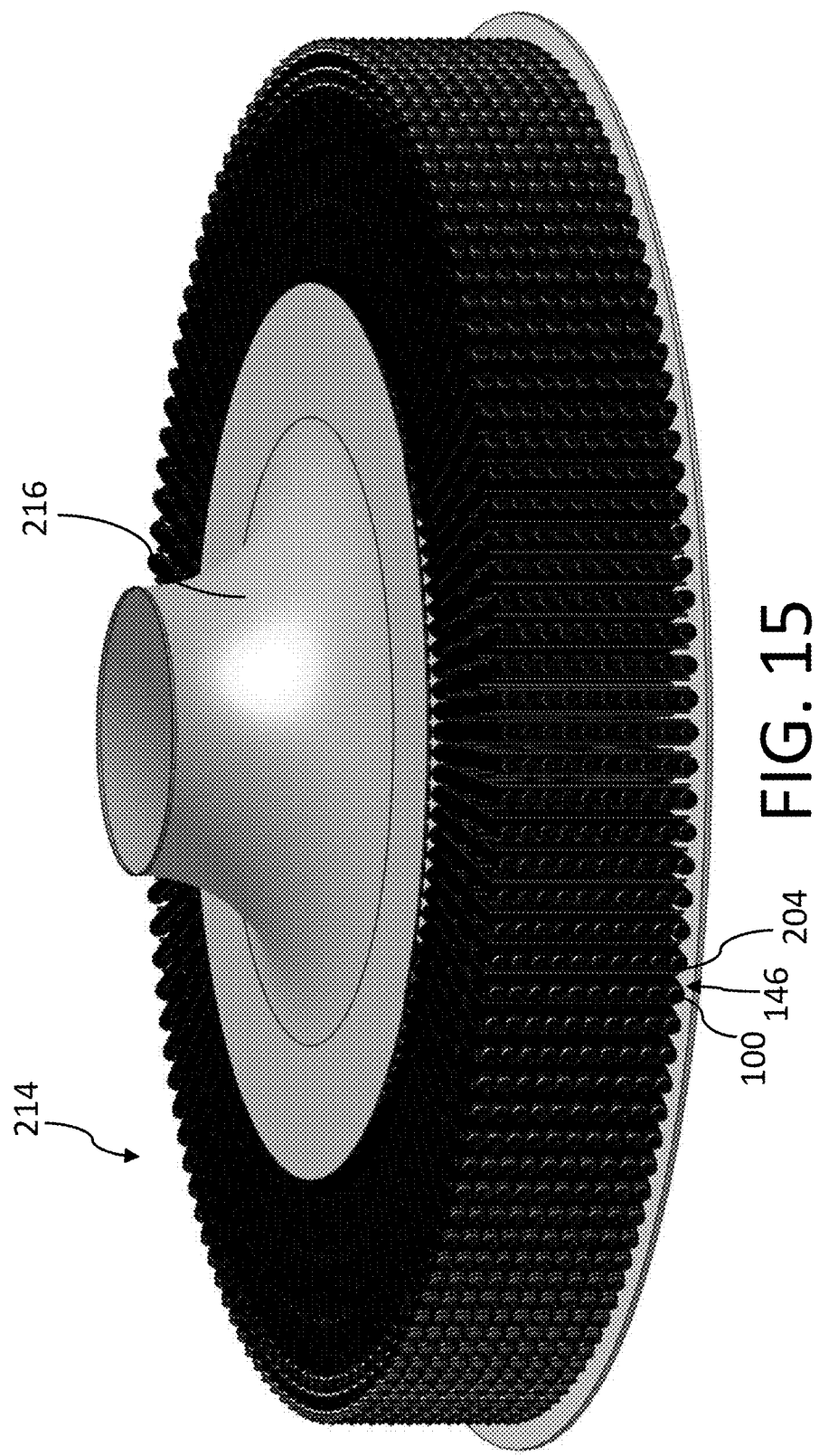
FIG. 15 illustrates a direct air capture (DAC) structure, according to one or more embodiments of the present disclosure.

FIG. 15 illustrates a DAC structure 214, according to one or more embodiments of the present disclosure. In some embodiments, the DAC structure 214 may include an air diverter 700 (FIG. 17) disposed at the center of the arrangement of stacks 146 of carbon capture vessels 100. The air diverter 700 may help remove the processed air from the carbon capture vessels 100 by redirecting the processed air entering the DAC structure 214 upward so that the processed air does not stay inside the DAC structure 214 but is instead effectively and efficiently removed from the structure. The air diverter 700 may reduce turbulence and decrease the pressure drop of the air allowing more air to be moved per unit pressure drop. It also minimizes the amount of land used to prevent cross circulation of processed air into the fans.

Figure 17:
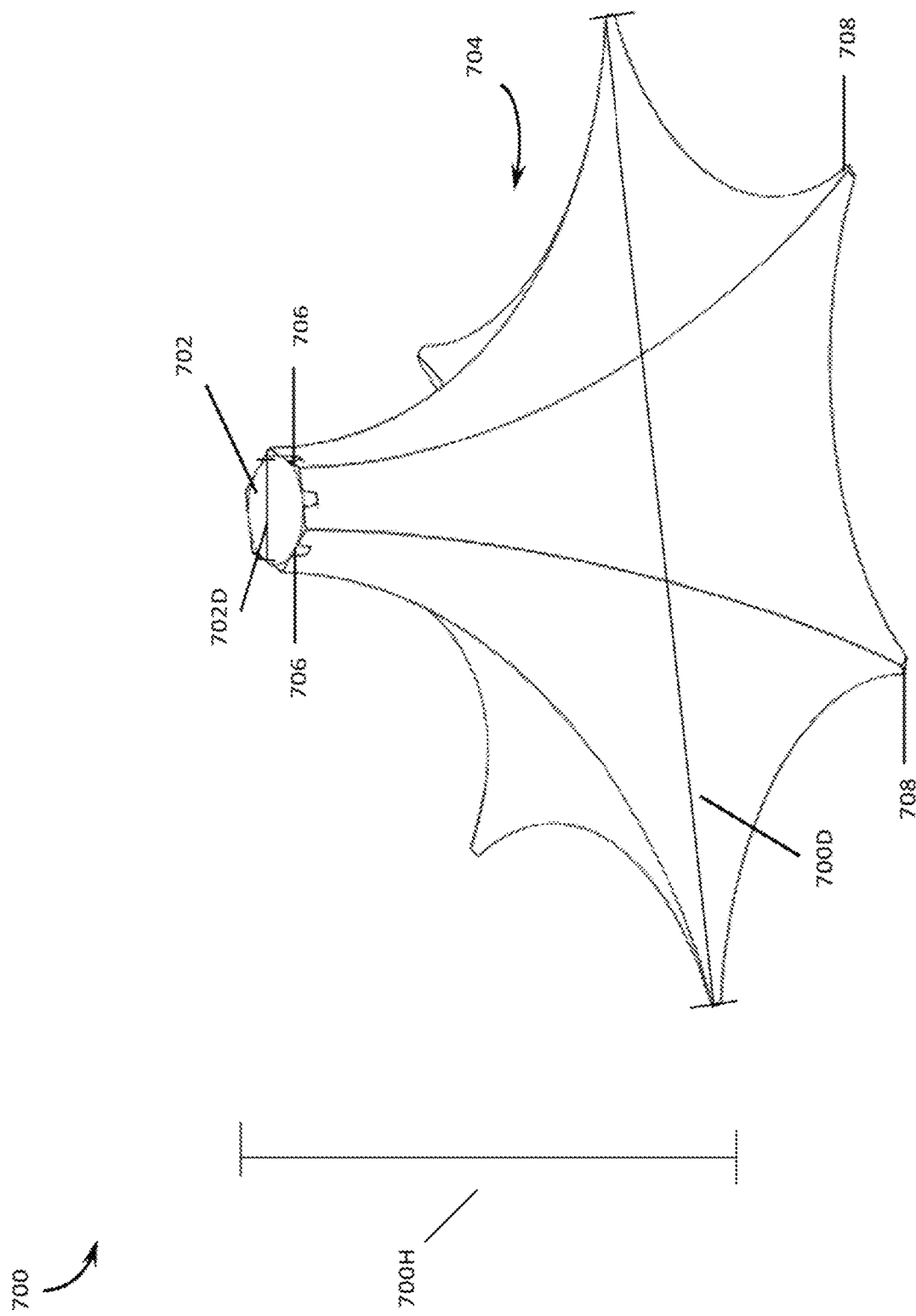
FIG. 17 illustrates a diverter according to one or more embodiments of the present disclosure.

Any suitable air diverter may be used. For example, the DAC structure 214 may include the air diverter described in U.S. Pat. No. 11,266,943, the entirety of which is incorporated herein by reference. Referring to FIG. 17, diverter 700 may include a center support structure 702 and a body 704 that is anchored to the center support structure 702 at upper anchor points 706 and anchored to the floor at lower anchor points 708.

In some embodiments, the center support structure 702 may be a pole that may be anchored to the floor. In some embodiments, the center support structure 702 may be a ring that may be suspended from above. The body 704 may be anchored to the center support structure 702 at upper anchor points 706. Each body section 710 may be anchored individually to the center support structure 702.

The diameter of the diverter 700 determines when air entering the DAC structure 100 begins to be diverted upward. Similarly, the diameter of the center support structure 702 determines how quickly the air must be diverted upward. The diverter 700 may be operably designed to maximize the efficiency of redirecting the air upward while minimizing turbulence within the air. Accordingly, the diverter 700 may have a diameter of 700D, or cross-sectional width, and the center support structure may have a diameter of 702D, or cross-sectional width. Diverter 700 has a height 700H that is about 4 m to about 19 m, though larger and smaller values are contemplated. In some embodiments, height 700H is about 10 m.

In some embodiments, the DAC structure 214 may also include a velocity stack 216 disposed at the center of the of the arrangement of stacks 146 of carbon capture vessels 100. The velocity stack 216 may function to remove the processed air from the DAC structure 214 so that the air is not recirculated through the DAC structure 214. The air that is redirected upward by the air diverter passes through the velocity stack 216 to exit out of the top of the DAC structure 214. The velocity stack 216 may be designed to be wider at the bottom than at the top so that the air is accelerated as it passes through the velocity stack 216. Depending on the implementation, the DAC structure 214 may force the air exiting through the velocity stack 216 to achieve heights including about 20 m to 300 m, and in some implementations, about 50 m to 300 m, although higher and lower heights are contemplated. In some implementations, the air may reach a height of about 125 m to about 205 m depending on the fan speed and design of the air diverter and velocity stack 216. Moving the carbon dioxide depleted air to these heights helps ensure that the air is not recirculated through the DAC structure 214. The efficiency of the DAC structure 214 is improved by not recirculating air that has already been processed, thereby ensuring maximum carbon dioxide extraction from the surrounding air.

Any suitable velocity stack 216 may be used. For example, the DAC structure 214 may include the velocity stack described in U.S. Pat. No. 11,266,943, the entirety of which is incorporated herein by reference.

In some embodiments, the air diverter and velocity stack 216 may advantageously mitigate amine emissions that exit DAC structure 214. As described above, if the sorbent material includes amines, the amines may leach into the air (or other fluids) when it flows through the sorbent material. The DAC structure 214 may decrease the amount of leached amines that are released back into the atmosphere by concentrating the fluid that exits the second end 104 of each container 101 into a central air handling evacuation chamber to capture, recover, and reutilize amines.

The velocity stack 216 may include any suitable material. In some embodiments, the velocity stack 216 is made using an impermeable fabric. In some embodiments, a permeable mesh screen or fabric (not shown) may be positioned within the center of the velocity stack 216. In some implementations, the permeable mesh screen or fabric extends across the opening in the velocity stack 216 and the exhaust or the treated air flows through the permeable mesh screen or fabric. In other implementations, the permeable mesh screen or fabric is disposed at the exit end of each carbon capture container. In yet other implementations, the permeable mesh screen or fabric is disposed elsewhere within the center of the velocity stack 216 in the flow path or outside the flow path. The air diverter 700 may include any suitable material. In some embodiments, air diverter 700 is made using an impermeable fabric.

Figure 16:
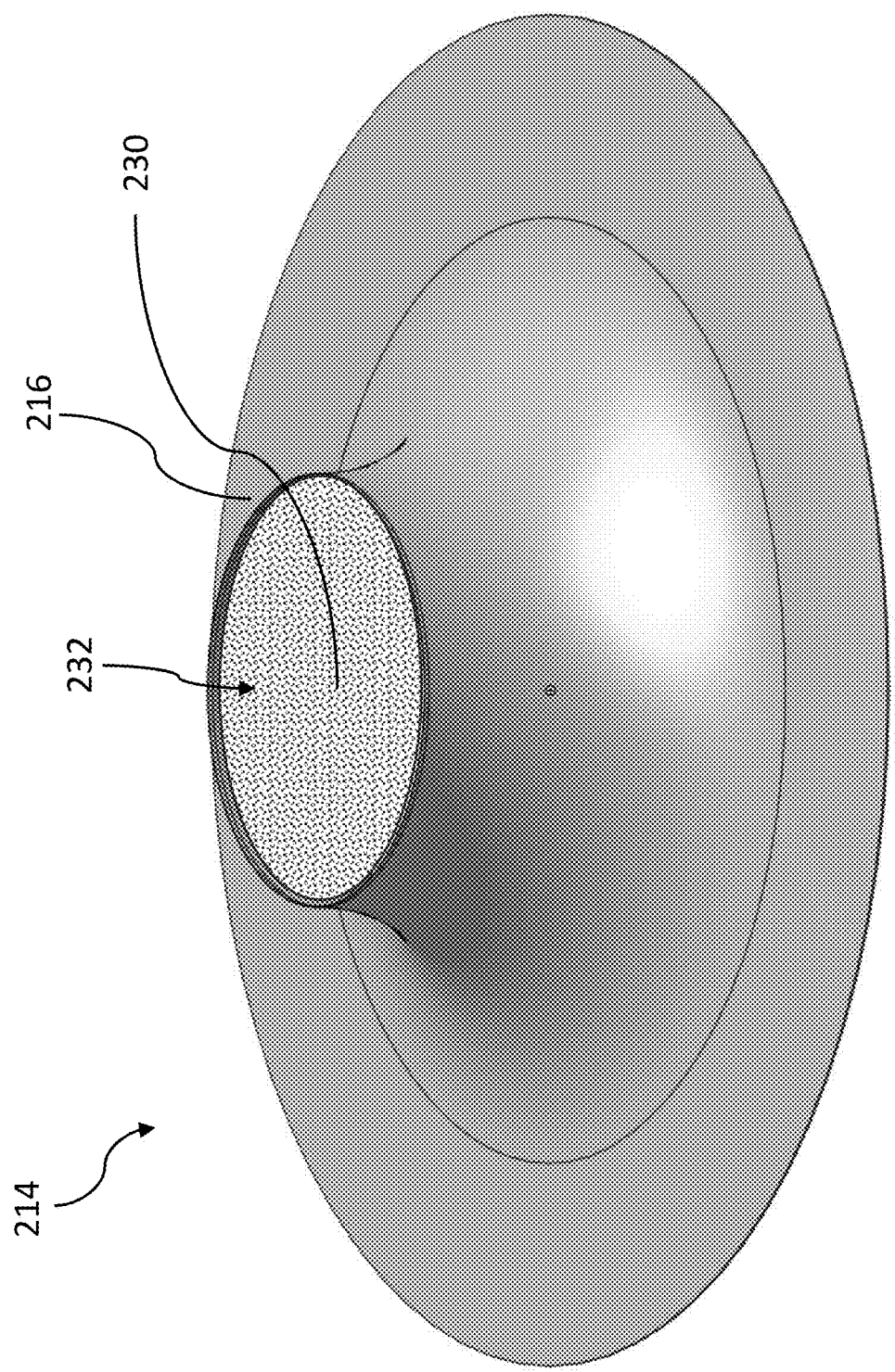
FIG. 16 illustrates a velocity stack and a permeable mesh screen, according to one or more embodiments of the present disclosure.

FIG. 16 illustrates a velocity stack 216 and a permeable mesh screen 230, according to one or more embodiments of the present disclosure. As shown in the illustrated embodiment, the mesh screen 230 may extend across the opening 232 at the top of the velocity stack 216. Thus, the air diverter 700 and velocity stack 216 may direct air upwards through the mesh screen 230. The mesh screen 230 may be permeable, allowing the air to move therethrough. As the air moves through the mesh screen 230, at least some of the amines in the air may be deposited in the mesh screen 230. Thus, the mesh screen 230 may decrease the amount of amines that are released into the atmosphere. In some embodiments a mesh screen may also extend over the opening of the air diverter 700.

Any amines that leach from the sorbent material may condense and coat the velocity stack 216, the permeable mesh screen 230, and air diverter 700. In some embodiments, the floor of the at the center of the arrangement of stacks 146 of carbon capture vessels 100 may be impervious and sloped downwards towards drains that are piped to tanks and amine recovery facilities (not shown). In some embodiments, the amines impregnated on the porous solid material are water soluble. In some embodiments, spraying the velocity stack 216, the permeable mesh or screen and, air diverter periodically with water may remove amines from these surfaces. The amines and water may be collected and processed, thus mitigating amine any emissions into the atmosphere.

The above specification, examples and data provide a complete description of the structure and use of exemplary embodiments of the flat-pack table as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for direct air capture, comprising:
a plurality of carbon capture containers, each carbon capture container comprising an inwardly facing side and an outwardly facing side, the plurality of carbon capture containers being arranged such that the inwardly facing side of each carbon capture container faces an inner space;
a plurality of fans, wherein each fan of the plurality of fans is disposed adjacent an outwardly facing side of a carbon capture container of the plurality of carbon capture containers, the plurality of fans being arranged to move air through the plurality of carbon capture containers in a first direction from the outwardly facing side into the inner space;
an air diverter disposed within the inner space that is configured to receive the air flowing in the first direction and redirect the air to flow in a second direction angled upwardly from the first direction; and
a velocity stack disposed on a top of the inner space and configured to accelerate the flow of the air in the second direction,
wherein at least one of the air diverter or velocity stack comprises an impermeable fabric that is impermeable to at least one of gas or liquid.

2. The system of claim 1, further comprising a plurality of sorbent material subcontainers inside the plurality of carbon capture containers, the plurality of sorbent material subcontainers configured to receive air flowing in the first direction, to direct the air through a sorbent material disposed within or adjacent the plurality of sorbent material subcontainers in a third direction orthogonal to the first direction, and to return the air flowing to the first direction along an exterior of the plurality of sorbent material subcontainers from the outwardly facing sides of the plurality of carbon capture containers into the inner space.

3. The system of claim 2, wherein a sorbent material is disposed within or adjacent to each sorbent subcontainer, the sorbent material designed to remove carbon dioxide from the air.

4. The system of claim 1, further comprising a permeable mesh disposed at a center of the velocity stack, the permeable mesh configured to collect at least one of amines or water by condensation.

5. The system of claim 1, further comprising a permeable screen disposed at a center of the velocity stack, the permeable screen configured to collect at least one of amines or water by condensation.

6. The system of claim 1, wherein the air diverter comprises an impermeable fabric, and
wherein the velocity stack comprises an impermeable fabric.

7. The system of claim 1, wherein the air diverter, the velocity stack, and the inner space are configured to collect at least one of amines or water by condensation.

8. A system for direct air capture, comprising:
a plurality of carbon capture containers, each carbon capture container comprising an inwardly facing side and an outwardly facing side, the plurality of carbon capture containers being arranged such that the inwardly facing side of each carbon capture container faces an inner space;
a plurality of fans, wherein each fan of the plurality of fans is disposed adjacent an outwardly facing side of a carbon capture container of the plurality of carbon capture containers, the plurality of fans being arranged to move air through the plurality of carbon capture containers in a first direction from the outwardly facing side into the inner space; and
a velocity stack disposed on a top of the inner space and configured to accelerate the flow of the air in a second direction,
wherein the velocity stack comprises an impermeable fabric that is impermeable to at least one of gas or liquid.

9. The system of claim 8, further comprising a plurality of sorbent material subcontainers inside the plurality of carbon capture containers, the plurality of sorbent material subcontainers configured to receive air flowing in the first direction, to direct the air through a sorbent material disposed within or adjacent the plurality of sorbent material subcontainers in a third direction orthogonal to the first direction, and to return the air flowing to the first direction along an exterior of the plurality of sorbent material subcontainers from the outwardly facing sides of the plurality of carbon capture containers into the inner space.

10. The system of claim 9, wherein a sorbent material is disposed within or adjacent to each sorbent subcontainer, the sorbent material designed to remove carbon dioxide from the air.

11. The system of claim 8, further comprising at least one of:
- a permeable mesh disposed at a center of the velocity stack, the permeable mesh configured to collect at least one of amines or water by condensation; or
- a permeable screen disposed at a center of the velocity stack, the permeable screen configured to collect at least one of amines or water by condensation.

12. The system of claim 8, wherein the velocity stack and the inner space are configured to collect at least one of amines or water by condensation.

13. A system for direct air capture, comprising:
- a plurality of carbon capture containers, each carbon capture container comprising an inwardly facing side and an outwardly facing side, the plurality of carbon capture containers being arranged such that the inwardly facing side of each carbon capture container faces an inner space;
- a plurality of fans, wherein each fan of the plurality of fans is disposed adjacent an outwardly facing side of a carbon capture container of the plurality of carbon capture containers, the plurality of fans being arranged to move air through the plurality of carbon capture containers in a first direction from the outwardly facing side into the inner space; and
- an air diverter disposed within the inner space that is configured to receive the air flowing in the first direction and redirect the air to flow in a second direction angled upwardly from the first direction,
- wherein the air diverter comprises an impermeable fabric that is impermeable to at least one of gas or liquid.

14. The system of claim 13, further comprising a plurality of sorbent material subcontainers inside the plurality of carbon capture containers, the plurality of sorbent material subcontainers configured to receive air flowing in the first direction, to direct the air through a sorbent material disposed within or adjacent the plurality of sorbent material subcontainers in a third direction orthogonal to the first direction, and to return the air flowing to the first direction along an exterior of the plurality of sorbent material subcontainers from the outwardly facing sides of the plurality of carbon capture containers into the inner space.

15. The system of claim 13, wherein a sorbent material is disposed within or adjacent to each sorbent subcontainer, the sorbent material designed to remove carbon dioxide from the air.

16. The system of claim 13, wherein the air diverter and inner space are configured to collect at least one of amines or water by condensation.

17. A system for direct air capture, comprising:
- a plurality of carbon capture containers, each carbon capture container comprising an inwardly facing side and an outwardly facing side, the plurality of carbon capture containers being arranged such that the inwardly facing side of each carbon capture container faces an inner space;
- a plurality of fans, wherein each fan of the plurality of fans is disposed adjacent an outwardly facing side of a carbon capture container of the plurality of carbon capture containers, the plurality of fans being arranged to move air through the plurality of carbon capture containers in a first direction from the outwardly facing side into the inner space;
- an air diverter disposed within the inner space that is configured to receive the air flowing in the first direction and redirect the air to flow in a second direction angled upwardly from the first direction;
- a velocity stack disposed on a top of the inner space and configured to accelerate the flow of the air in the second direction; and
- a permeable mesh or screen disposed at a center of the velocity stack, the permeable mesh or sheet being configured to collect at least one of amines or water by condensation,
- wherein at least one of the air diverter or velocity stack comprises an impermeable material that is impermeable to at least one of gas or liquid.

18. The system of claim 17, further comprising a plurality of sorbent material subcontainers inside the plurality of carbon capture containers, the plurality of sorbent material subcontainers configured to receive air flowing in the first direction, to direct the air through a sorbent material disposed within or adjacent the plurality of sorbent material subcontainers in a third direction orthogonal to the first direction, and to return the air flowing to the first direction along an exterior of the plurality of sorbent material subcontainers from the outwardly facing sides of the plurality of carbon capture containers into the inner space.

19. The system of claim 18, wherein a sorbent material is disposed within or adjacent to each sorbent subcontainer, the sorbent material designed to remove carbon dioxide from the air.

20. The system of claim 17, wherein the air diverter comprises an impermeable material that is impermeable to at least one of gas or liquid.

21. The system of claim 20, wherein the impermeable material is an impermeable fabric.

22. The system of claim 17, wherein the velocity stack comprises an impermeable material that is impermeable to at least one of gas or liquid.

23. The system of claim 22, wherein the impermeable material is an impermeable fabric.

24. The system of claim 1, wherein the air diverter, the velocity stack, and the inner space are configured to collect at least one of amines or water by condensation.

* * * * *